US012711445B2

(12) United States Patent
Parikh et al.

(10) Patent No.: US 12,711,445 B2
(45) Date of Patent: Aug. 18, 2026

(54) EDGE-BASED MACHINE LEARNING PIPELINE FOR DETERMINING AND ASSESSING IN-STORE CONDITIONS

(71) Applicant: PepsiCo Inc., Purchase, NY (US)

(72) Inventors: Dhaivat P Parikh, Plano, TX (US); Vimalkumar Shambhubhai Apani, Hyderabad (IN); Srinivas Telukunta, Hyderabad (IN)

(73) Assignee: PepsiCo Inc., Purchase, NY (US)

( * ) Notice: Subject to any disclaimer, the term of this patent is extended or adjusted under 35 U.S.C. 154(b) by 0 days.

(21) Appl. No.: 19/063,839

(22) Filed: Feb. 26, 2025

(65) Prior Publication Data

US 2026/0170436 A1 Jun. 18, 2026

(51) Int. Cl.
*G06Q 10/0637* (2023.01)
*G06Q 10/0639* (2023.01)

(52) U.S. Cl.
CPC ... *G06Q 10/0637* (2013.01); *G06Q 10/06393* (2013.01)

(58) Field of Classification Search
None
See application file for complete search history.

(56) References Cited

U.S. PATENT DOCUMENTS

2020/0302592 A1* 9/2020 Ebersohn ................ G06T 11/60
2022/0317639 A1* 10/2022 Karri ........................ G06F 30/13
2023/0368318 A1* 11/2023 Cope ....................... G16H 50/30
2025/0321927 A1* 10/2025 Arakelyan ............ G06F 16/116

FOREIGN PATENT DOCUMENTS

WO WO-2021078256 A1 * 4/2021 ......... G06F 9/45558
WO WO-2023020491 A1 * 2/2023 ............... H04L 9/50

OTHER PUBLICATIONS

Hanzelik PP, Kummer A, Abonyi J. Edge-Computing and Machine-Learning-Based Framework for Software Sensor Development. Sensors (Basel). Jun. 3, 2022;22(11):4268. doi: 10.3390/s22114268. PMID: 35684889; PMCID: PMC9185470. (Year: 2022).*

* cited by examiner

*Primary Examiner* — Mehmet Yesildag
(74) *Attorney, Agent, or Firm* — Schwegman Lundberg & Woessner, P.A.

(57) ABSTRACT

Disclosed is technology for edge-based assessment of conditions associated with a location. A method can include receiving, from a backend computer system by an edge computing device, compressed machine learning models and instructions to execute an image processing pipeline at the edge, executing, at the edge, the instructions to run the image processing pipeline, capturing images of products and fixtures associated with the location, and for each image: applying a product recognition model, receiving model output indicating products recognized in the image, applying, at least a portion of the compressed machine learning models to the model output, in response, determining conditions associated with the location, determining whether the conditions satisfy one or more KPI analyses or predetermined objectives for the location, and generating recommendations for improving the conditions.

25 Claims, 30 Drawing Sheets

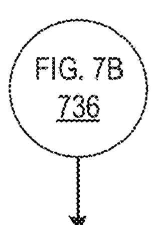

Generate, at the KPI and/or recommendations determination engine, one or more recommendations and/or KPI analyses based on applying the retrieved information and the ruleset(s) to the output
738

Identify whether a quantity of products on a particular rack in the physical space satisfy the ruleset(s)
740

Identify products that are misplaced in the physical space
742

Recommend proper quantity and/or placement of one or more products
744

Generate and present, in one or more graphical user interface (GUI) displays at the mobile device, the generated recommendations and/or KPI analyses
746

Receive user input indicating one or more modifications to the presented recommendations and/or KPI analyses
748

User input indicating correct identification of one or more products 750

Transmit the output, the generated recommendations, the KPI analyses, and/or received user input to a backend cloud computing system for additional processing (refer to FIGs. 8A-8B)
752

FIG. 7C

EDGE-BASED MACHINE LEARNING PIPELINE FOR DETERMINING AND ASSESSING IN-STORE CONDITIONS

CLAIM OF PRIORITY

This Application claims the benefit of priority of Indian Provisional Application Number 202441100011, filed Dec. 17, 2024, which is hereby incorporated by reference in its entirety.

TECHNICAL FIELD

This disclosure generally describes devices, systems, techniques, and methods related to machine learning and/or artificial intelligence (AI) processing, on the edge, of images of a physical space, such as a display arrangements (e.g., shelf arrangements, rack arrangements) in a store, restaurant, food and beverage service locations, vending machines, any locations where food is sold and/or distributed, any locations where beverages are sold and/or distributed, or other retail environments, to determine performance metrics for that physical space and/or determine compliance with key performance indicators (KPIs) or other business objectives.

BACKGROUND

In physical spaces, such as stores and other retail environments, relevant users may arrange products on racks, shelves, or other support structures. The products may be arranged according to planograms or other mappings/layouts for product displays. The relevant users may manually arrange the products in or on the physical space. They can then check the arranged products against the planograms or other mappings/layouts to check whether the products are properly arranged. These planograms, mappings, layouts, and the like may be important to any number of consumer/retail goods producers, and it may also be important to ensure they are properly arranged. Properly arranged and executed planograms provide, for example, optimal product placement and an effective way to promote sales. The relevant users in the physical space may perform other manual tasks to ensure that the products are properly displayed, arranged, and/or organized in the physical space. These types of tasks may be performed each day, multiple times a day, or whenever requested or needed.

The relevant users may perform audits, such as KPI audits, with respect to products that are arranged and placed within or on the physical space. Because these audits are manual, they can be time consuming and can result in reduced productivity of the relevant users. Sometimes, because the product placement and auditing is manual, it can restrict or otherwise limit visibility of in-store compliance. Moreover, because the auditing is a manual process, it can be challenging to reliably track what KPI audits have been performed and/or what results came out of the audits. Moreover, implementing a series of manual audits and potential revisions may be time consuming and may reduce an amount of time that a goods producer may have sell its goods.

SUMMARY

The disclosure generally describes technology for processing digital images and/or videos of a physical space to determine performance metrics for that physical space. More particularly, machine learning models and/or AI can be leveraged to process the images (and/or the videos) on the edge (especially at low-power devices) and glean insights about the physical space, such as performance metrics with respect to the products on the physical space that may be located in a store, restaurant, food and beverage service location, vending machine, any location where food is sold and/or distributed, any location where beverages are sold and/or distributed, or other retail environment. The disclosed technology can provide real-time or near real-time insights on one or more compliance KPIs, including but not limited to planogram compliance and product space usage compliance. As a result of deploying the disclosed technology on the edge for physical spaces at locations such as stores, store execution may be improved, thereby driving top line sales growth and/or merchandizer productivity.

Conventional systems may be used to capture images of the products on the physical space in the store and provide those images to relevant users for their manual review and analysis. The conventional systems exhibit technical problems in that they do not provide fast, efficient, and automated image processing to glean real-time insight about KPI compliance and other types of compliance for the particular store. The disclosed technology provides technical solutions to such technical problems. For example, the disclosed technology provides real-time analysis and processing of the images in real-time on the edge using edge computing devices. Edge processing provides lightweight and fast results with the available compute resources, thereby allowing for relevant and accurate results in real-time, or near real-time. As a result of edge processing, users can receive real-time insights about whether the particular store, particular physical spaces in the store, and/or particular products in the store comply with various criterion and/or expected conditions for the store. Using such real-time insights, the users can plan and make adjustments to the store, the physical spaces, and/or the products such that the store remains in compliance at all times. An additional technical solution achieved by the disclosed technology includes the plurality of machine learning models being compressed and deployed on the edge for efficient and lightweight execution. Compressing the models does not cause reduction in quality of the model(s), but rather allows for the model(s) to be readily packaged, deployed, and executed on different edge devices while maintaining accuracy and quality in generating predictions and other outputs. Moreover, deploying the models at the edge allows for insights to be generated in real-time and on the fly, even when network communications are weak or nonexistent. This technical solution allows for the insights to be determined regardless of any networking interruptions, which is not realized by the conventional systems that lack lightweight edge deployment of machine learning models to generate real-time insights about the store. Additionally, the disclosed technology may not be reasonably performed in the human mind, as the human mind is incapable of continuously receiving and processing hundreds to thousands of images from different stores in different geographic regions/locations, analyzing those images against historic images, rules, one or more criteria, KPIs, etc. as a plurality of machine learning models would in parallel execution, and then generating relevant output including recommendations to adjust products, shelving, displays, arrangements, and/or the store in real-time.

In an illustrative example of the disclosed technology, an image processing pipeline with machine learning and/or AI capabilities may be deployed and executed at a user computing device (e.g., mobile device). The mobile device, whether connected to a network or offline, may capture images of products in or on a physical space. Using the image processing pipeline, which has been deployed at the mobile device, the mobile device may automatically, on the edge, process the images to recognize products therein, perform one or more compliance checks, generate a KPI analysis and/or recommendations based on the compliance checks, and then output the analysis and/or recommendations in one or more graphical user interface (GUI) displays at the mobile device. A user of the mobile device may then review the outputted information and decide what actions to take to improve activities in or on the physical space (e.g., rearranging products, moving products to different shelves, grouping together certain products, adding or removing products).

Machine learning models may be generated, pretrained, retrained, and/or iteratively trained to perform any of the described techniques (e.g., recognizing or identifying products from images, recognizing product prices, recognizing particular logos, performing compliance checks, analyzing against compliance KPIs). Generative AI techniques may also be employed to improve training of the machine learning models. The model training may occur at a backend computing system, such as a cloud system. The trained model(s) may be compressed according to standards for a particular type of mobile device that may be running the image processing pipeline. The compressed model(s) may then be rolled out to the mobile device when a network connection is established between the backend computing system and the mobile device. The mobile device may then efficiently deploy the image processing pipeline with such lightweight but accurate compressed model(s) on the edge, regardless of whether the mobile device has a network connection, to perform the disclosed techniques.

One or more embodiments described herein may include method for edge-based assessment of conditions associated with a location, the method including: executing, by an edge computing device, instructions to run an image processing pipeline at the edge computing device, capturing, by the edge computing device, one or more images of products and fixtures associated with the location, and for each image of the one or more images: determining, by the edge computing device and based on processing the image, conditions associated with the location, determining, by the edge computing device, whether the conditions associated with the location satisfy one or more KPI analyses or predetermined objectives for the location, generating, by the edge computing device, one or more recommendations for improving the conditions associated with the location based on a determination that the conditions associated with the location do not satisfy the one or more KPI analyses or predetermined objectives for the location, and returning, in one or more graphical user interface (GUI) displays at the edge computing device, at least the one or more recommendations for improving the conditions associated with the location.

In some implementations, the embodiments described herein may optionally include one or more of the following features. For example, executing, by the edge computing device, the instructions to run the image processing pipeline at the edge computing device may include running the image processing pipeline in an existing mobile application that is launched at the edge computing device. Executing, by the edge computing device, the instructions to run the image processing pipeline at the edge computing device may include running the image processing pipeline in a mobile application that is provided by the backend computer system. Executing, by the edge computing device, the instructions to run the image processing pipeline at the edge computing device may include deep linking an existing mobile application at the edge computing device to the image processing pipeline.

The method may also include, for each image of the one or more images: applying, by the edge computing device, a product recognition model of a group of compressed machine learning models to the image, and receiving, by the edge computing device, model output based on applying the product recognition model, the model output including indications of the products that were recognized in the image by the product recognition model. The method may include, for each image of the one or more images: applying, by the edge computing device, at least a portion of the group of compressed machine learning models to the model output, and determining, by the edge computing device and based on applying the at least a portion of the group of compressed machine learning models to the model output, the conditions associated with the location. The product recognition model may be trained in a process that includes: receiving, by a backend computer system, at least images of the products associated with the location, generating, by the backend computer system, a bounding box around one or more products in the images using object detection techniques, annotating, by the backend computer system and based on user input from the edge computing device, the one or more products in the respective bounding box of the images to identify the one or more products, providing, by the backend computer system, the annotated images as training data to the product recognition model, training, by the backend computer system, the product recognition model based on the training data to identify the one or more products that were annotated by the backend computer system in other images, assessing, by the backend computer system, accuracy of the trained product recognition model, identifying, by the backend computer system and based on determining that the accuracy of the trained product recognition model exceeds a predetermined threshold level of accuracy, edge device deployment information, compressing, by the backend computer system, the trained product recognition model for edge deployment based on the identified information, and returning, by the backend computer system, the compressed product recognition model. Returning the compressed product recognition model may include transmitting the compressed product recognition model with instructions to one or more network-connected edge computing devices to execute the compressed product recognition model on the edge.

In some implementations, the product recognition model may be trained in a process that includes: receiving, by a backend computer system, at least images of a product in one or more dimensions, identifying, by the backend computer system, packaging artwork of the product in a first dimension using object detection techniques, annotating, by the backend computer system, the packaging artwork in the first dimension in the images, reconstructing, by the backend computer system, the packaging artwork in N dimensions based on applying generative artificial intelligence (AI) techniques to the annotated images of the packaging artwork in the first dimension, providing, by the backend computer system, the reconstructed packaging artwork in the N dimensions as training data to the product recognition model, training, by the backend computer system, the product recognition model to identify products in the N dimensions in other images, and returning, by the backend computer system, the trained product recognition model.

Sometimes, applying, by the edge computing devices, at least a portion of the group of compressed machine learning models to the model output may include applying a product measurements model to the model output to identify measurements of the products relative to measurements of the fixtures associated with the location, and determining, by the edge computing device and based on applying the at least portion of the group of compressed machine learning models to the model output, conditions associated the location may include identifying placement of the products associated with the location based on the identified measurements of the products relative to the identified measurements of the fixtures associated with the location.

As another example, determining, by the edge computing device, whether the conditions associated with the location satisfy one or more KPI analyses or predetermined objectives for the physical space may include determining whether the products are arranged in the fixtures according to a planogram for the location. Generating, by the edge computing device one or more recommendations for improving the conditions associated with the physical space may include: generating instructions to add or remove a predetermined quantity of at least one product associated with the location. Generating, by the edge computing device one or more recommendations for improving the conditions associated with the location may include: generating instructions to move a predetermined quantity of at least one product associated with the physical space from a current fixture to another fixture associated with the physical space.

In some implementations, the method may also include: receiving, at the edge computing device, user input indicating a user identification of at least one product amongst the products and transmitting, by the edge computing device to the backend computer system, at least the user input and the model output. The backend computer system may be configured to perform a retraining process of the product recognition model, the retraining process including: performing a quality assessment of the model output based on (i) the user input and one or more model accuracy criteria and (ii) a data drift detection technique, determining whether the quality assessment satisfies one or more quality criteria, determining, based on a determination that the quality assessment does not satisfy the one or more quality criteria, whether sufficient image samples are available for retraining the product recognition model on the at least one product for which accuracy of the model output was below a predetermined threshold level, invoking, based on a determination that insufficient image samples are available, a synthetic data module to generate synthetic image samples of the at least one product, and retraining the product recognition model based on at least the synthetic image samples of the at least one product until the accuracy of the model output meets or exceeds the predetermined threshold level.

The at least portion of the group of compressed machine learning models may be applied, by the edge computing device, in parallel. The at least portion of the group of compressed machine learning models may be applied, by the edge computing device, in series. The fixtures associated with the location may include racks or shelves. Sometimes, at least one of the capturing, the applying, the receiving, the applying, the determining, the determining, the generating, or the returning operations may be performed on the edge when the edge computing device may be disconnected from a network. The products may include a food product. The fixtures may include at least one of shelves, racks, freezers, or coolers.

One or more embodiments described herein may include a system for edge-based assessment of conditions associated with a location, the system including: a backend computer system that may be configured to (i) train machine learning models and (ii) provide an image processing pipeline for edge deployment, and an edge computing device that may be configured to: receive, over a network connection with the backend computer system, the machine learning models and instructions to execute the image processing pipeline at the edge computing device, execute the instructions to run the image processing pipeline at the edge computing device, capture one or more images of products and fixtures associated with the location, and for each image of the one or more images: identify, based on applying at least a portion of the machine learning models to the image, conditions associated with the location in the image, generate output based on the identified conditions associated with the location, and return, the output for presentation in one or more graphical user interface (GUI) displays at the edge computing device.

The system may optionally include one or more of the following features. For each image of the one or more images, the edge computing device may be further configured to: apply a product recognition model of the machine learning models to the image, receive model output based on applying the product recognition model, the model output including indications of the products that were recognized in the image by the product recognition model, apply at least a portion of the machine learning models to the model output, and identify, based on applying at least the portion of the machine learning models to the model output, the conditions associated with the location in the image. The backend computer system may be configured to train the product recognition model using a process that may include: receiving images of the products associated with the location, the products including at least one of food products or beverages, generating a bounding box around one or more products in the images using object detection techniques, annotating the one or more products in the respective bounding box of the images to identify the one or more products, providing the annotated images as training data to the product recognition model, training the product recognition model based on the training data to identify the one or more products that were annotated in other images, compressing the trained product recognition model for edge deployment, and returning the compressed product recognition model. Returning the compressed product recognition model may include transmitting the compressed product recognition model with instructions to the edge computing device when the edge computing device may be connected to a network via the network connect.

Sometimes, applying at least the portion of the machine learning models to the image may include applying a product measurements model to the image to identify measurements of products represented in the image relative to measurements of the fixtures associated with the location. Identifying, based on applying at least the portion of the machine learning models to the image, the conditions associated the location may include identifying placement of the products associated with the location based on the identified measurements of the products relative to the identified measurements of the fixtures associated with the location. The edge computing device may be further configured to: determine whether the conditions associated with the location satisfy one or more KPI analyses or predetermined objectives for the location. The edge computing device may be further configured to: based on a determination that the conditions associated with the location do not satisfy the one or more KPI analyses or predetermined objectives for the location, generate one or more recommendations for improving the conditions associated with the location, and return the one or more recommendations for presentation in the GUI displays at the edge computing device.

The devices, system, and techniques described herein may provide one or more of the following advantages. For example, the disclosed technology may leverage robust machine learning and AI techniques for accurately assessing conditions in a physical space. Numerous machine learning models may be trained, retrained, and iteratively trained to accurately detect and/or assess the conditions. The machine learning models may be trained using, e.g., local, regional, national, and/or global, data and reference trends gained from micro and/or macro levels. Moreover, the models may be compressed without losing accuracy or processing power, then deployed to mobile devices for on-edge execution. The compressed models may be small in size (e.g., less than 5 MB), whereas uncompressed models may be hundreds of MB or more.

The edge deployment at the mobile devices permits for real-time, lightweight, and accurate assessment of the conditions in or on the physical space, including generation of recommendations to improve the conditions of the physical space. The edge deployment may advantageously occur regardless of whether the mobile device is connected to a network. Performing analytics at the edge can reduce reliance on constant communication with centralized systems, thereby improving and enhancing autonomy of edge devices. The independence of the edge devices can improve the ability of the edge devices to make localized decisions and recommend immediate actions to improve conditions at any location of deployment. Moreover, edge computing can result in lower cloud processing costs due to a reduced need for extensive computational resources at centralized locations. Relying on centralized systems, such as cloud systems, for real-time analytics can expose the centralized systems to vulnerabilities in the event of a network failure. Edge computing, on the other hand, can provide a degree of resilience by allowing real-time local processing, even when network connectivity may be temporarily lost.

The ease of deploying such technology on the edge may also allow for increased scalability and usage across various physical spaces and/or types of mobile devices. The disclosed technology can thereby provide accurate compliance tracking at scale. Existing technologies, on the other hand, may face scalability challenges as volume of data increases such that strains on server resources can create potential for bottlenecks that hinder the existing technologies' ability to scale efficiently with growing data requirements.

Advantageously, the disclosed technology may include a low hardware load because product recognition and other processing techniques described herein are performed on the mobile devices (e.g., mobile devices such as smartphones), thereby allowing the load to be distributed between them, rather than requiring all data to be processed by a remote computing system. Traffic consumption may also be low using the disclosed technology since data traffic herein may include only periodically updating the machine learning models, updating system settings, and/or providing transaction statistics. Because the disclosed technology is lightweight and performed on the edge at the mobile devices, processing techniques described herein can be quickly performed, such as in a matter of seconds rather than minutes. The processing time may not be hindered regardless of whether the respective mobile device is connected to a network. Moreover, since the disclosed technology is lightweight and processing is performed quickly, the disclosed technology can provide fast educating time. In other words, the disclosed technology provides for automatic data collection for purposes or retraining the machine learning models and/or maintaining or improving overall processing accuracy.

The disclosed technology can provide streamlined processing and automation of activities such as audits and product placements/arrangements in physical spaces (e.g., stores). Such streamlined processing and automation can result in increased user activity (e.g., more store visits). Some existing technologies can raise latency concerns—without utilizing ML-based computer vision inference at the edge in real-time (e.g., on mobile devices of front-end or frontline staff in a store), there can be a significant latency in processing heavy image and video data. This delay can hinder the ability to respond within time constraints of a workflow for the front-end or frontline staff and may lead to unsatisfactory experience and repeated workflow steps for relevant users. Moreover, the existing technologies can provide continuous transmission of heavy image and video data packets to centralized/cloud servers, which can lead to increased bandwidth usage. This can be a challenge in low bandwidth environments, making it challenging where connectivity may not exist. Low-bandwidth environments may cause issues when, e.g., stores or other retail outlets, are located in regions with limited connectivity, no connectivity exists, or locations with high user traffic, which may severely slow down what otherwise may be a robust network. As different products may sell more or less frequently at different times or locations, low bandwidth environments may pose significant issues. As a result, the existing technologies can lead to sub-optimal decisions in real-time because correct ML inferences may not be available in real-time while executing the workflow. The disclosed technology can resolve such latency and bandwidth concerns, as described herein.

The disclosed technology can further provide consistent measurements and techniques for assessing performance of a physical space, including insight into competitive comparisons. The consistent techniques and streamlined processing can provide improved insight into governance and compliance standards for the physical space, including how and what remedial actions may or should be taken to remain within the governance and compliance standards. The consistent techniques and streamlined processing can also provide shared solutions with cost efficiency and reusability.

Moreover, the GUIs described herein and the streamlined deployment of the image processing pipeline at mobile devices may provide improved user experiences for frontline workers, thereby making it easy and efficient for the frontline workers to perform audits of the physical space. The disclosed technology provides easy to use mobile applications on the mobile devices (e.g., field devices) to capture and process conditions of the physical space (e.g., store conditions). The disclosed technology may also provide informative GUIs at the mobile devices in real-time or near real-time, which may provide accurate information about KPI and target management as well as in-store execution.

The disclosed technology may also provide for compiling robust and rich sets of data, which may be used to glean informative insights about the physical space and other physical spaces. Not only can such rich data be used for iteratively training and improving the machine learning and/or AI techniques described herein, the rich data can also be used for additional auditing and/or compliance use cases.

The following description refers to physical spaces, racks, support structures, shelves, and the like. For purposes of this description, they are meant to be synonymous and are meant to refer to any type of support on which or for which products offered for sale may be displayed.

The following description also refers to physical locations, stores, restaurants, food and beverage service locations, vending machines, any locations where food is sold and/or distributed, any locations where beverages are sold and/or distributed, retail environments, and the like. For purposes of this description, they are meant to be synonymous and are meant to refer to any type of location whether fixed or not (e.g., a mobile retail environment) that the physical spaces, racks, support structures, shelves, and the like may be associated with, e.g., located within, nearby, or otherwise associated with.

As another example, the disclosed technology may leverage the machine learning models described herein to generate operational recommendations to provide preferred or optimal environmentally-friendly approaches to completing operational tasks. For example, where the edge computing device generates one or more recommendations for improving the conditions associated with the physical space that includes instructions to add a predetermined quantity of at least one product associated with the location, the instructions may be directed to a "front-line" worker (a person who obtains the product from, for example a warehouse, delivers it to the store location, and places the product in the desired location). The instructions may be delivered in a manner such that the instructions for multiple stores may be "grouped" in a geographically similar location to reduce the distance and time spent driving to differing locations, which may reduce the use of non-renewable energy sources required to power the transporting vehicles.

The details of one or more implementations are set forth in the accompanying drawings and the description below. Other features and advantages will be apparent from the description and drawings, and from the claims.

BRIEF DESCRIPTION OF THE DRAWINGS

FIGS. 7A, 7B, and 7C are a flowchart of a process for runtime use of the image processing pipeline.

Figure 1A:
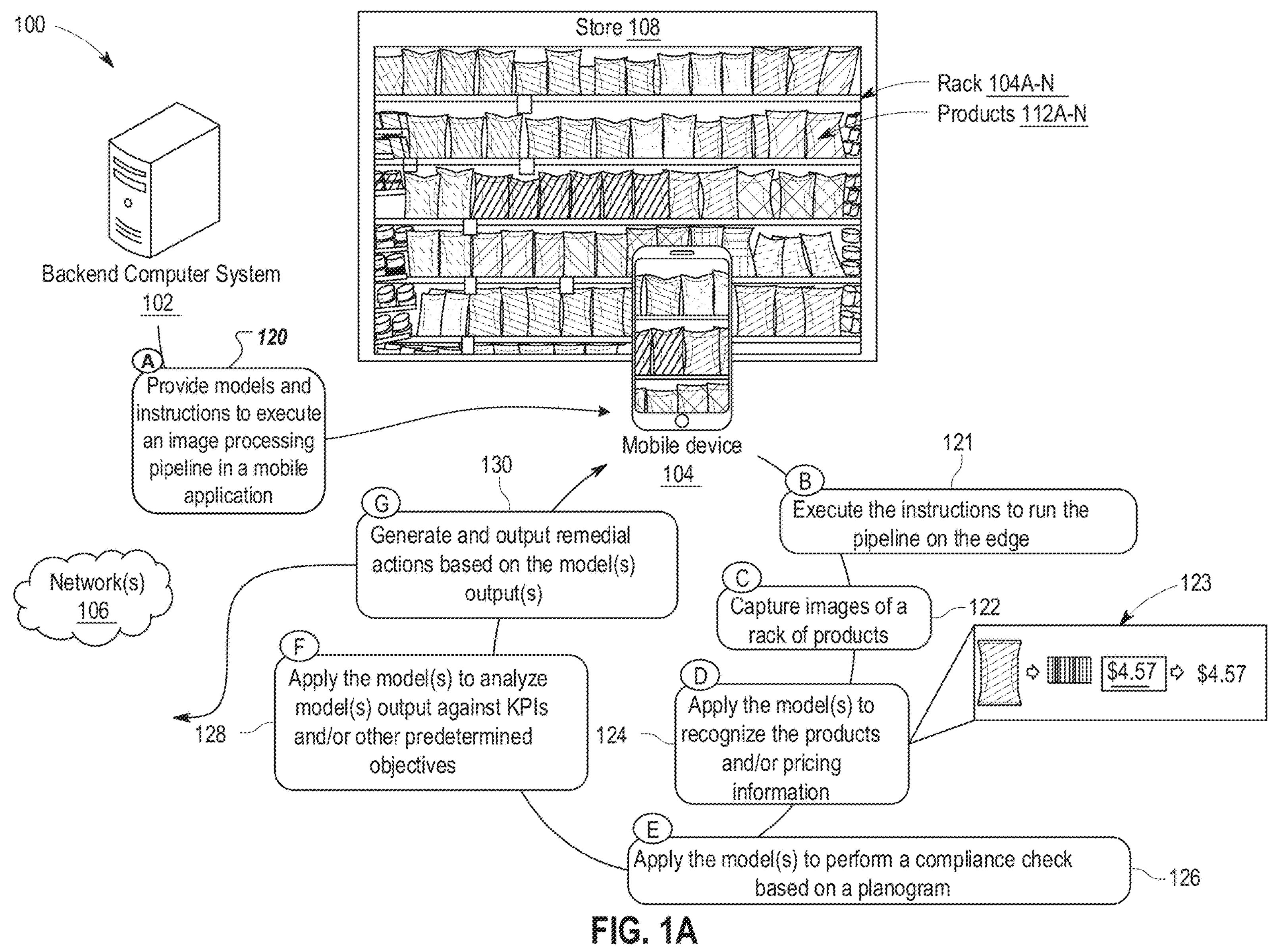
FIG. 1A is a conceptual diagram of a system for executing an image processing pipeline at a mobile device for real-time and edge assessment of in-store conditions.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to technology for a lightweight, edge-deployable image processing pipeline, which may be used to assess conditions of a physical space, such as a shelf or other structure used to support one or more products that may, in some instances, be located within a store, restaurant, food and beverage service locations, vending machines, any locations where food is sold and/or distributed, any locations where beverages are sold and/or distributed, or other type of retail environment. Although this disclosure generally describes the disclosed techniques from the perspective of a physical store, the disclosed techniques can similarly be applied to any other environment listed above. In brief, the pipeline may be executed at mobile devices located near, adjacent to, or in proximity to the physical space (e.g., within 20 feet of the physical space) and used to capture images of the physical space and then to assess the conditions of the physical space based on processing of the images. The image processing may be performed with a variety of trained machine learning models and/or generative AI techniques that are compressed and deployed at the mobile device. The conditions assessment may include checking the conditions in the physical space as captured in the images against compliance standards, planograms, KPIs, and/or other metrics. The conditions assessment may also include generating and providing recommendations at the mobile device to assist a relevant user in modifying or otherwise improving the conditions of the physical space.

The disclosed technology may be applied to a variety of use cases. For example, the disclosed technology may be used to assess in-store compliance regarding planogram compliance, out of stock (OOS), share of shelf (SOS), on shelf availability (OSA), price tag compliance, price tag monitoring (e.g., tracking product price to identify changes in pricing and or volume by using and processing output from the disclosed technology), and/or shopper marketing (e.g., assessing shopper engagement and/or interests by using and processing output from the disclosed technology).

The disclosed technology may also be used for price recognition/assessment, small format (e.g., SF) racks, which are racks and other types of structures that may be used in small stores or retail environments, including but not limited to bodegas, gas stations, and/or corner stores. For small stores and/or retail environments, output from the disclosed technology can be further processed to assess compliance with KPIs that are specific to the small stores and/or retail environments. As an illustrative example, a gas station SF racks may include under-shelf areas near a checkout. Output from the disclosed technology can be used to assess compliance of the under-shelf areas in the gas station.

Output from the disclosed technology may also be used for comparing to other product providers and/or competitors, and/or customer and/or supplier agreements (e.g., contract compliance). As an illustrative example, a customer development agreement can include requirements that a certain type of product be sold with a predetermined incentive (e.g., discount, rebate, credit, promotional offer, redemption codes, apparel, co-branding opportunities). The output from the disclosed technology can be further processed to determine whether the predetermined incentive is applied in a particular store to the certain type of product in the agreement. As a result, the disclosed technology can be used to automatically and efficiently determine compliance with various types of agreements, including but not limited to customer and/or supplier agreements.

Although this document generally describes illustrative examples that apply to stores and similar retail environments, the disclosed techniques may also be applied to other physical locations, including but not limited to commercial buildings, homes, apartment buildings, and/or outdoor spaces.

Referring to the figures, FIG. 1A is a conceptual diagram of a system 100 for executing an image processing pipeline at a mobile device 104 for real-time and edge assessment of in-store conditions. The system 100 may include the mobile device 104 and a backend computer system 102, which may communicate (e.g., wired, wirelessly) via network(s) 106. The disclosed image processing pipeline may be executed at the mobile device 104 when the mobile device 104 is not connected to the network(s) 106, thereby allowing for real-time edge deployment. The image processing pipeline may also be executed at the mobile device 104 when the mobile device 104 is connected to the network(s) 106. Refer to FIGS. 3A, 3B, 3C, 3D, and 3E for further discussion about example implementations of the image processing pipeline.

The mobile device 104 may be any type of computing device, including but not limited to a user device, a smartphone, a mobile phone, a tablet, a laptop, another handheld device, and/or an edge computing device.

The backend computer system 102 may be any type of computing system, network of computing systems, and/or cloud-based system. The backend computer system 102 may be configured to facilitate execution of the image processing pipeline on the edge at the mobile device 104. The backend computer system 102 may pre-train, train, retrain, and/or iteratively train any machine learning models described herein, then deploy the trained models at the mobile device 104 via the network(s) 106. The backend computer system 102 may also perform one or more image processing and/or condition assessment techniques remotely (e.g., in the cloud), such as to generate compliance reports (e, monthly reports and/or audits).

The system 100 may include a store 108 (e.g., a physical location, or any other type of location/environment described herein) having one or more physical spaces or racks 110A-N. The racks 110A-N may be any type of structure that is configured to support products 112A-N. The products 112A-N may be arranged on the racks 110A-N and available for purchase by users at a store 108 or at any location where the racks 110A-N are located. The products 112A-N may be arranged according to a planogram or other predetermined criteria. For example, the products 112A-N of a particular brand or logo may be grouped together on one or more of the racks 110A-N. The products 112A-N of a particular type may be grouped together. The products 112A-N having a particular packaging type and/or packaging artwork may be grouped together. Various other criterion and/or rules may be used to determine how and where the products 112A-N are placed on the racks 110A-N in the store 108.

Still referring to FIG. 1A, the mobile device 104 may be used in the store 108 by a relevant user, such as a frontline worker. To this end, it is contemplated that "in the store 108" also refers to and encompasses use of the mobile device 104 in proximity to the racks 110A-N and/or the products 112A-N and, as such, the mobile device may not necessarily be "in" a store 108 or physical location. Before the mobile device 104 is used to perform the disclosed techniques, the backend computer system 102 may provide models and instructions to execute the image processing pipeline in a mobile application to the mobile device 104 (block A, 120). The models may be compressed machine learning models that were trained using the techniques described herein (refer to FIGS. 2, 4A, 4B, 5A, 5B, 6A, and 6B). The mobile application can be an application that already exists at the mobile device 104 (refer to FIGS. 3A and 3D). The mobile application can be an application that is generated by the backend computer system 102 and provided to the mobile device to perform the image processing pipeline (refer to FIG. 3E).

The mobile application, as generated by the backend computer system 102 and described herein, can provide various functionality, including but not limited to product recognition capabilities, KPI compliance checks, image-capturing assistance, and additional features. The product recognition capabilities can include but are not limited to recognizing particular brands, logos, and/or types of products, offline image recognition (e.g., low latency in recognition), strip recognition, and/or automated equipment/rack/fixture detection. The KPI compliance checks can include cloud-based KPI calculations, in-app planogram compliance checks, and/or in-app KPI compliance checks. The image-capturing assistance can include image stitching (e.g., virtual stitching, landscape and/or portrait mode stitching), free form cropping, and/or blurry image detection. The other in-app features can include but are not limited to secure login functionality, surveys and/or questions for checks to be performed with regard to a particular physical location, customized store lists for a particular market and/or geographic location, gallery upload functionality, geolocation capturing (e.g., latitude and longitude), user feedback, translations to different languages, and/or planogram visualization. Any of the functionality described herein can also be provided by the backend computer system 102 to be deployed at existing mobile applications and/or web applications/web browsers. The point of deployment can vary depending on, as a merely illustrative example, user need and/or bandwidth limitations associated with certain locations of deployment.

In some implementations, the instructions and models, or a portion thereof, may only be transmitted when a network connection is established between the backend computer system 102 and the mobile device 104. Sometimes, the instructions and models, or a portion thereof, may be transmitted when either the instructions and/or the model(s) have been updated by the backend computer system 102. In yet some other implementations, the instructions and models, or a portion thereof, may be transmitted to the mobile device 104 at predetermined time intervals (e.g., once a day, once every 3 days, once every 4 hours). Sometimes, the instructions and models, or a portion thereof, may be transmitted to the mobile device 104 only when the mobile device 104 first requests to use the image processing pipeline on the edge (e.g., when a new mobile device is added to the network(s) 106 for the store 108). Transmission times may be optimized to, for example, reduce energy consumption, limit activity to times where bandwidth may exceed one or more predetermined levels/thresholds, and/or ensure peak transmission speeds.

The mobile device 104 may execute the instructions to run the pipeline on the edge, at the mobile device 104 (block B, 121).

Once the pipeline is running at the mobile device 104, the mobile device 104 may capture one or more images of the rack 110A-N of products 112A-N in the store 108 (block C, 122). The images may be static images. The images may include video. The images may be captured using existing image capturing components (e.g., cameras, mobile applications) of the mobile device 104. The images may additionally or alternatively be captured using image capturing techniques that may be integrated into the image processing pipeline and therefore available for use in the mobile application. Sometimes, the user of the mobile device 104 may only choose to capture one image. Sometimes the user may capture multiple images using the mobile device 104. Each image may be processed using the disclosed image processing pipeline on an image-by-image basis (and in parallel).

In block D (124), the mobile device 104 may apply the model(s) to the image(s) to recognize the products 112A-N and/or respective pricing information. Refer to FIGS. 4A, 4B, 6A, and 6B for further discussion about training the model(s) that may be used to recognize the products 112A-N and/or their respective pricing information. As shown in example 123, the model(s) may be used to identify a particular product (a bag of potato chips), to identify a unique identifier (e.g., barcode, QR code, RFID tag, electronic bottle cap sensors, other wireless tags) affixed to the particular product (i.e., the product packaging), and/or to identify a nearby product label on the rack 110A-N. The model(s) may then be used to correlate the unique identifier for the product with the nearby product label to positively determine what product has been identified and to determine accurate pricing information associated with that product.

In block E (126), the mobile device 104 may apply the model(s) to perform a compliance check based on a planogram for the rack 110A-N and/or for the store 108. The model(s) may be trained and used to determine measurements of the recognized products 112A-N, how much space on the rack 110A-N that the products 112A-N occupy, whether the products 112A-N are placed on the appropriate rack 110A-N, according to the planogram for the rack 110A-N and/or for the store, whether the products 112A-N should be rearranged on the rack 110A-N, etc. Refer to FIGS. 5A, 5B, 6A, and 6B for further discussion about training the model(s) to perform the techniques described in block E (126). In some implementations, instead of applying the model(s), the mobile device 104 may apply one or more rulesets and/or criteria in order to perform the compliance check.

The mobile device 104 may also apply the model(s) to analyze model(s) output(s) against KPIs and/or other predetermined objectives (block F, 128). The model(s) may be trained and used to perform one or more KPI and/or business analyses for the rack 110A-N and/or for the store 108. The KPIs can include, but are not limited to aisle KPIs, rack KPIs with fixed planograms, other rack KPIs, basket KPIs, linear share of shelf KPIs, missing count KPIs, and/or on shelf availability (OSA) list KPIs.

The aisle KPIs can include planogram compliance, such as an average of sequence compliance and/or facings compliance. The planogram compliance can be used to determine whether products are arranged correctly in the store 108. The sequence compliance can indicate whether products are in the right locations on the racks 110A-N in the store 108. The facings compliance can indicate whether correct products and their respective quantities are on the racks 110A-N in the store 108.

The aisle KPIs can include facings compliance, assortment compliance, and/or share of shelf (e.g., in facings). A share of shelf KPI can be determined as a number of a particular product facings that are recognized divided by a total number of facings recognized. Any output generated for the aisle KPI compliance checks can be provided as a numeric integer and/or a percent value. The rack KPIs with fixed planograms can include, but are not limited to, planogram compliance, facings compliance, and/or share of shelf (e.g., in facings). Any output generated for the rack KPIs compliance checks can be provided as a numeric integer and/or a percent value.

The other rack KPIs can include but is not limited to a total number of facings, which can comprise a number of facings detected in a rack or other fixture/physical space that is not associated with a particular brand, product, and/or product type. Any output generated for the other rack KPIs compliance check(s) can be provided as a numeric value or integer indicating the total number of facings detected. The basket KPIs can include a total number of facings (e.g., a total number of facings detected in a particular basket) and/or a number of facings based on brand, flavor, size, or other predetermined characteristics. Output generated for the basket KPIs compliance checks can be provided as a numeric value or integer indicating the total number of facings.

The linear share of shelf KPI compliance check can be determined as a total width of a particular product/type detected divided by a total width of all detections. The missing count KPI compliance check can be determined as a total number of facings that may be missing as compared to the planogram. The OSA list compliance check can. The OSA list KPIs may indicate, at a minimum, which products should be on a shelf and/or a minimum quantity of such products that should be on the shelf.

In some implementations, instead of applying the model (s), the mobile device 104 may apply one or more rulesets and/or criteria to analyze conditions in the store 108 against the KPIs and/or the other predetermined objectives.

The mobile device 104 may then generate and output remedial actions based on the model(s) output(s) (block G, 130). As part of the image processing pipeline, the mobile device 104 may generate and present one or more GUIs in the mobile application. The GUIs may include, but are not limited to, information about the recognized products 112A-N and their respective pricing information, determinations about whether the products 112A-N are appropriately placed (e.g. in the correct rack 110A-N, correctly arranged on the rack 110A-N) according to the planogram, KPI analyses and other business objective analyses, and/or recommendations to make improvements for the racks 110A-N and/or for the store 108. Refer to FIGS. 10A, 10B, 10C, 10D, 10E, 10F, 10G, 10H, 10I, 10J, 10K, 10L, 11A, and 11B for illustrative examples of the GUIs that may be presented in the mobile application at the mobile device 104.

Moreover, the mobile device 104 may generate the recommendations, which may be based upon assessing outputs from the blocks D (124), E (126), and/or F (128) against one or more rulesets and/or criteria. In some implementations, the mobile device 104 may apply another model to determine and generate the recommendations. The recommendations may include, but are not limited to, restocking the products 112A-N on the rack 110A-N, rearranging placement of the products 112A-N on the rack 110A-N, moving the products 112A-N to another rack 110A-N, capturing additional images of the products 112A-N on the rack 110A-N for rechecking purposes, etc.

In some implementations, the recommendations or other output provided herein can vary based on a type of the receiving user. For example, for frontend sales persons, the generated and outputted recommendations may include recommendations to rearrange products on a shelf, restock products on a shelf, and/or file gaps on the shelf with a next best product. The mobile device 104 may determine the next best product using one or more algorithms and/or rule sets. This determination can be based on historic product sales information, product pricing information, seasonal information, etc.

As another example, for sales leads and/or managers, output can be generated indicating how well the store 108 performs over one or more periods of time, whether one or more stores in the aggregate have the appropriate products on display, whether the store 108 is running out of or has run out of a particular product, sales forecasting for the store 108 over one or more periods of time, and/or recommendations for addressing any of the above scenarios or conditions with the store 108. As another example, for a compliance level of users, the output can include indications of whether the store 108 is in compliance with agreements with customers and/or suppliers. This output can include indications as to why the store 108 is not compliant. This output may include recommendations for ways to bring the store 108 in compliance with the agreement(s).

Once any of the information described above and/or the remedial actions are presented in the GUIs at the mobile device 104, the relevant user may provide user input. For example, the user may provide input indicating that the user accepted and acted upon at least one of the remedial actions. As another example, the user may provide input correcting one of the product recognitions and/or pricing information. Such user input may be provided to the backend computer system 102 and used for retraining and/or iteratively improving/training the model(s). Refer to at least FIGS. 8A and 8B for further discussion about the retraining.

In some implementations, and as a merely illustrative example, after the images are captured of the products 112A-N in the store 108, model analysis can be performed to recognize the products 112A-N, identify and/or classify SKUs of the products, and/or compare the recognized products/SKUs to a planogram for the store 108 (refer to blocks C, 122, D, 124, and E, 126). An out of stock report, for example, can be generated based on the model analysis (refer to block F, 128). The out of stock report can be transmitted to computing devices of relevant stakeholders, such as a computing device of a distributor. A relevant user in the store 108 (such as a frontline employee or other store worker) can receive the out of stock products from a delivery truck of the distributor and arrange or rearrange missing and/or misplaced products (including the out of stock products) based on suggestions that are provided to the relevant user via the mobile application at the mobile device 104. Sometimes, once the relevant user rearranges the products according to the suggestions, the relevant user can also use the mobile device 104 to capture new images of the rearranged products, to be processed again according to the disclosed techniques (refer to blocks C, 122, D, 124, and E, 126). Once the processing is performed again, the mobile device 104 can generate output including but not limited to reports of KPI compliance and/or other out of stock details (refer to block F, 128).

Figure 1B:
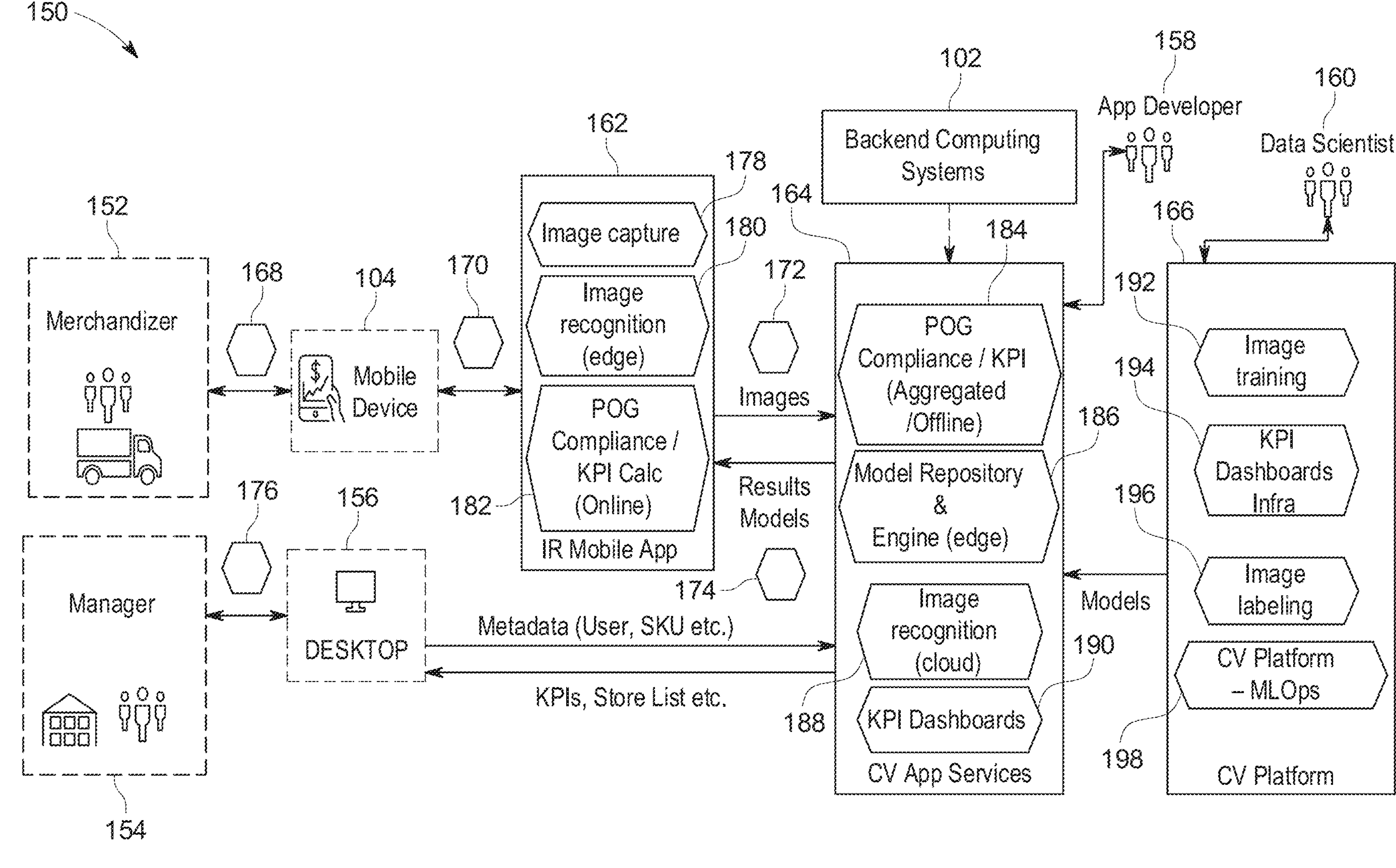
FIG. 1B is a conceptual diagram of a system architecture for executing the image processing pipeline of FIG. 1A.

FIG. 1B is a conceptual diagram of a system architecture 150 for executing the image processing pipeline of FIG. 1A. Blocks 168, 170, and 172 illustrate example use of a mobile application 162 that executes the image processing pipeline. The mobile application 162 may be an existing mobile application installed on and deployed at the mobile device 104 (e.g., a user device). The mobile application 162 may also be a new mobile application that is provided by the backend computing system 102 to the mobile device 104 for installation and deployment. Blocks 176 and 174 illustrate an example pipeline for building, training, retraining, and/or iteratively training any of the machine learning models described herein.

The mobile application 162 may include modules for image capture (178), image recognition on the edge (180), and planogram compliance and/or KPI checks (182). In some implementations, the planogram compliance and/or KPI checks (182) may only be available at the mobile device 104 when a network connection is established between the mobile device 104 and the backend computer system 102.

The backend computer system 102 may include CV application services 164 and/or a computer vision (e.g., CV), or image recognition, platform 166. The CV platform 166 can be configured to perform image recognition techniques as described throughout this disclosure. The application services 164 may be serviced and/or updated by relevant users, including but not limited to application developers 158. The platform 166 may be serviced and/or updated by relevant users, such as data scientists 160.

The application services 164 may include modules for planogram compliance and/or KPI checks (184), a model repository and engine for the edge (186), image recognition on the cloud (188), and/or KPI dashboards (190). In brief, the planogram compliance and/or KPI checks module (184) may be configured to perform similar operations as the module 182 in the mobile application 162. The module 184 may be used to perform aggregated planogram compliance checks and/or KPI checks, such as when the mobile device 104 is offline or otherwise not in communication with the backend computer system 102 over a network connection. The model repository and engine module 186 may be accessed by the mobile application 162 of the mobile device 104 to retrieve models needed to perform operations in the image processing pipeline on the edge. For example, the module 186 may be accessed to retrieve a product recognition and/or pricing information model (which may be used by the image recognition on the edge module 180 of the mobile application 162). As another example, the module 186 may be accessed to retrieve models that may be used to perform the planogram compliance checks and/or KPI checks by the module 182 of the mobile application 162. The image recognition module 188 of the application services 164 may be used to perform product recognition techniques described herein on the cloud. The KPI dashboards module 190 may be configured to provide/update GUIs that may be displayed at relevant user devices (e.g., the mobile device 104, a desktop 156). In other words, the module 190 can present a KPI dashboard as described herein in the GUIs at the user devices.

The platform 166 of the backend computing system 102 may include an image training module 192, a KPI dashboards module 194, an image labeling module 196, and/or a platform-machine learning operations module 198. In brief, the image training module 192 may be used to train the machine learning models described herein to recognize products and/or pricing information in captured images. The KPI dashboards module 194 may be configured to perform operations to provide the KPI dashboards module 190 at the user devices. The image labeling module 196 may be used to annotate training data, such as training images, with relevant information for training the models described herein (refer to FIGS. 4A, 4B, 5A, 5B, 6A, and 6B).

The platform-machine learning operations module 198 may be configured to continuously check model accuracy and determine when to retrain the model to improve accuracy. As an illustrative example, once a model is trained and deployed, new products may be introduced to stores, which the model may not yet recognize. Lighting and other ambient conditions may also vary in the stores where the disclosed techniques are deployed, thereby causing the model to potentially loose accuracy in detecting correct products as well as the new products. Output from the model and user feedback/input from the user devices described herein can be provided to the module 198, which can check the model output and the user feedback against one or more rules to determine whether and how much the model is losing accuracy. The module 198 may check the model accuracy in a continuous loop and begin a retraining process once the module 198 detects that the model accuracy has dropped below a predetermined threshold level of accuracy. In some implementations, when new products are introduced into the stores, the module 198 can check whether the model has been trained for those new products (or other conditions, such as lighting) and if not, then the module 198 can determine to retrain the model.

Referring to blocks 168, 170, and 172 in FIG. 1B, a merchandizer 152 may interact with the mobile application 162 executing the image processing pipeline at the mobile device 104 (block 168). Interacting with the mobile application 162 may include capturing images of products in a store using the image capture module (178) (block 170). The mobile application 162 may leverage models that are available on the edge, such as when performing image recognition using the image recognition on the edge module (180). The mobile application 162 may also communicate with the backend computer system 102 over an established network connection (e.g., Internet, WIFI) (block 172).

Communication between the mobile device 104 and the backend computer system 102 may allow for cloud models to be accessed and used. This communication may also allow for image and/or data syncing between the mobile device 104 and the backend computer system 102. This communication may also allow for deploying updated models on the edge at the mobile device 104. As an illustrative example, the models may be trained at the platform 166, then stored in the model repository and engine module 186 of the application services 164 of the backend computer system 102. When a network connection is made between the backend computer system 102 and the mobile device 104, the mobile application 162 of the mobile device 104 may interface with the application services 164 to retrieve the generated/trained models. Then the mobile device 104 may perform the techniques described herein by leveraging the modules of the mobile application 162.

Referring to blocks 174 and 176 in FIG. 1B, a manager 154 associated with the store may use a web application, software, or other type of application at their desktop 156 (e.g., a mobile device, a user device, a computing device such as a laptop or tablet) to access aggregated data and/or reports about the store (block 176). The application may act as an interface to interact with the backend application services 164 (block 174). The desktop 156, through the application, may communicate with the application services 164 of the backend computer system 102 to retrieve KPI dashboards/GUIs from the KPI dashboards module 190. For example, the manager 154 may provide input in the application at the desktop 156 that includes metadata (e.g., user information, product SKUs, store codes, location data), which may be provided to the application services 164 and used by at least the KPI dashboards module 190. The KPI dashboards module 190 may generate reports and/or other information to be presented in GUIs back at the desktop 156, in the application. For example, the module 190 may identify which planograms and/or layouts result in movement of a largest volume of products and/or result in highest profit margins on a store-by-store basis (based on further retrieval and comparison of store data such as sales data and/or guest traffic levels). The module 190 may also generate output, such as a report, that provides the identified planograms and/or layouts. As a result, this type of information may be used by relevant stakeholders to optimize marketing and/or planogram/arrangement strategies on a store-by-store basis. The module 190 may generate and transmit information back to the desktop 156 such as KPIs, KPI compliance analyses, store lists, store specific pricing information, store specific volume information, etc.

The manager 154 may also interact with any of the information provided by the application services 164 of the backend computer system 102 that is presented at the desktop 156. For example, the manager 154 can provide user input at the desktop 156 to change what information is presented and/or how the information is presented. In some implementations, the manager 154 can review images that were captured and processed using the disclosed technology and provide input indicating whether correct products were identified in the images. The manager 154 may provide input indicating what products actually appear in the images. This input can be fed back to the backend computer system 102 and used in a correction loop for training and retraining the disclosed model(s). This input may also be used to update information presented in the dashboard(s) presented at the desktop 156. One or more KPIs may be recalculated based on the input provided by the manager 154. In some implementations, before updating the model, the dashboards, and/or KPI calculations, the backend computer system 102 can assess the input and determine for accuracy/truthfulness. Once the input is verified, the backend computer system 102 can perform any of these correction techniques.

Figure 2:
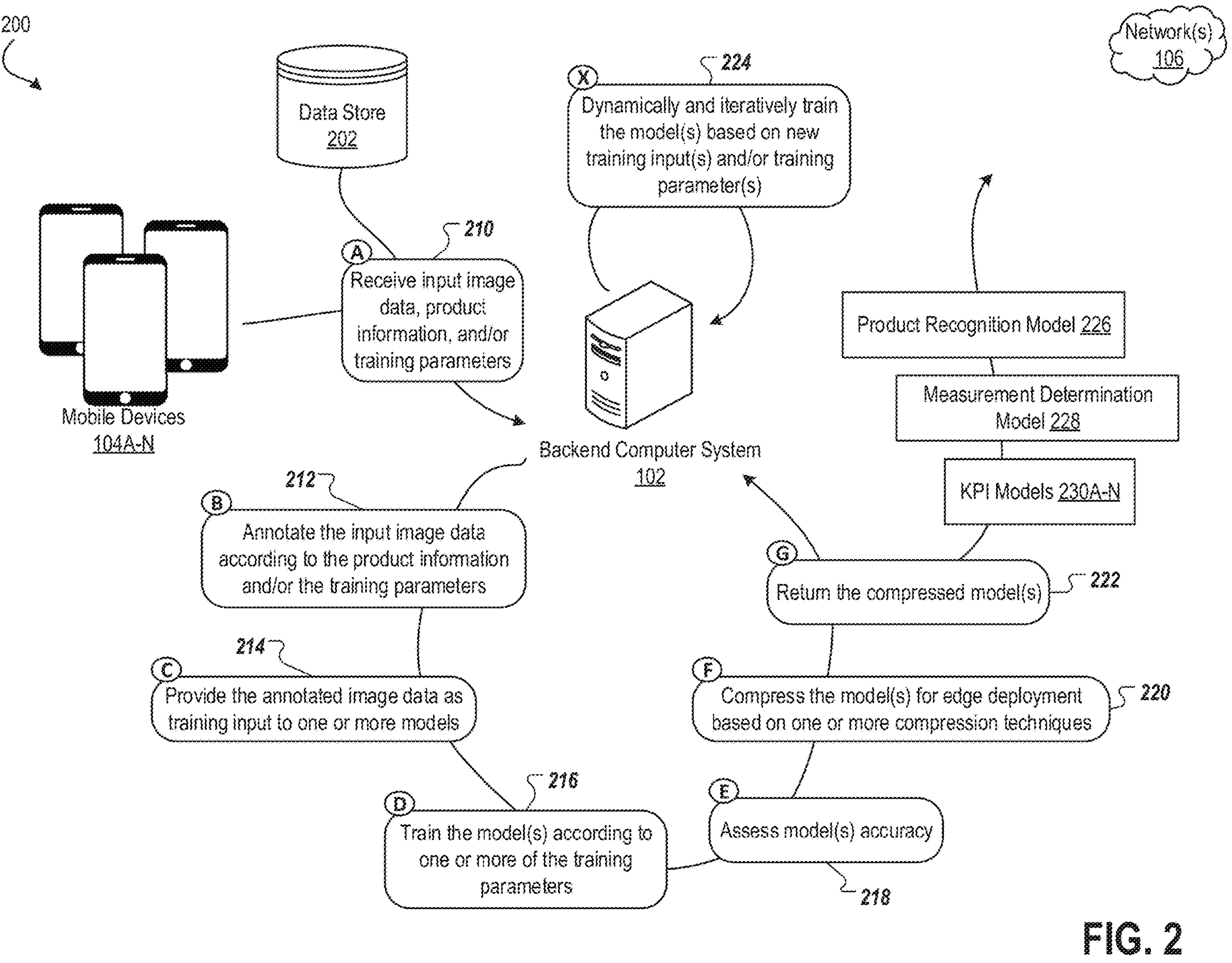
FIG. 2 is a conceptual diagram of a system for training machine learning models that may be used in the image processing pipeline described herein.
Figure 8A:
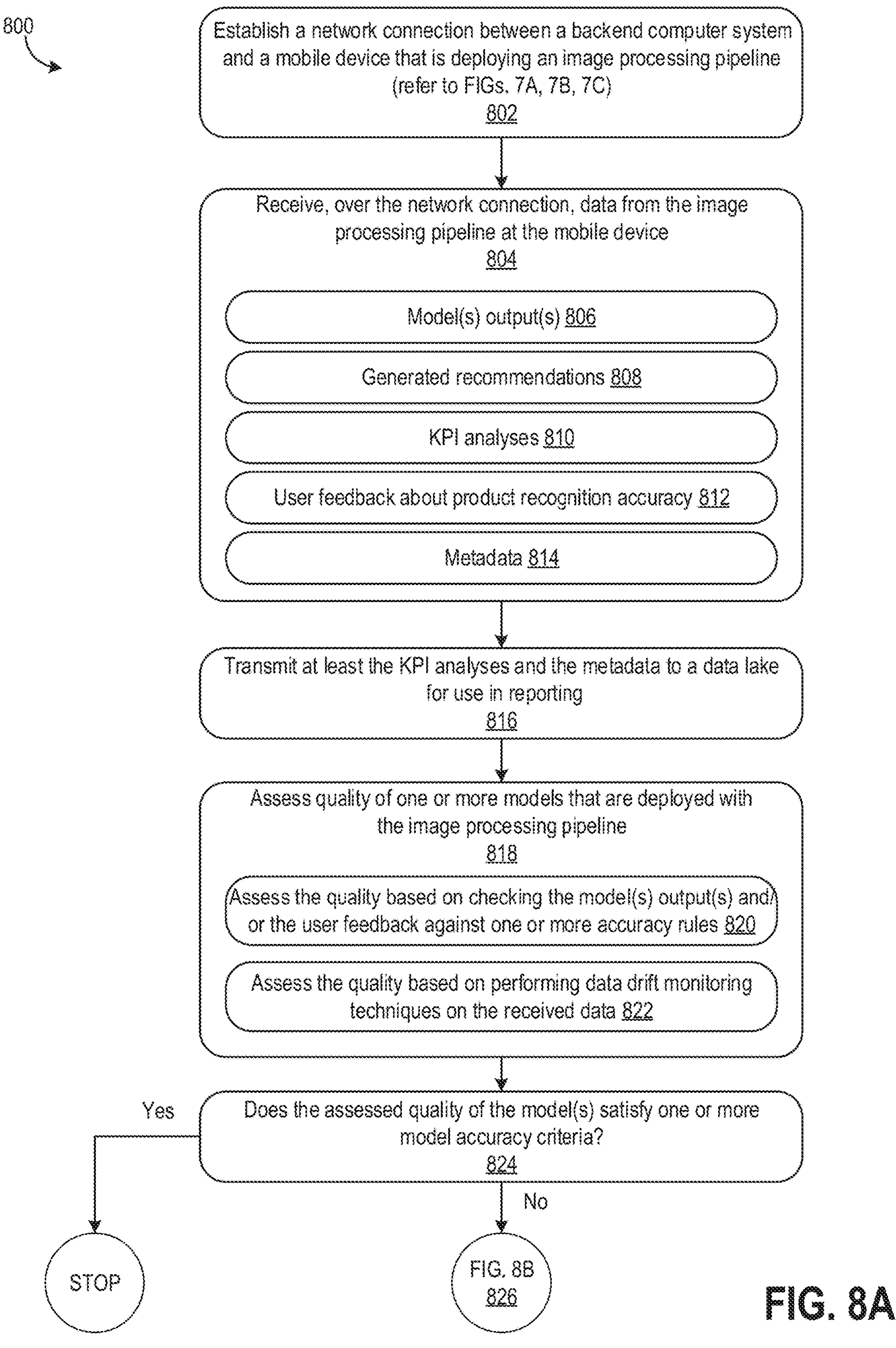
FIGS. 8A and 8B are a flowchart of a process for retraining one or more machine learning models based on runtime use of the model(s) in the image processing pipeline.
Figure 8B:
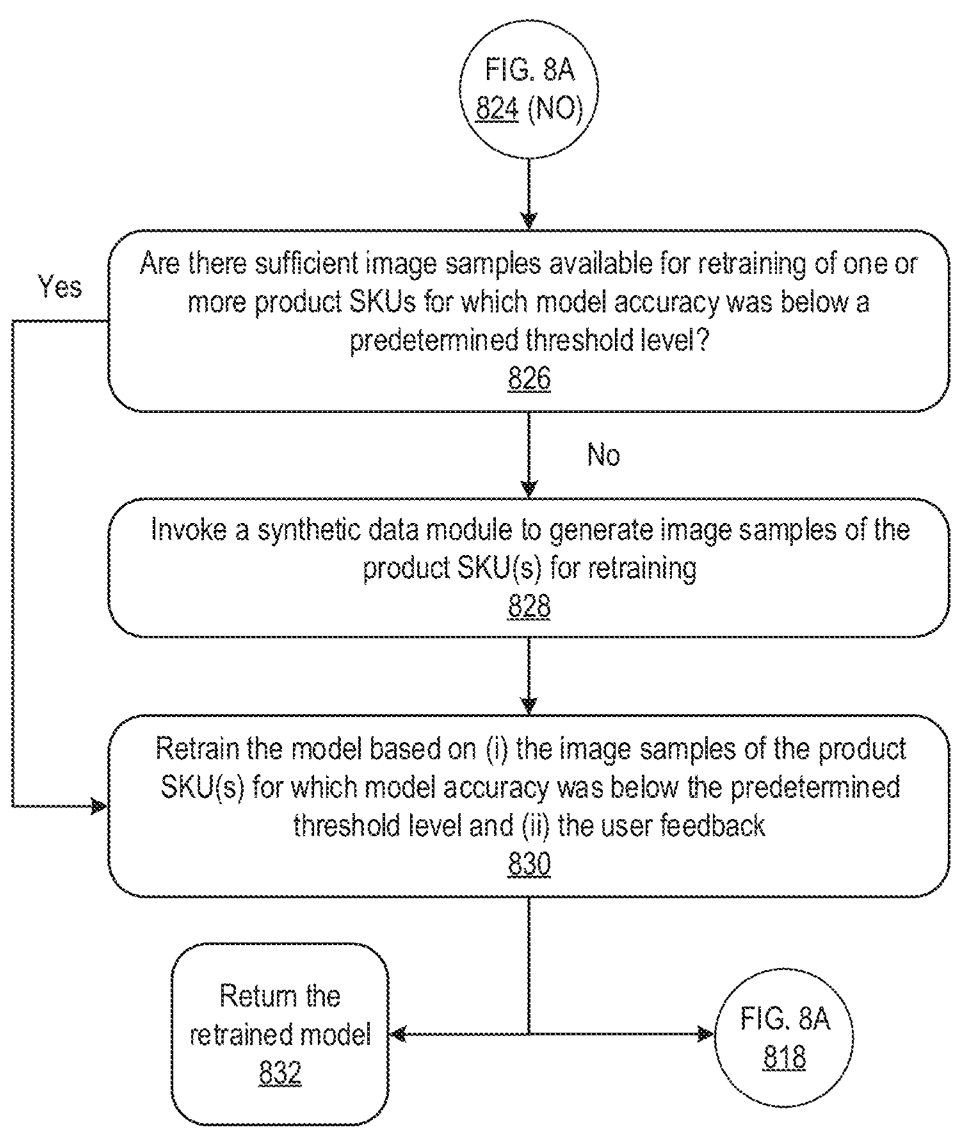
Figure 9:
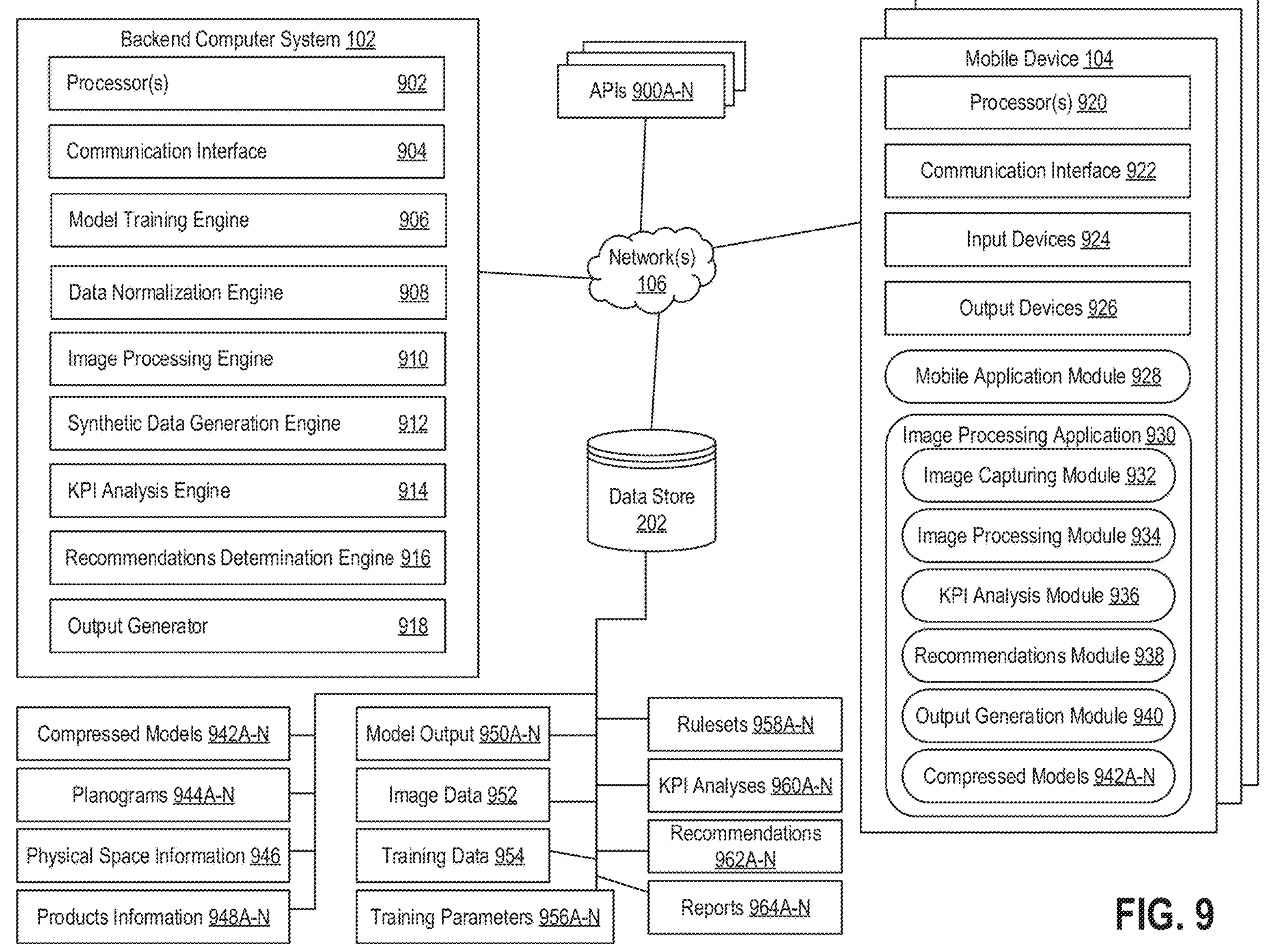
FIG. 9 is a system diagram of one or more system components that may be used to perform the disclosed techniques.

FIG. 2 is a conceptual diagram of a system 200 for training machine learning models that may be used in the image processing pipeline described herein. Model training techniques are described further in reference to FIGS. 4A, 4B, 5A, 5B, 6A, 6B, 8A, and 8B. In the system 200, the backend computer system 102 may communicate over the network(s) 106 with one or more mobile devices 104A-N and/or a data store 202. The data store 202 may be any type of data repository, data lake, and/or database. Refer to FIG. 9 for further discussion about the data store 202.

The backend computer system 102 may receive input image data, product information, and/or training parameters in block A (210) from the mobile devices 104A-N and/or the data store 202. Any of this received information may be used for pre-training, training, retraining, and/or iteratively improving the models described herein.

In block B (212), the backend computer system 102 may annotate the input image data according to the product information and/or the training parameters. The annotations may be made automatically by the backend computer system 102. For example, the computer system 102 may use AI techniques to annotate products, racks, and/or pricing information in the input image data. As another example, a relevant user may provide input at their computing device indicating annotations of products, racks, and/or pricing information in the input image data.

Figure 4A:
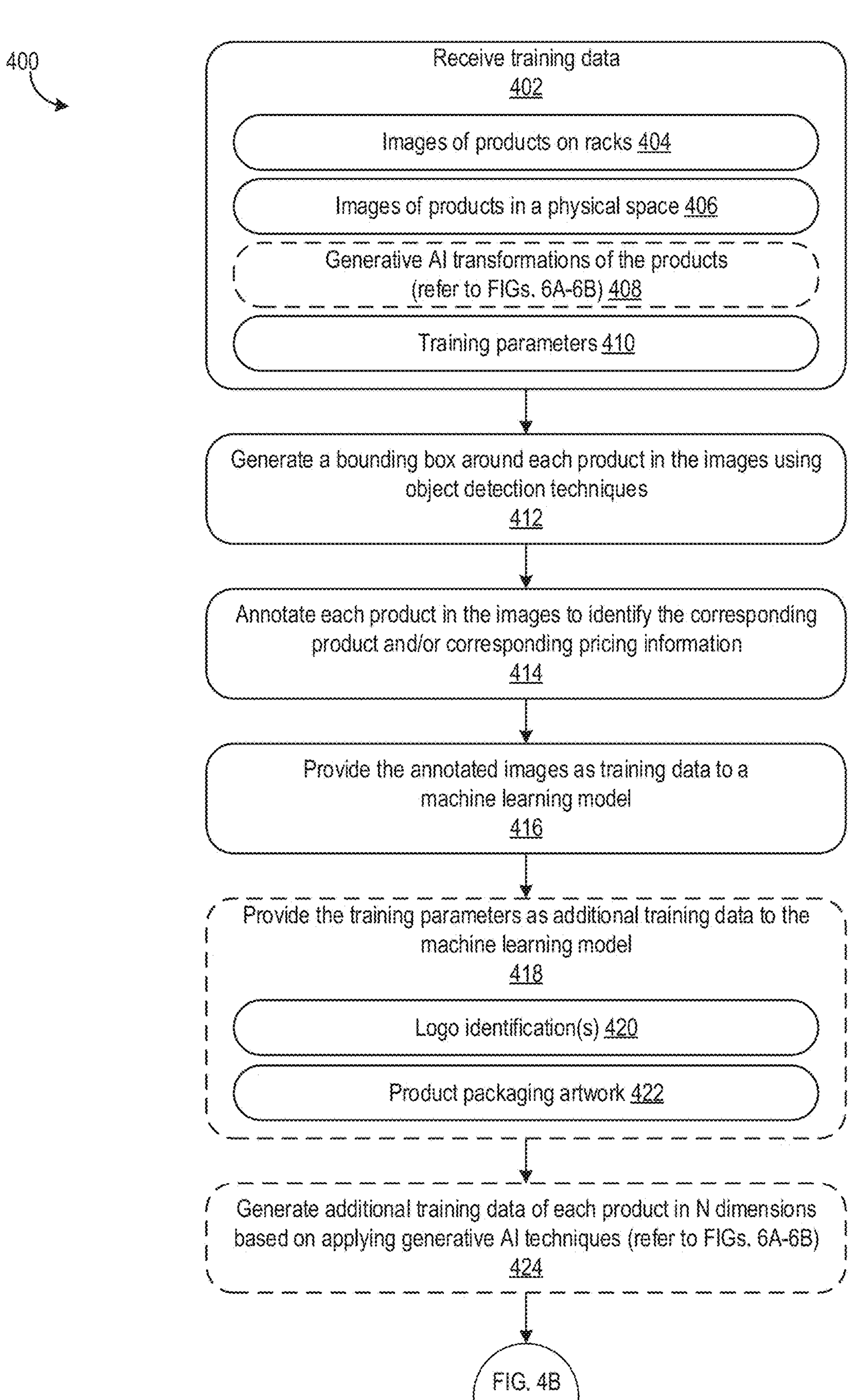
FIGS. 4A and 4B are a flowchart of a process for pre-training a product recognition model to be used in the image processing pipeline described herein.
Figure 4B:
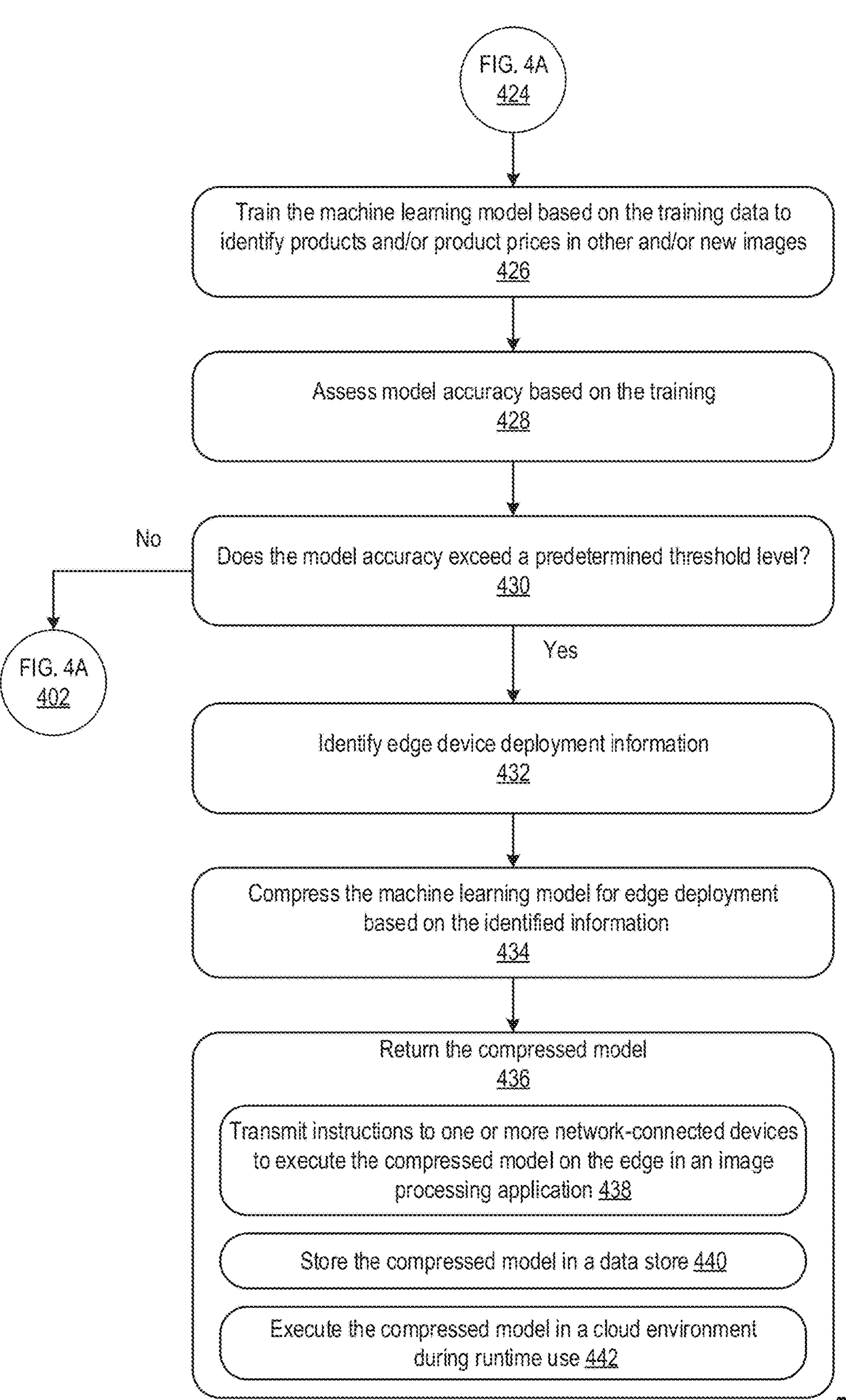
Figure 5A:
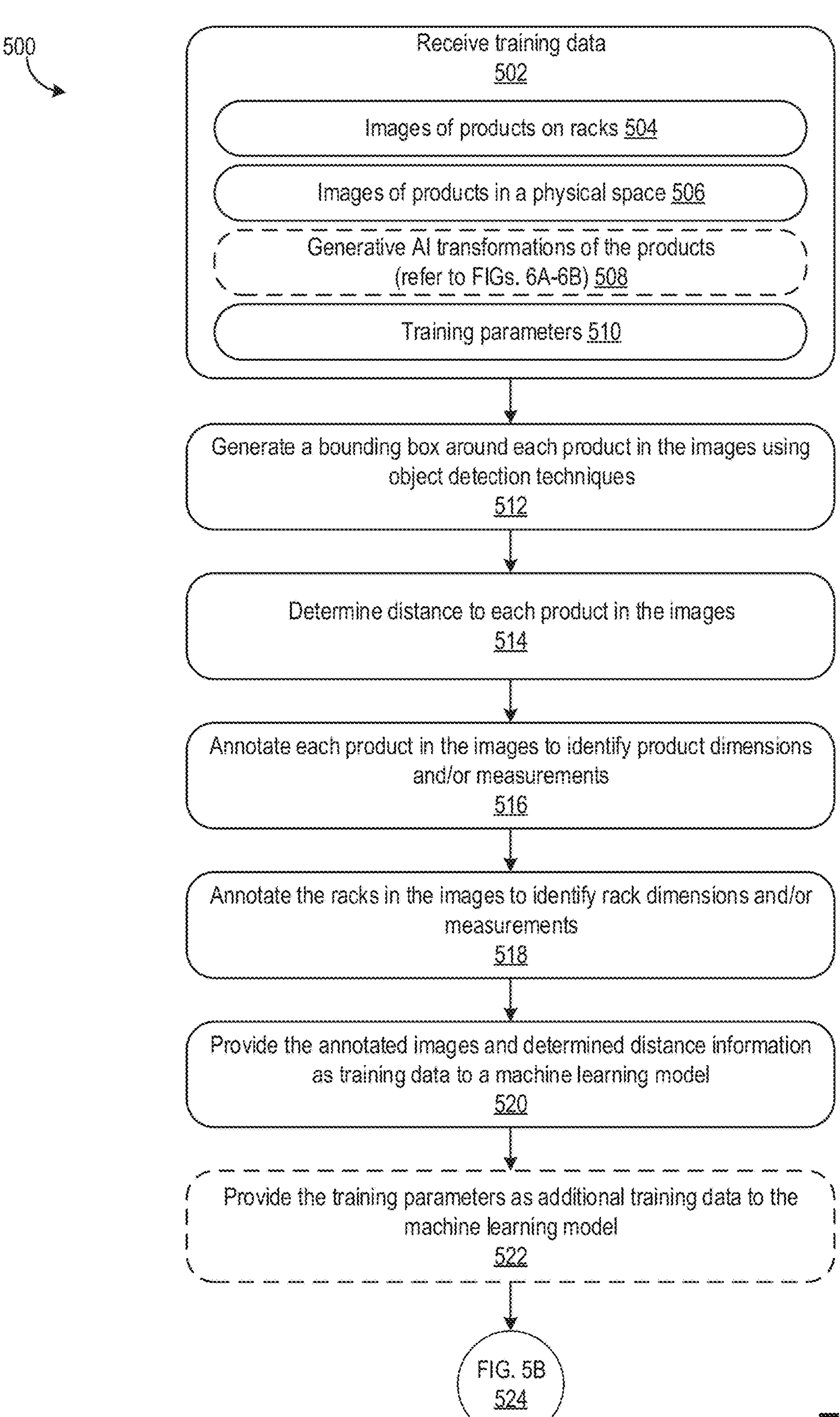
FIGS. 5A and 5B are a flowchart of a process for pre-training a measurements determination model to be used in the image processing pipeline.
Figure 5B:
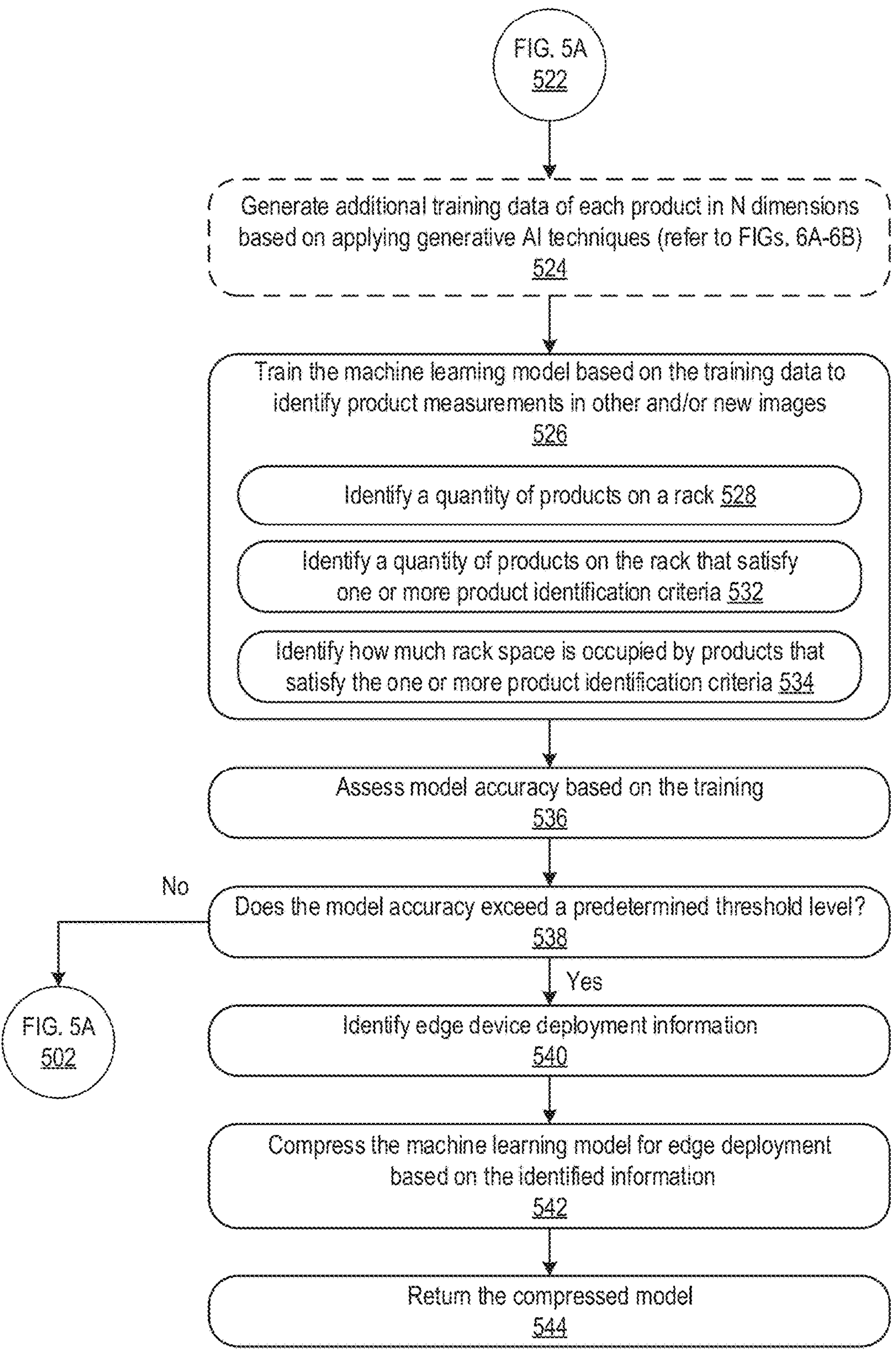

The backend computer system 102 may provide the annotated image data as training input to one or more models (block C, 214). Refer to FIGS. 4A and 4B for further discussion about training an illustrative product recognition and/or pricing model. Refer to FIGS. 5A and 5B for further discussion about training an illustrative product and/or rack measurements model. The models described herein are merely illustrative. One or more other models may also be generated and trained using the disclosed techniques.

Each of the models may be trained according to one or more of the training parameters in block D (216). The models can include various Neural Network architectures, including but not limited to convolutional neural networks (CNNs), concurrent convolutional neural network (R-CNN), Res-Net equivalents, and/or transformer models. Refer to FIGS. 4A, 4B, 5A, and 5B for further discussion about training parameters for different models.

The backend computer system 102 may assess the model(s) accuracy (block E, 218). Assessing the model(s) accuracy may include determining and assessing confidence levels of the model(s) in performing certain actions, such as detecting products and their pricing information. In block E (218), the backend computer system 102 may determine whether the model(s) achieves an accuracy level (or confidence level(s)) that exceeds a predetermined threshold level of accuracy. If the model(s) exceeds the predetermined threshold level, training of the model(s) may be complete at the time (although the model may be retrained and/or iteratively improved over time). If the model(s) does not exceed the predetermined threshold level, then the training process described in reference to FIG. 2 may be performed again until the model(s) accuracy improves. Refer to FIGS. 8A and 8B for further discussion about assessing the model(s) accuracy.

In block F (220), the backend computer system 102 may compress the model(s) for edge deployment, based on one or more compression techniques. Refer to at least FIGS. 4A and 4B for further discussion about the compression techniques.

The compressed model(s) may be returned in block G (222). Returning the compressed model(s) may include deploying the compressed model(s) to the mobile devices 104A-N for runtime use and application. The compressed model(s) may be deployed to the mobile devices 104A-N so long as the mobile devices 104A-N are connected to the network(s) 106. Returning the compressed model(s) may include storing the model(s) in the data store 202. The model(s) may then be retrieved and used by, at least, the backend computer system 102 for cloud-based processing. In some implementations, the backend computer system 102 may execute the full-size model(s) for cloud-based processing instead of the compressed model(s).

In block G (222), the backend computer system 102 may return models including but not limited to a product recognition model 226, a measurement determination model 228, and/or KPI models 230A-N. Any other models may be generated and used to perform the disclosed techniques.

Figure 3A:
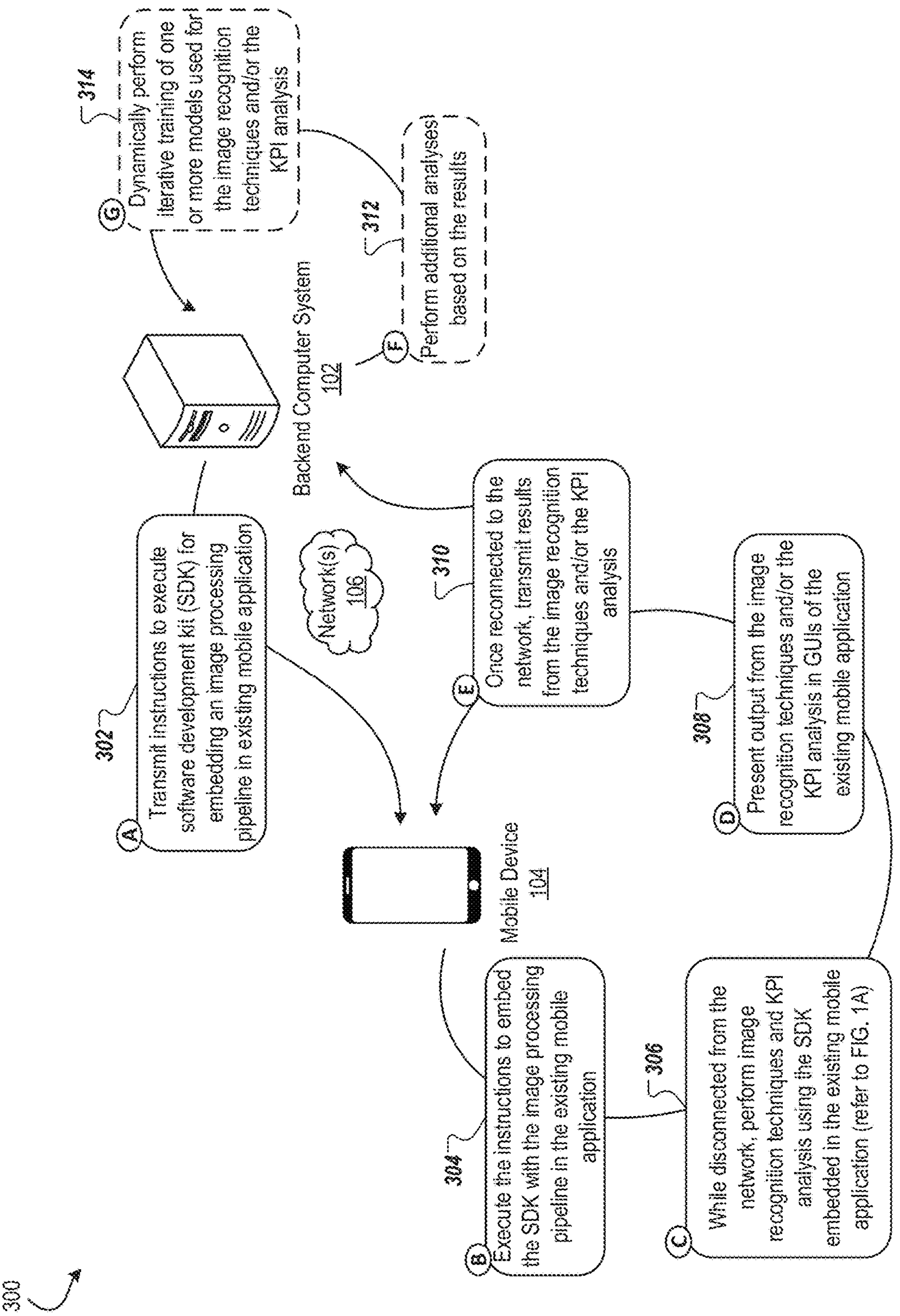
FIG. 3A is a conceptual diagram of a system for executing the image processing pipeline described herein in a mobile application on the edge at a mobile device, which may not be network-connected during runtime execution.

FIG. 3A is a conceptual diagram of a system 300 for executing the image processing pipeline described herein in a mobile application on the edge at the mobile device 104, which may not be network-connected during runtime execution. In the system 300, the mobile device 104 may execute the image processing pipeline on the edge during runtime without a network connection via the network(s) 106 to the backend computer system 102. Moreover, the image processing pipeline may be executed in any mobile application at the mobile device 104, such as an existing mobile application provided by a third party (e.g., a mature and/or complex mobile application that does not perform deep links) and/or a new mobile application provided by the backend computer system 102. The existing mobile application may not have image recognition functionality; however, executing the image processing pipeline therein may provide such functionality seamlessly to the mobile device 104. Moreover, models described herein to perform the image processing pipeline may be provided as an API service deployed in the existing mobile application. For example, one or more operations of the image processing pipeline (e.g., product recognition) may be made available on the cloud via real-time APIs, such as for third party mobile applications that may not consume a software development kit (SDK) described below and/or a full-scale mobile application generated and provided by the backend computer system 102.

Accordingly, in block A (302), the backend computer system 102 may transmit instructions to execute a SDK at an existing mobile application. The SDK execution instructions may be sent to the mobile device 104 when a network connection is established between the backend computer system 102 and the mobile device 104. The SDK execution instructions may be used to embed the image processing pipeline described herein into the existing mobile application at the mobile device 104. The SDK may include core engine components as a reusable application kit, which may be integrated with any other existing mobile applications. The SDK may therefore provide the image processing pipeline capabilities to those existing applications.

The mobile device 104 may execute the instructions to embed the SDK with the image processing pipeline in the existing mobile application (block B, 304).

While disconnected from the network (e.g., no Internet service or network connectivity via the network(s) 106), the mobile device 104 may perform image recognition techniques and KPI analyses using the SDK embedded in the existing mobile application (block C, 306). For example, the SDK may be used to capture images of products using the mobile device 104. The SDK may also be used to execute any of the models described herein to recognize the imaged products and/or generate KPI compliance checks. As a result, all such processing may be performed on the edge, at the mobile device 104, and without a network connection. Refer to FIGS. 1A, 7A, 7B, and 7C for further discussion about runtime use of the image processing pipeline described herein.

The mobile device 104 may present output from the image recognition techniques and/or the KPI analysis in GUIs of the existing mobile application (block D, 308). Refer to FIGS. 10A, 10B, 10C, 10D, 10E, 10F, 10G, 10H, 10I, 10J, 10K, 10L, 11A, and 11B for illustrative examples of the GUIs.

Once reconnected to the network(s) 106, the mobile device 104 may transmit results from the image recognition techniques and/or the KPI analysis to the backend computer system 102 (block E, 310). Sometimes, such transmission of information may occur at predetermined time intervals, such as every hour, every 4 hours, every 8 hours, once a day, twice a day, etc. Sometimes, such transmission of information may occur as soon as the mobile device 103 connects successfully to the network(s) 106.

The backend computer system 102 may optionally perform additional analyses based on the transmitted results in block F (312). For example, as described in reference to at least FIG. 1B, the backend computer system 102 may perform cloud processing of the captured images, perform one or more KPI compliance checks or other business objective checks, generate one or more reports for the store, and/or generate one or more dashboards of information for presentation in the GUIs at the mobile device 104.

The backend computer system 102 may optionally and dynamically perform iterative training of one or more of the models that may be used for the image recognition techniques and/or the KPI analysis (block G, 314). Refer to FIGS. 8A and 8B for further discussion about the iterative training and/or retraining of the models based on the results of edge-based processing at the mobile device 104.

Figure 3B:
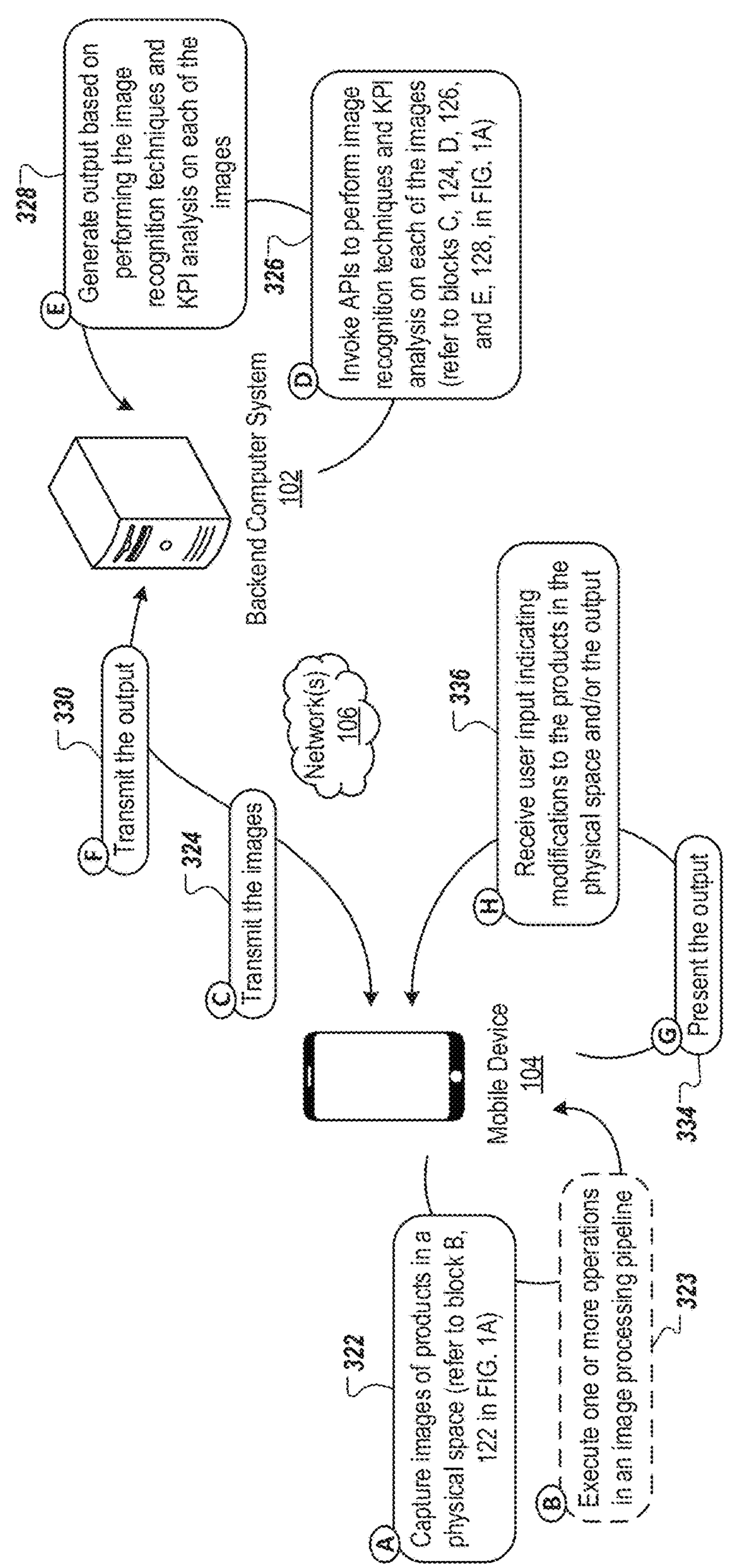
FIG. 3B is a conceptual diagram of a system for executing the image processing pipeline described herein using cloud processing techniques.

FIG. 3B is a conceptual diagram of a system 320 for executing the image processing pipeline described herein using cloud processing techniques. In the system 320, the backend computer system 102 and the mobile device 104 may be network connected via the network(s) 106. As a result of this network connection, one or more processes in the image processing pipeline may be performed in the cloud, at the backend computer system 102, as well as on the edge at the mobile device 104.

As shown in the system 320, the mobile device 104 may capture images of products in or on a physical space in block A (322). Refer to block B (122) in FIG. 1A for further discussion. The images may be captured using a camera at the mobile device 104. The images may be captured using a mobile application that is launched at the mobile device 104 and that accesses the camera. In some implementations, the mobile application may be an existing mobile application, as described in reference to at least FIG. 3A. In some implementations, the mobile application may be a new application that is generated and provided by the backend computer system 102. The application at the mobile device 104 may be a mobile application and/or a web-based application.

Optionally, the mobile device 104 may execute or otherwise perform one or more operations in the image processing pipeline in block B (323). For example, the mobile device 104 may perform product recognition techniques on the edge, then transmit results from these techniques to the backend computer system 102. The backend computer system 102 may then perform additional processing using those results, such as performing KPI analyses (e.g., compliance checks).

The mobile device 104 may transmit the captured images to the backend computer system 102 in block C (324). The images may be transmitted as they are captured. Sometimes, the images may be transmitted at predetermined time intervals and/or in batches. The application that is launched at the mobile device 104 may transmit the images to the backend computer system 102, and receive, in real-time or near real-time, analysis results that are generated by the backend computer system 102.

The backend computer system 102 may then perform cloud processing techniques in real-time or near real-time. For example, the backend computer system 102 may invoke one or more APIs to perform image recognition techniques and/or KPI analysis on each of the images (block D, 326). Refer to at least blocks C (124), D (126), and E (128) in FIG. 1A for further discussion.

The backend computer system 102 may also generate output based on performing the image recognition techniques and KPI analysis on each of the images (block E, 328). Such output may include, for example, recommendations and/or remedial actions that may be taken to improve conditions with respect to the rack and/or the physical space. The output may include one or more dashboards and/or GUIs described herein. Refer to at least FIGS. 1A, 10A, 10B, 10C, 10D, 10E, 10F, 10G, 10H, 10I, 10J, 10K, and 10L for further discussion.

The backend computer system 102 may transmit the output to the mobile device 104 in block F (330). The output may be transmitted in real-time or near real-time as it is generated. For example, the output may be transmitted for a particular image that was processed by the backend computer system 102. In some implementations, the output may be transmitted in batches or at predetermined time intervals, such as after a threshold number of images have been processed by the backend computer system 102.

The mobile device 104 may present the output in one or more GUI displays in block G (334).

The mobile device 104 may also receive user input indicating modifications to the products in/on the physical space and/or modifications to any of the output (block H, 336). The user input may also be transmitted to the backend computer system 102, for additional processing and/or training, as described in reference to FIGS. 8A and 8B.

Figure 3C:
FIG. 3C is a conceptual diagram of a system for executing the image processing pipeline described herein to generate compliance reports.
Figure 3C:
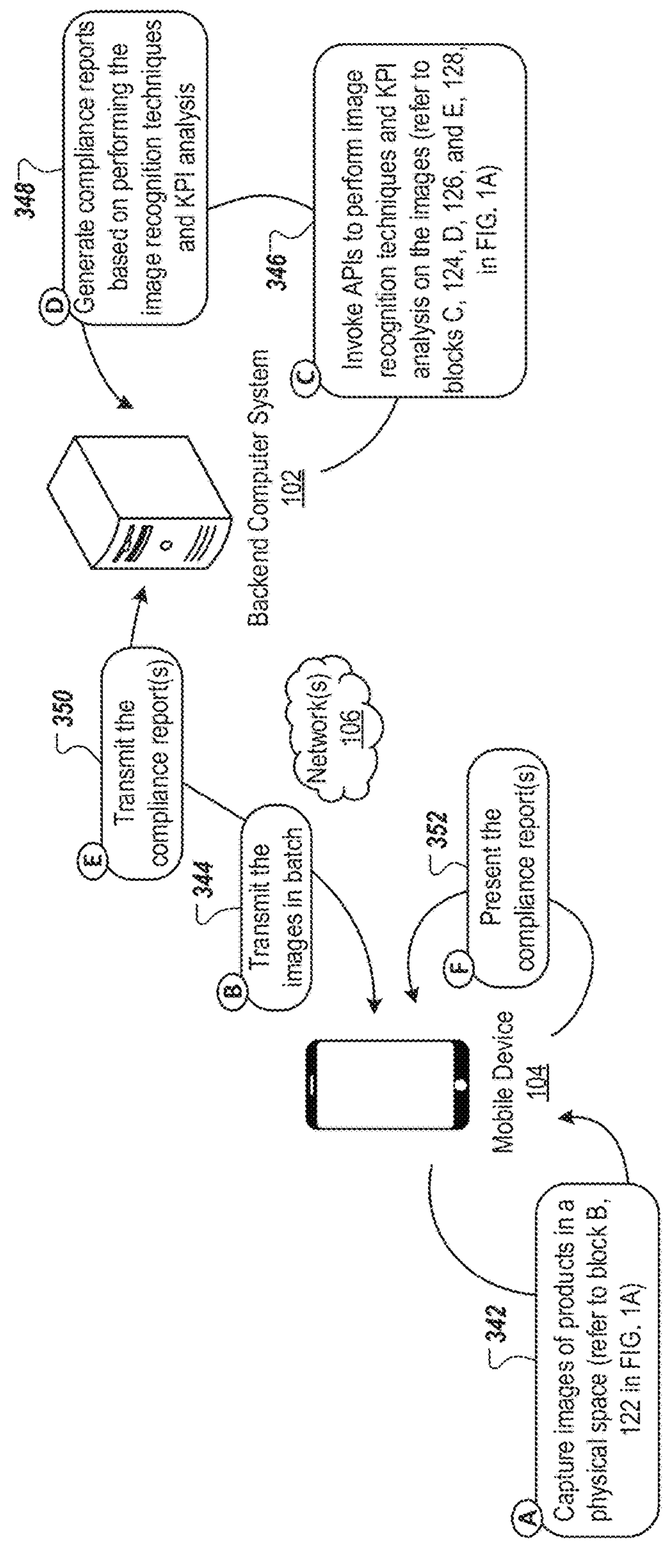

FIG. 3C is a conceptual diagram of a system 340 for executing the image processing pipeline described herein to generate compliance reports. The compliance reports may be generated in the cloud, such as by the backend computer system 102. In some implementations, the backend computer system 102 may execute one or more models described herein at predetermined time intervals in order to generate the compliance reports. For example, the backend computer system 102 may execute the models once a day, once every couple of hours, twice a day, etc. The techniques performed by the backend computer system 102 may require minimal effort, minimal compute resources and/or processing power, and/or minimum complexity. The compliance reports generated by the backend computer system 102 may include monthly reports, analytics, and/or any other type of reporting that may be requested by relevant users and/or stakeholders.

As shown in the system 340 of FIG. 3C, the mobile device 104 may capture images of products in/on a physical space (block A, 342). Refer to block B (122) in FIG. 1A, block C (306) in FIG. 3A, and block A (322) in FIG. 1A for further discussion.

Once the images are captured by the mobile device 104, the mobile device 104 may transmit the images in batch to the backend computer system 102 (block B, 344). In some implementations, the images may be transmitted at predetermined time intervals (e.g., once a day, twice a day, every 4 hours). In some implementations, the each of the images may be transmitted as the image is captured at the mobile device 104.

The backend computer system 102 may then invoke one or more APIs to perform image recognition techniques and/or KPI analysis on the images (block C, 346). The techniques and/or analysis may be performed at predetermined time intervals, such as once a day, twice a day, four times a day, every 4 hours, every 2 hours, ever 1 hour, every 30 minutes, every 15 minutes, every 5 minutes, every minute, etc. Refer to block C (124), block D (126), and/or block E (128) in FIG. 1A for further discussion about the image recognition techniques and/or KPI analysis. The backend computer system 102 may perform the techniques and/or analysis on each individual image. The backend computer system 102 may perform the techniques and/or analysis on batches or groups of the images. In some implementations, the backend computer system 102 may perform the techniques and/or analysis on individual images in parallel. In yet some implementations, the backend computer system 102 may perform the techniques and/or analysis on individual images in series.

The backend computer system 102 may also generate compliance reports based on performing the image recognition techniques and/or KPI analysis in block D (348).

The backend computer system 102 may transmit the compliance report(s) to the mobile device 104 (block E, 350). The compliance report(s) may also be transmitted to computing devices of other relevant users associated with the physical space and/or a physical location (e.g., a store more generally), such as a store manager's desktop or other user device (refer to FIG. 1B).

Accordingly, the mobile device 104 may present the compliance report(s) in one or more GUIs (block F, 352). As described previously, a user at the mobile device 104 may provide input to adjust one or more views of information presented in the compliance report(s). The user may provide input indicating one or more correct products in the image data (which may not have been correctly identified using the disclosed technology).

Figure 3D:
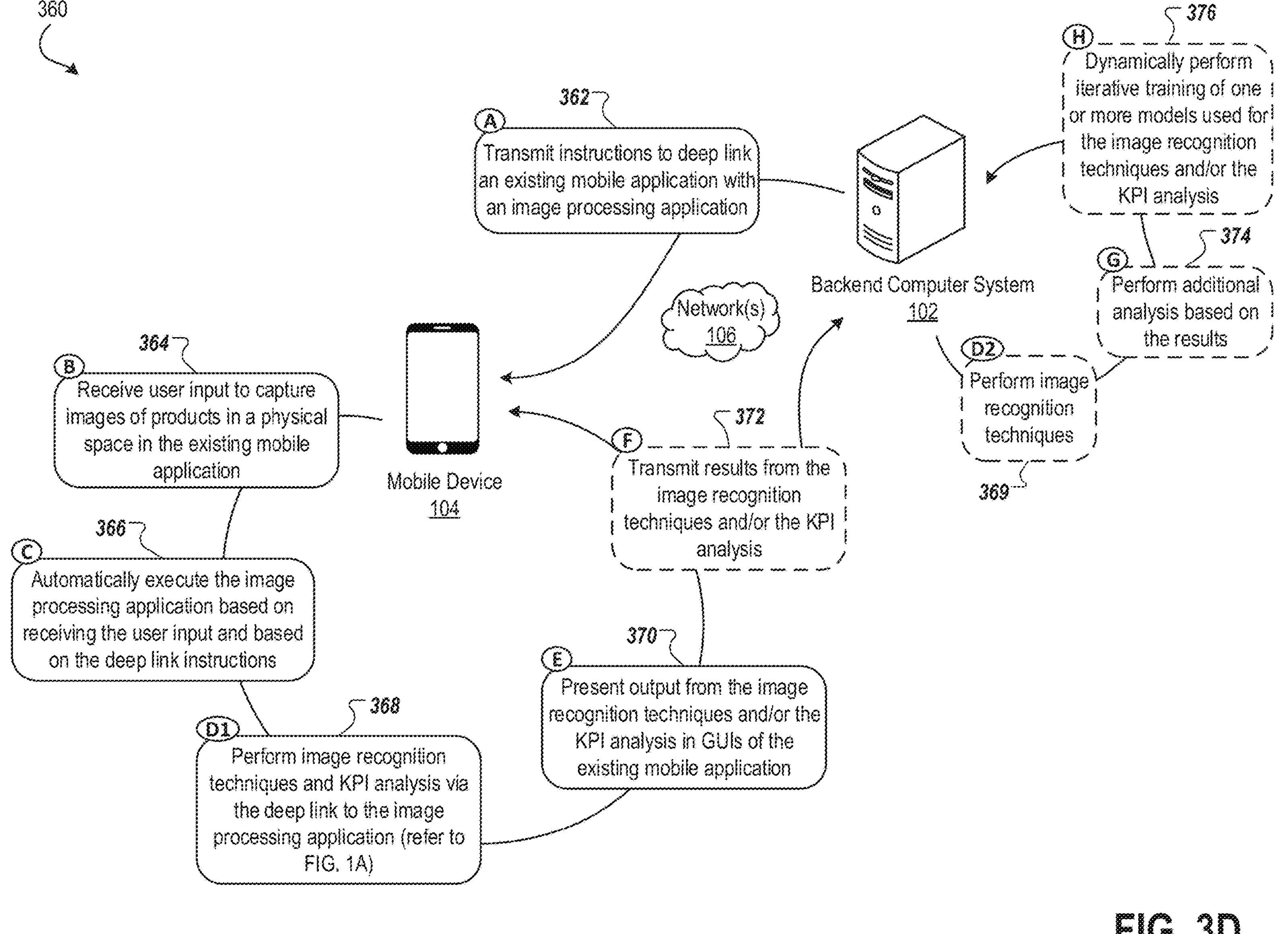
FIG. 3D is a conceptual diagram of a system for executing the image processing pipeline described herein on the edge at a mobile device using deep linking techniques.

FIG. 3D is a conceptual diagram of a system 360 for executing the image processing pipeline described herein on the edge at the mobile device 104 using deep linking techniques. Deep links may be used to send users directly to a mobile application and/or specific in-app locations, instead of a website, for example. In other words, deep linking may include the use of a hyperlink to link to a specific, generally searchable or indexed, piece of web content on a website or a mobile application, rather than a general homepage or other landing page. Deep links can be used to improve the user experience by reducing time and effort needed on part of the users to navigate to a particular application, page, or other location of interest.

The system 360 of FIG. 3D may allow for any existing mobile application at the mobile device 104 to deep link into the image processing pipeline provided by the backend computer system 102. As a result, one or more operations of the image processing pipeline, such as image recognition techniques, may be performed via a deep link to an image processing application provided by the backend computer system 102 (e.g., the image processing pipeline). The disclosed system 360 advantageously allows for any existing mobile application to quickly and accurately augment their existing capabilities, such as image recognition capabilities, with minimal development effort on their part.

Accordingly, the backend computer system 102 may transmit instructions to deep link an existing mobile application with an image processing application (e.g., the image processing pipeline) to the mobile device (block A, 362).

The mobile device 104 may receive user input to capture images of products in/on a physical space in the existing mobile application in block B (364).

The mobile device 104 may automatically execute the image processing application based on receiving the user input and based on the deep link instructions (block C, 366). In other words, capturing images with the existing mobile application may cause the mobile device 104 to automatically launch the image processing application, via the deep link instructions. As a result, one or more operations of the image processing pipeline may be performed at the image processing application.

For example, the mobile application 104 may perform image recognition techniques and/or KPI analysis via the deep link to the image processing application in D1 (368). As described herein, these techniques and/or analyses may be performed using a variety of machine learning trained models. Such models may be applied in parallel and/or in series to the captured images. One or more of the models may also be applied in series to output of one or more previously-executed models. In some implementations, the mobile application 104 may transmit the images to the backend computer system 102 and the backend computer system 102 may optionally perform one or more of the image recognition techniques in D2 (369). Refer to FIG. 1A for further discussion about the image recognition techniques and/or the KPI analysis.

In some implementations, the image processing application may only perform the image recognition techniques in block D1 (368), and then output from those techniques may be provided to the existing mobile application for further processing. The existing mobile application may then perform additional processing, such as KPI analysis and/or other business objective analyses. As a result, the disclosed deep linking may be used to augment the image recognition capabilities of the existing mobile application while allowing for the other capabilities of the existing mobile application to be used (and enhanced by the image recognition capabilities from the deep linking).

In block E, the mobile device 104 may present output from the image recognition techniques and/or the KPI analysis in one or more GUIs of the existing mobile application (block E, 370). Once the image processing application completes the techniques and/or analysis, the mobile device 104 may automatically redirect to the existing mobile application and present the output therein.

The mobile device 104 may optionally transmit results from the image recognition techniques and/or the KPI analysis to the backend computer system 102 in block F (372). Block F (372) may be performed before, during, or after any other blocks described in reference to FIG. 3D.

Using the transmitted results, the backend computer system 102 may optionally perform additional analysis (block G, 374). For example, the backend computer system 102 may perform KPI analyses, compliance checks, and/or business objective analyses in addition to those already performed by the existing mobile application. As a result, more robust insight can be gathered about conditions and/or compliance of the physical space and/or a physical location that includes at least the physical space (e.g., a store).

Optionally the backend computer system 102 may dynamically perform iterative training of one or more models that may be used for the image recognition techniques and/or the KPI analysis (block H, 376). Refer to FIGS. 8A and 8B for further discussion about the iterative training and retraining of the models.

Figure 3E:
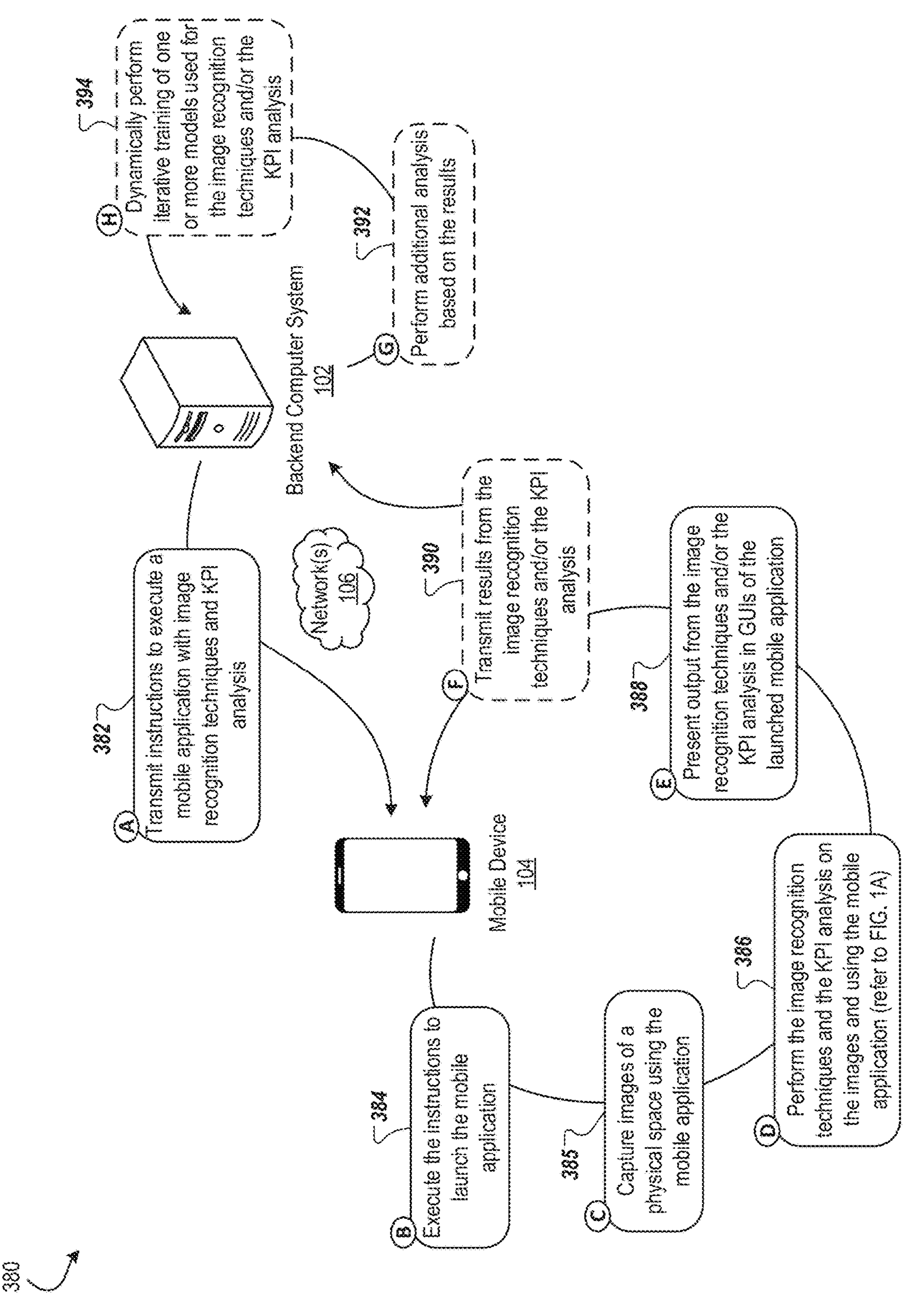
FIG. 3E is a conceptual diagram of a system for executing the image processing pipeline in a mobile application on the edge at a mobile device.

FIG. 3E is a conceptual diagram of a system 380 for executing the image processing pipeline in a mobile application on the edge at the mobile device 104. In this illustrative example, the backend computer system 102 may generate and provide a mobile application to the mobile device 104, the mobile application being configured to execute the image processing pipeline described herein and provide insights, recommendations, and/or reports in GUIs at the mobile device 104. Instructions for executing the mobile application at the mobile device 104 may be transmitted when a network connection is established between the backend computer system 102 and the mobile device 104. Once the instructions are performed at the mobile device 104 and the mobile application is launched, the mobile application may perform operations of the image processing pipeline in real-time or near real-time, on the edge, and regardless of whether the mobile device 104 remains connected to the network(s) 106 or not. If the mobile device 104 is no longer connected to the network(s) 106, once a network connection is established, the mobile device 104 may automatically transmit results from any of the operations of the image processing pipeline that have been performed since the network connection was lost (or since a last time that the mobile device 104 synced with the backend computer system 102 over the network(s) 106.

As shown in the system 380, the backend computer system 102 may transmit instructions to execute a mobile application with image recognition techniques and/or KPI analysis to the mobile device 104 (block A, 382).

The mobile device 104 may then execute the instructions to launch the mobile application locally (block B, 384). As described above, the mobile application may be launched regardless of whether the mobile device 104 is connected to the network(s) 106.

The mobile device 104 may capture images of a physical space using the mobile application in block C (385). Refer to at least FIG. 1A for further discussion.

In block D (286), the mobile device 104 may perform the image recognition techniques and/or the KPI analyses on the images and using the launched mobile application. Refer to at least FIG. 1A for further discussion about performing these techniques and/or analyses.

Accordingly, the mobile device 104 may present output from the image recognition techniques and/or the KPI analyses in one or more GUIs of the launched mobile application (block E, 388). Refer to FIGS. 10A, 10B, 10C, 10D, 10E, 10F, 10G, 10H, 10I, 10J, 10K, 10L, 11A, and 11B for further discussion about the GUIs.

Furthermore, the mobile device 104 may optionally transmit results from the image recognition techniques and/or the KPI analyses to the backend computer system 102 in block F (390). Refer to block F (372) in FIG. 3D for further discussion.

Using the transmitted results, the backend computer system 102 may optionally perform additional analysis (block G, 392). Refer to block G (374) in FIG. 3D for further discussion.

Using the transmitted results, the backend computer system 102 may optionally dynamically perform iterative training of one or more models used for the image recognition techniques and/or the KPI analysis in block H (394). Refer to block H (376) in FIG. 3D for further discussion.

FIGS. 4A and 4B are a flowchart of a process 400 for pre-training a product recognition model to be used in the image processing pipeline described herein. The process 400 may be performed by the backend computer system 102. The process 400 may also be performed by one or more other computing systems, devices, computers, networks, cloud-based systems, and/or cloud-based services. For illustrative purposes, the process 400 is described from the perspective of a computer system.

In some implementations, the process 400 may be performed to generate and pre-train a generic image recognition model. The generic model may then be trained with additional training parameters and/or training data to become more specific to particular use cases. For example, the generic model may be trained to recognize products of a particular merchandizer that are sold across the world. For individual stores, geographic locations, and/or regions in the world, the generic model may be retrained and/or iteratively trained to also recognize products that are specifically sold in just that store, geographic location, and/or region in the world. As a result, the generic model may be used as a baseline model for training and deployment at the different stores, geographic locations, and/or regions in the world. Retraining and/or iteratively improving the model once deployed to recognize additional products specific to the place of deployment can be fast, efficient, and lightweight (instead of training a new model from scratch for every place of deployment). Once deployed, the model can be retrained and/or iteratively trained using any one or more operations of the process 400.

Referring to the process 400 in both FIGS. 4A and 4B, the computer system may receive training data in block 402. The training data may include, but is not limited to, images of products on racks (block 404), images of products in/on a physical space (block 406), optional generative AI transformations of the products (block 408), and/or training parameters (block 410). Machine learning models described herein may be trained on images of any available products that may be for purchase in a store or other retail environment. Accordingly, the images of the products may include images of a variety of different products that are available for purchase in the store. The images may be captured by relevant users interacting with the physical space, such as employees, store managers, or other users who may use mobile devices to image products in the store.

In some implementations, the process 400 may be performed to pre-train the models on products that will be located on/in the physical space. As described in reference to FIGS. 6A and 6B, generative AI techniques and other machine learning techniques may be used to generate store-like images of initial product artworks, packaging, and/or designs that are not yet in the market, i.e., commercially available. The models may then be trained or pre-trained on the AI-generated images to accurately recognize those products once they are brought to market.

When new products are brought to market, the models may be retrained or iteratively improved over time, using images that depict such new products. The models may be retrained when new products are launched/brought to market. Sometimes, the models may be retrained at predetermined time intervals, such as after multiple different products have been launched or otherwise brought to market. Refer to FIGS. 8A and 8B for further discussion about retraining the models.

The computer system may generate a bounding box around one or more products in the images using object detection techniques (block 412). The computer system may use segmentation and/or transformer machine learning models to generate the bounding boxes. Some products may not always appear in a same expected shape. As a result, the computer system may apply boundary segment detection models, which can be trained to draw more precise lines around a package or product that may change in shape or appear in a different shape in the images. This flexible type of object detection can advantageously be used to determine a correct and accurate size and/or dimensions of the object (e.g., product).

In block 414, the computer system may annotate each product in the images defined by bounding boxes to identify corresponding product and/or corresponding pricing information. The products may be annotated by a user providing user input to the computer system. In some implementations, the computer system may additionally or alternatively automatically annotate each product in the image. For example, machine learning models may be used to automatically annotate each product.

The computer system may provide the annotated images as training data to a machine learning model in block 416.

The computer system may optionally provide one or more of the training parameters as additional training data to the machine learning model (block 418). For example, the computer system may provide one or more logo identifications (block 420) and/or product packing artwork (block 422) as the additional training data. In some implementations, the model can be a deep learning model, which can be trained to process and recognize different types of logos, labels, colors, packaging shapes, design, artwork, etc. Sometimes, decomposition techniques may also be used to fine tune the model and determine what parameters (e.g., logo, color, packaging) should carry more weight for purposes of product recognition and identification.

Figure 6A:
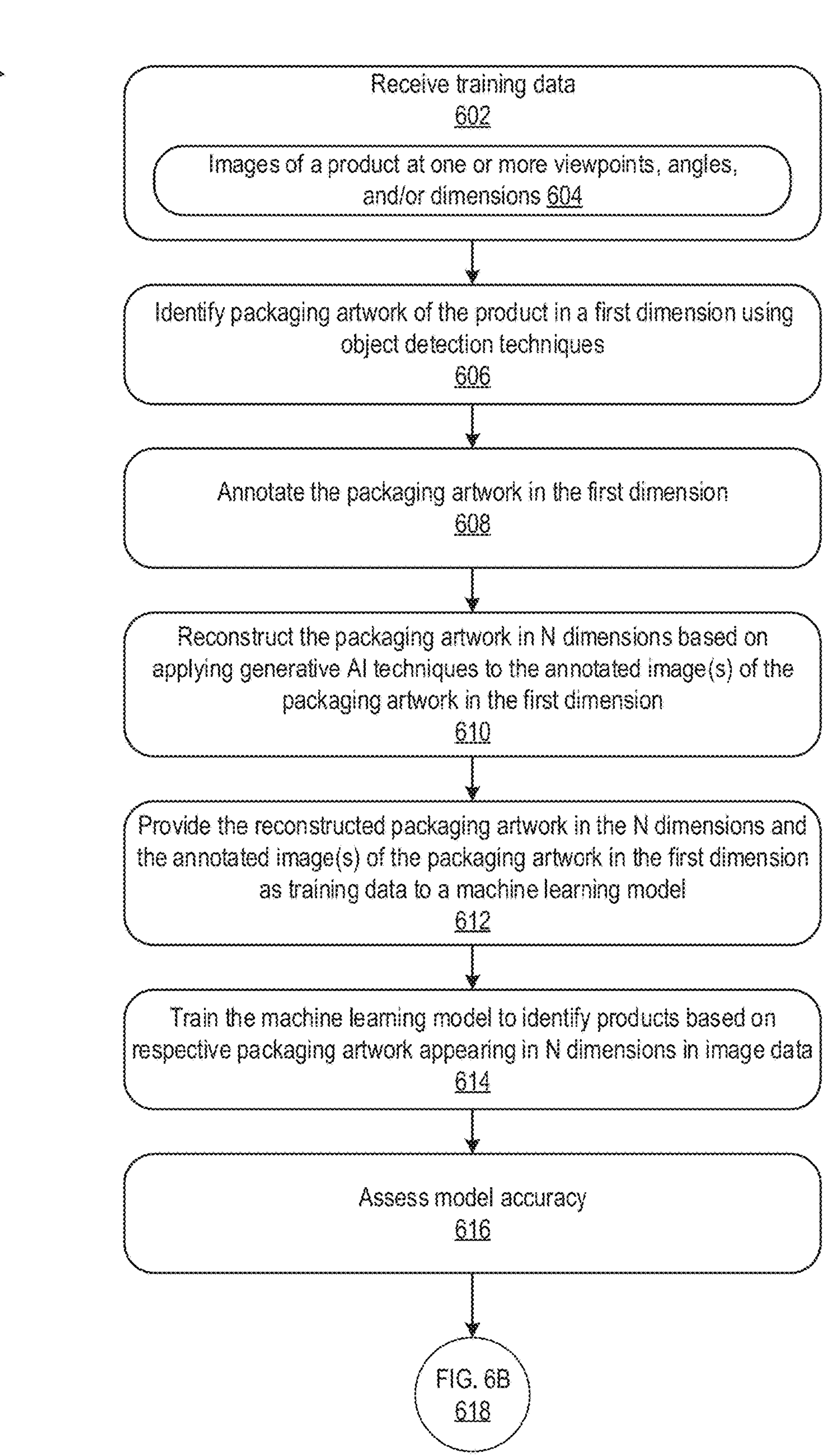
FIGS. 6A and 6B are a flowchart of a process to determine how different products may appear in different dimensions using generative AI techniques.
Figure 6B:
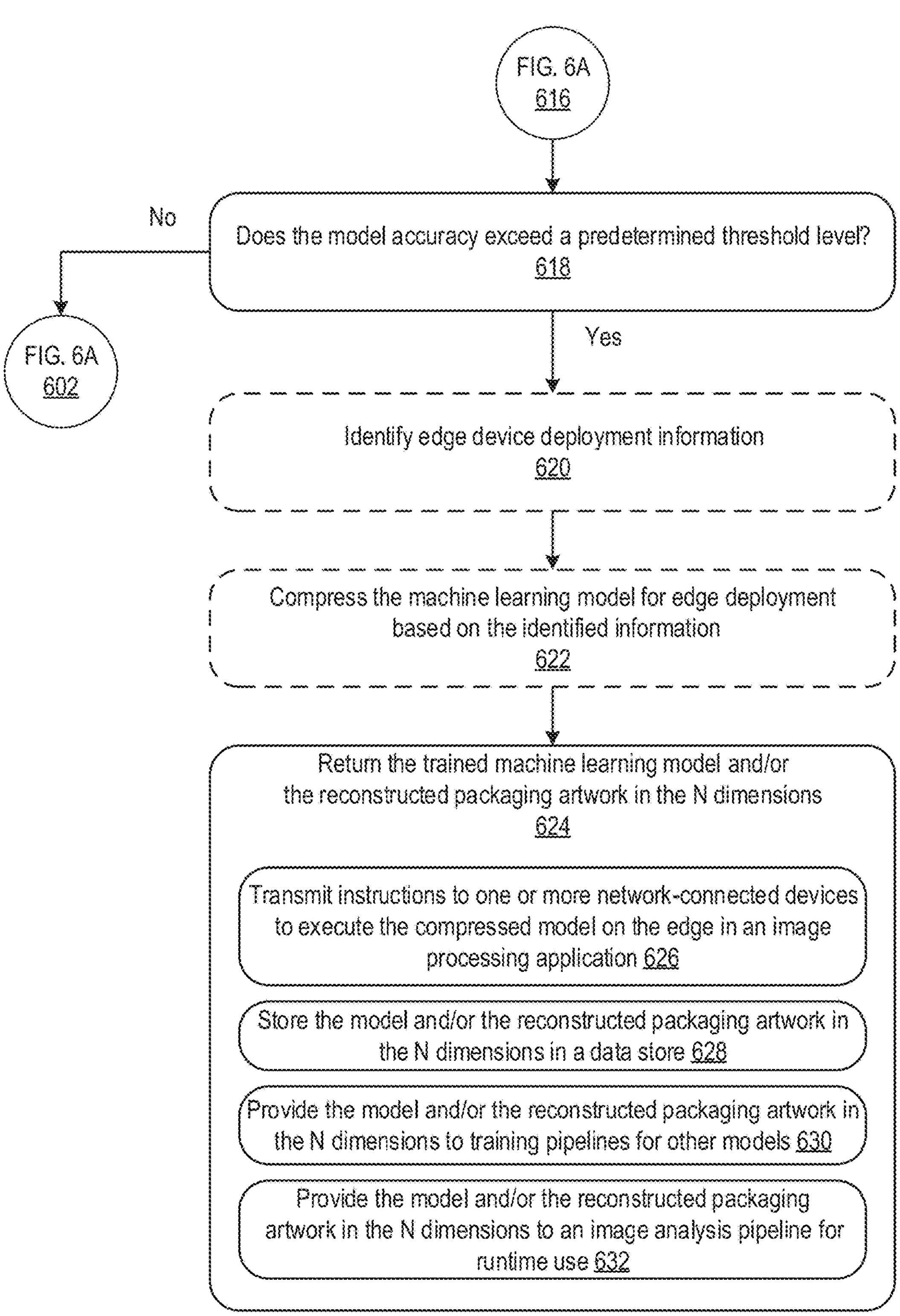

The computer system may optionally generate additional training data of each product in N dimensions based on applying generative AI techniques (block 424). Refer to FIGS. 6A and 6B for further discussion. In some implementations, block 424 may be performed instead of providing the generative AI transformations of the products (block 408) as part of receiving the training data in block 402.

In block 426, the computer system may train the machine learning model based on the training data to identify the products and/or product prices in other and/or new images. The model may be trained to identify the annotated products in new or other images. The model may be trained to output probabilistic values. For example, the model may be trained to output a likelihood (e.g., a numeric value, a percentage) that a product recognized by the model is in fact a particular product. In some implementations, the model may be trained to output a value (e.g., Boolean, string, text) indicating a product that was recognized by the model. The model may also be trained to generate output indicating additional information about the product, including but not limited to an associated price, a location in the store according to the planogram, etc. In some implementations, the model may be trained to output information about the product only if the model determines that the likelihood that the product is recognized correctly satisfies or exceeds some predetermined threshold value.

The computer system may assess model accuracy based on the training in block 428. Refer to FIGS. 8A and 8B for further discussion about assessing the model accuracy.

The computer system may then determine whether the model accuracy exceeds a predetermined threshold level in block 430. The predetermined threshold level can vary, based on the type of model, the store, and/or other relevant factors or parameters.

If the predetermined threshold level is not exceeded, the computer system can return to block 402 and perform one or more pre-training operations again in order to improve the model accuracy.

If the predetermined threshold level is met and/or exceeded in block 430, the computer system may identify edge device deployment information (block 432). The computer system may then compress the machine learning model for edge deployment and based on the identified information (block 434). In reference to both blocks 432 and 434, the computer system may select one or more compression techniques depending on the device(s) to which the model will be deployed. As a result, the disclosed techniques provide a plug-and-play approach to training and deploying compressed machine learning models to different types of mobile devices on the edge. Sometimes, the model may be compressed at a time at which the model is to be deployed to the edge mobile devices, rather than automatically in the training pipeline.

The computer system may also return the compressed model in block 436. For example, the computer system may transmit instructions to one or more network-connected devices to execute the compressed model on the edge in an edge processing application (block 438). If the computer system cannot establish a network connection with any mobile device on the edge, then the computer system may push the instructions to a mobile device once a connection can be established. Therefore, the computer system and the mobile device can be synced once connected via one or more networks (e.g., Internet, WIFI, BLUETOOTH). As another example, the computer system can store the compressed model in a data store (block 440). As yet another example, the computer system may execute the compressed model in a cloud environment during runtime use (block 442). Sometimes, the computer system may store and/or execute the model after it has passed the model accuracy threshold. As a result the computer system may then execute the full size model in the cloud computing environment.

FIGS. 5A and 5B are a flowchart of a process 500 for pre-training a measurements determination model to be used in the image processing pipeline. The measurements determination model may be trained to identify measurements of each product on a rack or shelf structure. This model may also be trained to determine how much space each product (or group of similar products) takes up on the rack. This type of information may be used in the image processing pipeline to determine whether the product is OOS or close to being OOS, whether the product needs to be rearranged on the rack, whether the product is arranged on the rack as laid out in an associated planogram, etc. For example, the model may be applied to images of a rack of products that was captured after the products were arranged on the rack. The model may be used to determine whether the products are arranged properly on the rack according to an associated planogram.

The measurements determination model may be trained similarly to the model described in FIGS. 4A and 4B. For example, the model may be pre-trained for known products to be released or available for purchase in a variety of stores. The model may then be deployed to individual stores and/or geographic locations and retrained or otherwise improved to also recognize measurements of products that are unique or specific to those individual stores and/or geographic locations.

The process 500 may be performed by the backend computer system 102. The process 500 may also be performed by one or more other computing systems, devices, computers, networks, cloud-based systems, and/or cloud-based services. For illustrative purposes, the process 500 is described from the perspective of a computer system.

Referring to the process 500 in FIGS. 5A and 5B, the computer system may receive training data in block 502. The training data may include images of products on racks (block 504), images of products in/on a physical space and/or a physical location more generally, such as a store (block 506), optional generative AI transformations of the products (block 508), and/or training parameters (block 510). In brief, the images of the products in block 504 may be images captured of the products in various arrangements on racks or shelves. For example, the images may depict products before they have been properly arranged on a rack (e.g., products stacked on top of each other, products pushed together in ways that do not allow a user to read or view artwork or a logo on product packaging). The images may also depict products once they have been properly arranged on the rack (e.g., once a store worker arranges the products so that all logos on product packaging are facing outward, in a same direction towards shoppers). Refer to blocks 402-410 in the process 400 of FIGS. 4A and 4B for further discussion.

In block 512, the computer system may generate a bounding box around one or more products in the images using object detection techniques. Refer to block 412 in the process 400 of FIGS. 4A and 4B for further discussion.

The computer system may determine a distance to each product in the images in block 514. In some implementations, the distance may be annotated into the images, such as by a relevant user. In some implementations, augmented reality (AR) capabilities such as depth perception and distance approximation may be combined with data from one or more sensors of the mobile device to improve accuracy of a model trained in the process 500. For example, LiDAR, accelerometer, gyroscope, and/or light sensor data may be captured using one or more sensors of the mobile device and then combined with the images to improve capabilities of the model described herein. LiDAR data, for example, may be used to enhance depth perception of the captured images. The LiDAR data may improve accuracy of the models described herein in counting and/or identifying inventory of a particular product in/on a physical space.

The computer system may annotate each product in the images to identify product dimensions and/or measurements (block 516). The annotations may include known measurements and/or dimensions of each product in various orientations. The annotations may be made by a relevant user, automatically by the computer system, or a combination thereof. Refer to block 414 in the process 400 of FIGS. 4A and 4B for further discussion.

The computer system may also annotate the racks in the images to identify rack dimensions and/or measurements (block 518). The annotations may be made by the user, automatically by the computer system, or a combination thereof.

In block 520, the computer system may provide the annotated images and determined distance information as training data to a machine learning model. Refer to block 416 in the process 400 of FIGS. 4A and 4B for further discussion.

Optionally, the computer system may provide the training parameters as additional training data to the model (block 522). One or more of the training parameters may include planograms associated with the physical space(s) in which the images of the products were captured. Refer to blocks 418-422 in the process 400 of FIGS. 4A and 4B for further discussion.

Optionally, the computer system may generate additional training data of each product in N dimensions based on applying generative AI techniques in block 524. As a result, this additional training data may be used to identify various ways in which the products may appear on the rack regardless of whether such positions appear in the images received in blocks 502-510. Refer to block 424 in the process 400 of FIGS. 4A and 4B for further discussion.

The computer system may then train the model based on the training data to identify product measurements in other and/or new images (block 526). The model may be trained to identify the product measurements regardless of how the product may appear or otherwise be arranged on the rack. In some implementations, the model may be trained to leverage capabilities at a device of deployment, such as AI and/or augmented reality (AR) functionality that may be available at the device through the device's operating system and/or a mobile application. Such AR functionality can be used to improve ease of use for relevant users in the field, such as frontline workers. For example, the AR functionality may be used to superimpose an ideal shelf, as designed by/in a planogram, on top of a live preview or image of what actually appears for the shelf in a store. The AR functionality may further provide superimposed visual indications of discrepancies between the actual shelf in the store and the ideal shelf. Such visual indications may be used by the frontline worker to accurately and efficiently correct the discrepancies and rearrange the actual shelf.

The model may be trained to generate output that is numeric, string, and/or Boolean. For example, the model may generate output indicating a percentage or other numeric value indicating how much shadow shelf may be covered by a particular product or a group of products on the rack. The model may also be trained to generate one or more recommendations that can or should be taken to improve the placement and/or arrangement of the products on the rack. In some implementations, one or more additional models may be trained and deployed to determine, based on output from the measurements model, the recommendations. Refer to block 426 in the process 400 of FIGS. 4A and 4B for further discussion.

For example, the model may be trained to identify a quantity of the products on a rack (block 528). This determination may be used to determine whether the rack may be overstocked or understocked. Additionally or alternatively, the model may be trained to identify a quantity of products on the rack that satisfy one or more product identification criteria (block 532). In other words, the model may be trained to identify whether an expected quantity of a particular product are on the rack. This type of determination may be used, among other tasks or checks, to determine whether the particular product is overstocked or understocked. In some implementations, the model may be trained to receive output from the product recognition model that was trained in the process 400 of FIGS. 4A and 4B to then identify the quantity of the products on the rack that satisfy the one or more product identification criteria. Additionally or alternatively, the model may be trained to identify how much rack space is occupied by products that satisfy one or more product identification criteria (block 534). This model identification may be used by the computer system to determine whether particular products are appropriately arranged on the rack, whether the rack has an amount of available space that may be occupied by products of one or more types, whether additional products should be added to the rack, whether a quantity of a particular type of product should be removed from the rack, etc.

Once training is complete, the computer system may assess model accuracy (block 536). Refer to block 428 in the process 400 of FIGS. 4A and 4B for further discussion.

The computer system may determine whether the model accuracy exceeds a predetermined threshold level in block 538. If the predetermined threshold level is not exceeded, the computer system may return to block 502 and continue to train the model to improve its accuracy. Refer to block 430 in the process 400 of FIGS. 4A and 4B for further discussion.

If the predetermined threshold level is met or exceeded, the computer system may identify edge device deployment information in block 540. Refer to block 432 in the process 400 of FIGS. 4A and 4B for further discussion.

The computer system may then compress the machine learning model for edge deployment based on the identified information (block 542). Refer to block 434 in the process 400 of FIGS. 4A and 4B for further discussion.

The computer system may return the compressed model in block 544. Refer to blocks 436-442 in the process 400 of FIGS. 4A and 4B for further discussion.

FIGS. 6A and 6B are a flowchart of a process 600 to determine how different products may appear in different dimensions using generative AI techniques. The process 600 may be performed to identify how known and/or unknown products may appear in different rack layouts, different physical spaces (including but not limited to different fixtures), different physical locations, different positions, different arrangements, and/or different viewpoints. The process 600 may also be used to identify how unknown or new products may appear, such as their logos, packaging, dimensions, artwork, etc. Accordingly, the generative AI techniques may be used to reconstruct how the products are or may be expected to appear in one or more known and/or new layouts. Any of the models described throughout this document may further be trained to identify the products in known and/or new layouts.

The process 600 may be performed by the backend computer system 102. The process 600 may also be performed by one or more other computing systems, devices, computers, networks, cloud-based systems, and/or cloud-based services. For illustrative purposes, the process 600 is described from the perspective of a computer system.

Referring to the process 600 in FIGS. 6A and 6B, the computer system may receive training data in block 602. The training data may include images of a product at one or more viewpoints, angles, and/or dimensions (block 604). The products may appear distorted on the rack, based on a distance from the products at which the images were captured. The products may appear distorted on the rack based on a viewpoint and/or angle that the images were captured. The products may appear distorted on the rack based on how those products are arranged on the rack.

The computer system can identify packaging artwork of the product in a first dimension using object detection techniques in block 606. The first dimension may be defined (such as by a user and/or by the computer system) as a flat, straight-on view of the product, as if the product were perfectly arranged on a rack as a square or rectangular bag/shape. Sometimes, block 606 may include identifying an image amongst the received images in which the product appears in this first dimension (flat, straight-on view of the product).

In block 608, the computer system may annotate the packaging artwork in the first dimension. The annotations may be made by a relevant user, automatically by the computer system, or a combination thereof. The annotations may indicate measurements, artwork, and/or logos of the product packaging in the first dimension (e.g., a flat, straight-on view of the product).

The computer system may then reconstruct the packaging artwork in N dimensions based on applying generative AI techniques to the annotated image(s) of the packaging artwork in the first dimension (block 610).

The computer system may provide the reconstructed packaging artwork in the N dimensions and the annotated image(s) of the packaging artwork in the first dimension as training data to a machine learning model (block 612). The machine learning model may be the product recognition model described in the process 400 of FIGS. 4A and 4B. The machine learning model may be the product measurements model described in the process 500 of FIGS. 5A and 5B. The machine learning model may be any other model that is depicted and described in this document as part of the image processing pipeline. In some implementations, the machine learning model may be a new model that is trained to identify how and when new artwork, new logos, and/or new packaging appears in images captured of products on the racks. Any of the models described herein can be trained to identify products in images that may appear distorted in the N dimensions or any other dimension.

Accordingly, the computer system may train the machine learning model to identify products based on their respective packaging artwork appearing in N dimensions in image data in block 614. The model may be trained to identify products in any images that appear in the N different dimensions.

The computer system may assess accuracy of the model in identifying the products in the N dimensions in block 616. Refer to block 428 in the process 400 of FIGS. 4A and 4B.

In block 618, the computer system may determine whether the model accuracy exceeds a predetermined threshold level. If the predetermined threshold level is not exceeded or met, the computer system may return to block 602 and repeat the process 600 described herein. Refer to block 430 in the process 400 of FIGS. 4A and 4B.

If the predetermined threshold level is met or exceeded, the computer system may optionally identify edge device deployment information (block 620). Refer to block 432 in the process 400 of FIGS. 4A and 4B.

The computer system may optionally compress the machine learning model for edge deployment based on the identified information in block 622. Refer to block 434 in the process 400 of FIGS. 4A and 4B.

In block 624, the computer system may then return the trained machine learning model and/or the reconstructed packaging artwork in the N dimensions. Refer to blocks

436-442 in the process 400 of FIGS. 4A and 4B for further discussion about returning information.

For example, the computer system may transmit instructions to one or more network-connected devices to execute the compressed model on the edge in an image processing application or other mobile application (block 626). As described herein, the model may be trained to identify products in various different dimensions. The model may be deployed in parallel and/or in series with one or more models described herein, such as the product recognition model and/or the product measurements model.

Additionally or alternatively, the computer system can store the model and/or the reconstructed packaging artwork in the N dimensions in a data store (block 628). The model and/or the reconstructions may then be accessed by at least the computer system for later use and/or additional processing.

Additionally or alternatively, the computer system can provide the model and/or the reconstructed packaging artwork in the N dimensions to training pipelines for other models (block 630). For example, the reconstructions may be provided to the training pipeline for the product recognition model described in the process 400 of FIGS. 4A and 4B. As another example, the reconstructions may be provided to the training pipeline for the product measurements model described in the process 500 of FIGS. 5A and 5B. The reconstructions may therefore be used as additional training data to improve accuracy of the models to identify products, regardless of how the products may appear in runtime image data and/or regardless of whether those products are new versus known to the models.

Additionally or alternatively, the computer system can provide the model and/or the reconstructed packaging artwork in the N dimensions to an image analysis pipeline for runtime use (block 632). The reconstructions, for example, may be used in one or more operations in the pipeline to recognize products imaged during runtime, perform compliance checks, and/or generate recommendations to adjust the products as they appear in/on the physical space during runtime.

In some implementations, the process 600 can stop after reconstructing the packaging artwork in the N dimensions in block 610. The reconstructed packaging artwork in the N dimensions may then be used as training data for one or more of the models described herein (refer to the process 400 in FIGS. 4A and 4B and the process 500 in FIGS. 5A and 5B). Sometimes, the process may stop after providing the reconstructed packaging artwork in the N dimensions to one or more of the models described herein as additional training data (block 612). Training processes described herein, such as in the process 400 of FIGS. 4A and 4B and the process 500 of FIGS. 5A and 5B, can then be resumed or otherwise performed as described.

Figure 7A:
Figure 7A:
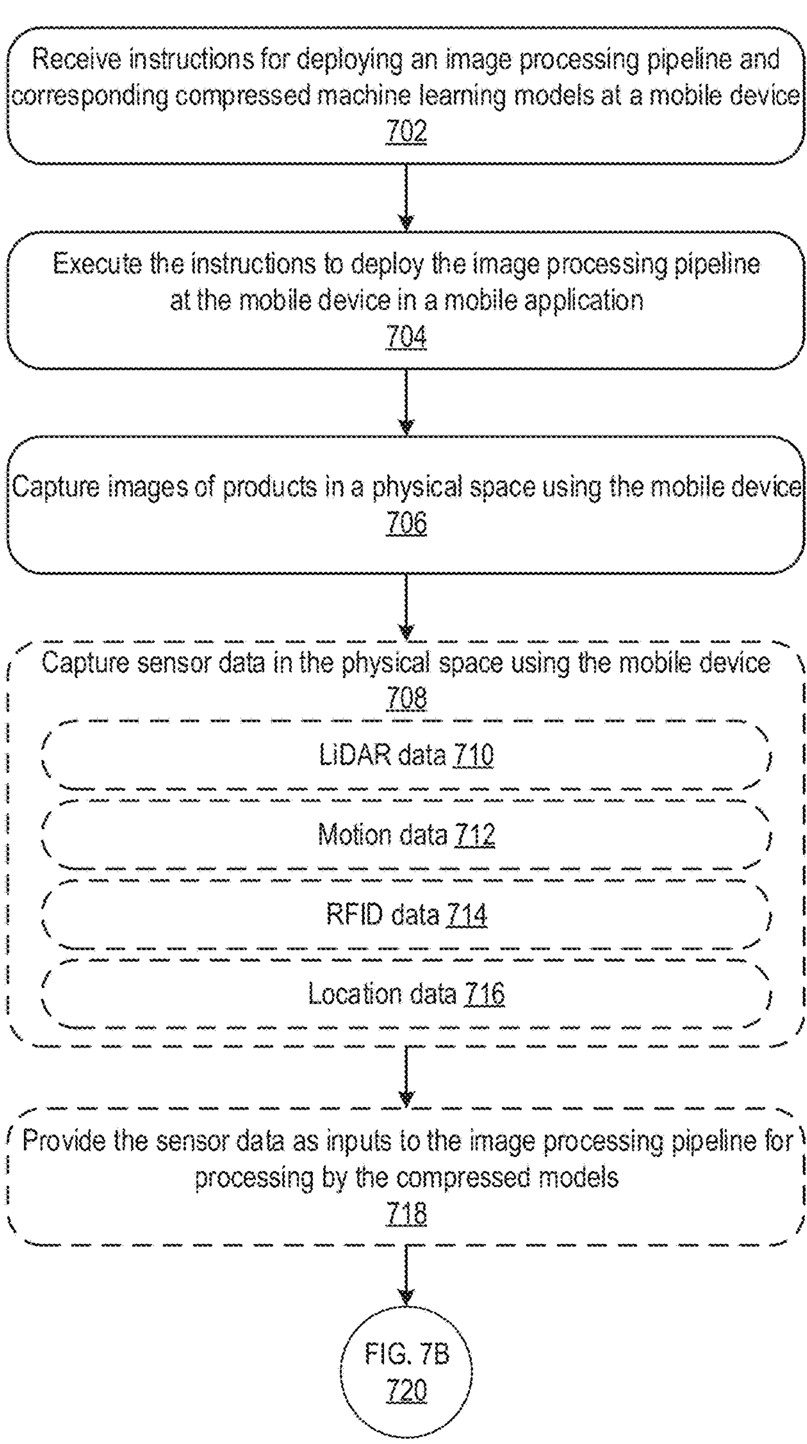
Figure 7B:
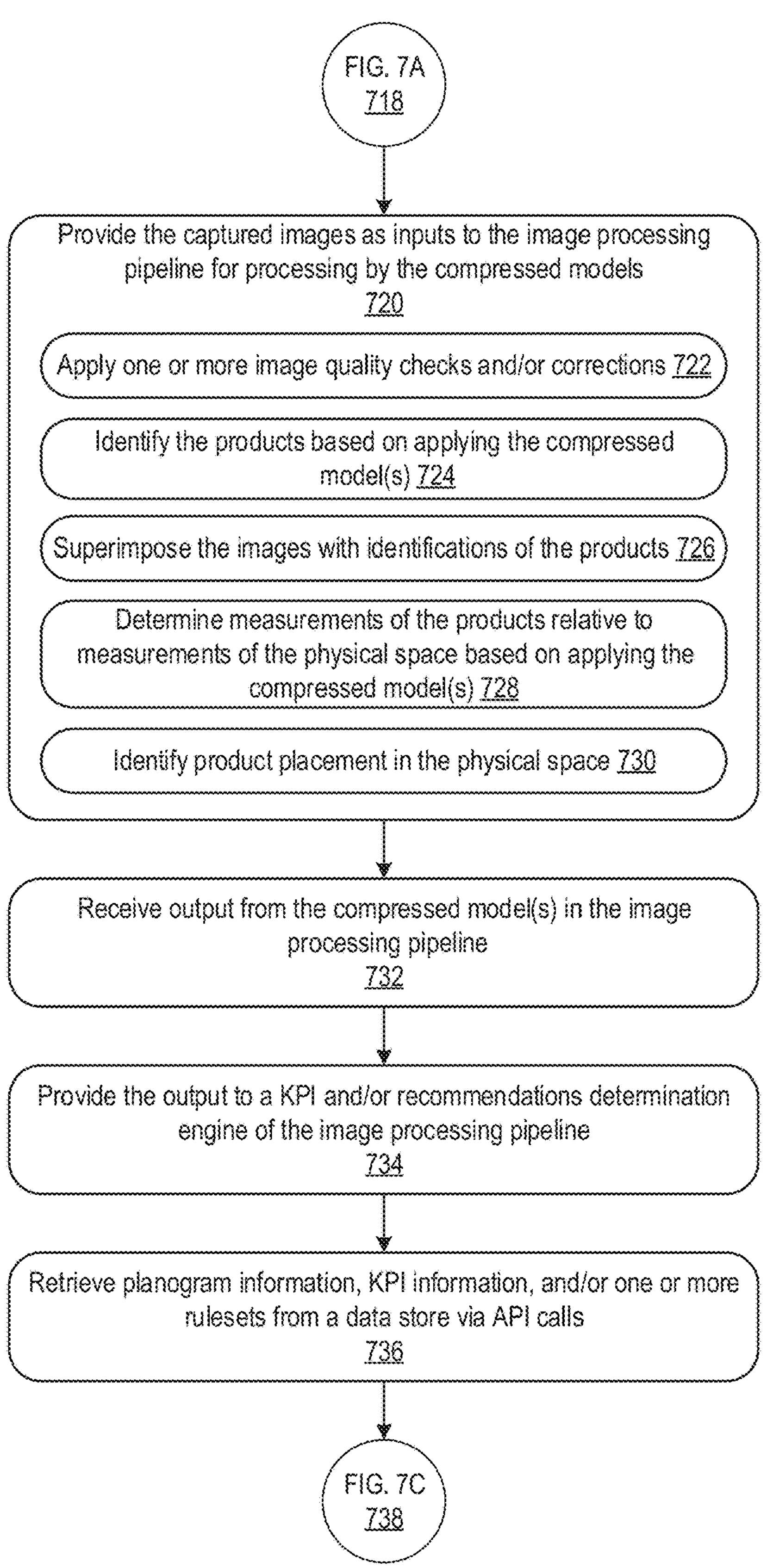

FIGS. 7A, 7B, and 7C are a flowchart of a process 700 for runtime use of the image processing pipeline. As described in reference to FIGS. 3A, 3B, 3C, 3D, and 3E, the image processing pipeline may be executed in a mobile application on the edge at a mobile device. The image processing pipeline may be executed in an existing mobile application. Sometimes, the pipeline may be provided to the mobile device as an API service. The pipeline may be executed at the mobile device regardless of whether the mobile device is actively connected to a network. If the pipeline is executed when the mobile device is not connected to the network, once a network connection is established, the mobile device may automatically push results of the pipeline to a backend computer system, such as the backend computer system 102, to be stored and/or used in additional processing and/or model training. In some implementations, one or more operations in the pipeline may be performed on the edge at the mobile device while one or more other operations in the pipeline may be performed remotely, in the cloud, at the backend computer system.

The process 700 may be performed by the mobile device 104. The process 700 may also be performed by one or more other computing systems, user devices, computing devices, computers, networks, cloud-based systems, and/or cloud-based services. For illustrative purposes, the process 700 is described from the perspective of a mobile device.

Referring to the process 700 in FIGS. 7A, 7B, and 7C, the mobile device may receive instructions for deploying an image processing pipeline and corresponding compressed machine learning models at a mobile device (block 702). Refer to at least FIGS. 1A, 3A, 3B, 3C, 3D, and 3E for further discussion. Furthermore, the instructions may vary based on whether the pipeline is being deployed in an existing mobile application at the mobile device, whether the pipeline is being deployed in a new mobile application at the mobile device, whether the pipeline is being deployed as an API service, and/or whether the pipeline is being deployed at both the mobile device and a backend computer system.

The mobile device may execute the instructions to deploy the image processing pipeline at the mobile device in a mobile application (block 704). Refer to at least FIGS. 1A, 3A, 3B, 3C, 3D, and 3E for further discussion.

In block 706, images of products in/on a physical space may be captured using the mobile device. The images may be captured using a camera of the mobile device. The images may be captured using an existing mobile application and/or a new application at the mobile device. The images may include still images, optical images, and/or video feeds. The type of image captured may vary based on user need, user preferences, and/or can be optimized to match available bandwidth and/or processing capacity.

Optionally, sensor data associated with the product may be captured using the mobile device (block 708). The sensor data may optionally include LiDAR data (block 710), motion data (block 712), RFID data (block 714), location data (block 716), or any combination thereof. The sensor data may be used to augment the captured images. For example, location data may be received from one or more location signaling devices, beacons, and/or other types of GPS devices in the physical location and/or in proximity to the physical space when the mobile device is within a predetermined threshold distance from such signaling devices/beacons. The location data may be used as metadata for the captured images to confirm or otherwise identify a precise location where those images were captured in/on the physical space. Such metadata can advantageously be used in the pipeline to check whether products on racks at that precise location are organized/arranged as expected in a planogram for that location.

The sensor data may optionally be provided as sensor data inputs to the image processing pipeline for processing by the compressed models (block 718). The sensor data, as described herein, can be used to improve depth perception and thus recognition of quantities of products and/or arrangements of products in/on physical spaces.

The mobile device may provide at least the captured images as inputs to the image processing pipeline for processing by the compressed models in block 720. The images may be provided to the pipeline as they are captured.

The images may be provide to the pipeline in batches and/or at predetermined time intervals. Refer to at least FIG. 1A for further discussion.

In some implementations, multiple images of the same rack, product, and/or aisle in the physical space and/or physical location may be combined in the pipeline to create a composite image on the mobile device. The composite image may then be run through the models described herein. The pipeline can also support processing of a video feed capturing a large portion of the physical location (such as an entire aisle) as a user walks through the large portion of the physical location. The pipeline may then allow for processing the video feed at the edge on the mobile device to recognize SKUs, products, and their locations captured in the video feed.

For example, one or more image quality checks and/or corrections may be applied via the pipeline by the mobile device (block 722). One or more machine learning models may be trained and applied in block 722 to refine the images. In some implementations, the models already deployed in the pipeline, such as a product recognition model, may perform additional operations to check image quality. One or more criteria and/or rulesets may be applied to determine whether image refinements should be performed. As an illustrative example, a model can be trained to adjust colors in the images (e.g., increase saturation and/or vibrancy to a predetermined level). As another illustrative example, a model can be trained to sharpen the images. A model can be trained to correct blurs, reflections, or other characteristics that may cause the image to have poor or insufficient quality for additional processing. Such checks and corrections can be performed in real-time or near real-time to avoid requiring the user to take multiple or new images of the products with their mobile device.

As another example, the products can be identified via the pipeline by the mobile device based on applying the compressed model(s) (block 724). The models described herein may be applied in parallel and/or in series. For example, a product recognition model can be applied first. The model can receive the images enriched with the sensor data to recognize products, their prices, and/or their SKUs appearing in the images. The model may also recognize fixtures in the images, such as racks, shelves, or other structures (e.g., physical spaces) in the physical location (e.g., store, retail environment). Output from the product recognition model (e.g., identification of products appearing in the images) may then be provided to one or more other models, which may be executed in parallel and/or in series. For example, the output may be provided to a product measurements model. The output may also be applied to a model that performs one or more KPI analyses and/or other compliance checks.

Additionally or alternatively, the images may be superimposed with identifications of the products via the pipeline by the mobile device in block 726. The images may be superimposed with the identifications by the product recognition model. In other words, output from the product recognition model may include the images with annotations identifying the recognized products. The identifications may include bounding boxes around one or more recognized products. The identifications may include metadata indicating each recognized product in the images. The superimposing may be performed in real-time or near real-time.

Additionally or alternatively, measurements of the products may be determined relative to measurements of the physical space based on applying the compressed model(s) in block 728. The product measurements model described herein may be applied in block 728. This model may be applied to the output of the product recognition model. For example, the product recognition model may generate output indicating products that have been identified in the images. The product measurements model may then determine the measurements of each of those identified products. In some implementations, the model(s) may be applied to determine a length of a particular display having products and/or a length of a particular SKU on the particular display. The model(s) may be trained to determine relative length and/or absolute length of the display and/or the particular SKU.

Additionally or alternatively, the mobile device, via the pipeline, may identify product placement in/on the physical space in block 730. For example, the models described herein may generate output indicating how the products are arranged on a rack or other physical space in the physical location. Sometimes, the models can also compare the arrangement of the products to a planogram and generate output indicating whether the products are arranged according to the planogram. The output can indicate, for example, how many of a particular product is on a particular rack. The output can indicate, as another example, out of X number of products visible on a rack, how many of those products are of a particular type, brand, and/or SKU. As another example, the output can indicate how much of a total rack space is taken up by products of a particular type, brand, and/or SKU. Various other outputs are also possible.

In yet some implementations, such as in block 730, the models may be applied to recognize the particular physical space where the product is placed/arranged. For example, the models may recognize a particular shelf and related equipment, features, and/or structures. One or more of the models may further compare the recognized shelf to an inventory of fixtures and/or physical spaces that may be known or expected for the physical location (e.g., store). Accordingly, the models may be trained to recognize and assess not only the products that appear on or in the physical spaces of the physical location, but also the physical spaces themselves. In some implementations, the models may further be configured to recognize additional fixtures, such as temporary or non-standard displays. The models may recognize temporary setups and products associated with those setups, including but not limited to Super Bowl-themed displays and their associate products, baskets of products, etc.

Sometimes, the models may be trained to recognize bays and/or sub-sections of the fixtures or other physical spaces, which may further improve the models' ability to accurately detect and recognize different types of products in or on the physical spaces. For example, the models may automatically recognize bays or sub-sections of aisles in a store. The models may also classify the recognized bays or sub-sections into particular categories or types of products (e.g., chips, biscuits, crackers, soft drinks). Similarly, the models may be trained to recognize and distinguish stacking of the products in or on the physical spaces. For example, the models may recognize and distinguish stacks of biscuit packs, dip jars, etc.

The mobile device can receive output from the compressed model(s) in the image processing pipeline in block 732.

The mobile device can provide the output to a KPI and/or recommendations determination engine or module of the image processing pipeline (block 734). This engine or module can execute one or more compressed machine learning models, algorithms, and/or rulesets to perform compliance checks, KPI analyses, and/or generate recommendations for relevant users associated with the physical space.

In block 736, the mobile device may retrieve planogram information, KPI information, and/or one or more rulesets from a data store via API calls. The planogram information may include a planogram that has been generated and/or assigned for the particular physical space and/or physical location. The KPI information may include one or more KPIs and/or business objectives that are relevant to the physical space and/or physical location for which compliance checks can be performed. The ruleset(s) can indicate one or more rules and/or criteria that may be followed to determine whether the products in the images appear as expected or required by the planogram information and/or the KPI information. If the mobile device is not network connected, such information may be retrieved once a network connection is established. In some implementations, such information may be provided to the mobile device along with the execution instructions in block 702.

The mobile device may generate, at the KPI and/or recommendations determination engine via the pipeline, one or more recommendations and/or KPI analyses based on applying the retrieved information and the ruleset(s) to the output (block 738). In some implementations, the engine may apply one or more compressed models in block 738 to determine the recommendations and/or KPI analyses.

For example, the mobile device may identify whether a quantity of products on a particular rack in the physical location satisfy the ruleset(s) (block 740). The quantity of products on the shelf may be determined by one of the previously mentioned models, such as the product measurements model. In block 740, the mobile device may compare the quantity of products to the planogram information and/or the KPI information to determine whether a sufficient quantity of the products is in fact arranged on the rack (e.g., whether the product(s) is low in stock or overstocked). The mobile device, via the engine of the pipeline, may additionally or alternatively determine whether the quantity of products satisfies at least one rule in the ruleset(s). The engine may be used to determine whether a total quantity of products satisfy the ruleset(s). The engine may be used to determine whether a quantity of a particular type of product and/or SKU satisfies the ruleset(s).

As another example, the mobile device may identify products that are misplaced in/on the physical space (block 742). The engine may receive output from one or more models, such as the product recognition model and/or the product measurements model and determine whether that output satisfies one or more rules in the ruleset(s) that pertain to proper placement of particular products. The engine may compare the output to the planogram information, for example, to determine whether a particular type of product or SKU that was recognized in the images is placed in a rack to which is was assigned in the planogram. The engine may, as another example, identify how much space on the rack is occupied by a particular product or SKU and/or whether more of less of the rack space should be occupied by the particular product or SKU.

As yet another example, the mobile device may recommend proper quantity and/or placement of the products in block 744. Recommendations generated in block 744 may be based on identifications made in blocks 740 and/or 742. For example, if the engine determines that not enough quantity of a particular product appears on the particular shelf in block 740, the engine may generate a recommendation to replenish the quantity of the particular product by a predetermined amount. As another example, if the engine determines that a particular product is incorrectly placed on the rack in block 742, the engine may generate a recommendation to move the particular product from the rack to another rack or racks in the physical location.

The mobile device may generate one or more other recommendations that can vary and may depend based on the compliance checks, the ruleset(s), the business objectives, and/or the KPI analyses that are performed in blocks 738-744. Blocks 740-744 are merely illustrative and non-limiting examples. Various other operations may be performed as part of generating the recommendations and/or the KPI analyses. For example, the engine may check the output against one or more KPIs and/or business objects to see what matches, needs improvement, and/or needs changes.

In block 746, the mobile device may generate and present, in one or more GUI displays at the mobile device, the generated recommendations and/or KPI analysis. Refer to FIGS. 10A, 10B, 10C, 10D, 10E, 10F, 10G, 10H, 10I, 10J, 10K, 10L, 11A, and 11B for further discussion about the GUIs. The generated recommendations and/or the KPI analyses may be presented in the GUIs as they are determined in the pipeline. In some implementations, the generated recommendations and/or the KPI analysis may be presented in real-time or near real-time in the GUIs once all the recommendations and/or analyses have been generated and/or performed.

Optionally, the mobile device may receive user input indicating one or more modifications to the presented recommendations and/or KPI analyses (block 748). For example, the mobile device may optionally receive user input indicating a correct identification of one or more products in the image(s) (block 750).

The mobile device may receive user input as touch, haptic feedback, keyboard/mouse inputs, and/or voice commands. In response to receiving user voice commands, for example, the pipeline may include additional natural language processing operations to translate those commands to computer-readable instructions. The natural language processing operations may invoke one or more machine learning models, including but not limited to large language models (LLMs). As an illustrative example, the mobile device may receive voice commands and/or interpret survey questions, such as how many racks or other fixtures (e.g., physical space) are located in a particular store (e.g., physical location) or portion of the store. Using the pipeline, the mobile device may automatically translate the survey questions into computer-readable instructions and generate responses in real-time or near real-time based on the output of the pipeline model(s).

The mobile device may transmit the output, the generated recommendations, the KPI analysis, and/or the received user input to the backend computer system described herein for additional processing (block 752). For example, any of this information can be stored in a data store, database, and/or data lake. Any of this information can be used by the backend computer system to generate compliance reports or other relevant reports for relevant stakeholders associated with products in the physical space (such as products on fixtures such as shelves or racks) or a physical location (e.g., a store) more generally. Any of this information may additionally or alternatively be used by the backend computer system to retrain and/or iteratively improve one or more of the compressed models described herein. Refer to FIGS. 8A and 8B for further discussion. The information in block 752 can be pushed to the backend computer system once a network connection can be established between the mobile device and the backend computer system.

One or more blocks in the process 700 can be run in parallel. For example, if multiple images are captured, one or more of the blocks in the process 700 can be run for each image of the multiple images in parallel. Advantageously this can provide for output and/or recommendations to be generated for each image in real-time or near real-time. As a result, relevant users in the physical location, such as store workers, can efficiently and quickly address the recommendations associated with the physical space (such as rearranged products on a particular rack, moving products from one rack to another rack, etc.).

FIGS. 8A and 8B are a flowchart of a process 800 for retraining one or more machine learning models based on runtime use of the model(s) in the image processing pipeline. The process 800 may be performed at predetermined time intervals, such as once a day, once every couple days, once a week, etc. In some implementations, the process 800 may be performed once new products are expected to be brought to market, once new products are brought to market (and appear in runtime images captured at mobile devices of relevant users, such as store workers), and/or in response to receiving user input at mobile devices indicating a modification to model output and/or recommendations.

Although the process 800 is described from the perspective of retraining a model based on user feedback and/or results from runtime use of the model, the retraining may also be performed when the model is deployed in a market where new or additional products are available for purchase in/on the physical space. For example, as described herein, the model may be trained on a maximum number of products that are available for purchase in a variety of physical spaces, physical locations, times (e.g., seasonal products and promotions), and/or geographic locations. When deployed for a particular physical space, physical location, or geographic location, the model may be retrained to identify and/or analyze products that are specific for that particular physical space, physical location, and/or geographic location. Moreover, the models described herein may be retrained whenever new products are brought to market. Sometimes, the retraining process 800 may be performed at predetermined time intervals, such as every 6 weeks or every 4 weeks. The retraining process 800 may also be performed at predetermined time intervals that may correspond to a timing that products are released or otherwise brought to market. In yet some implementations, the retraining process 800 may be performed iteratively and/or continuously to keep improving model accuracy. In other words, the retraining of process 800 may be dynamically deployed.

The process 800 may be performed by the backend computer system 102. The process 800 may also be performed by one or more other computing systems, devices, computers, networks, cloud-based systems, and/or cloud-based services. For illustrative purposes, the process 800 is described from the perspective of a computer system.

Referring to the process 800 in both FIGS. 8A and 8B, the computer system can establish a network connection between the computer system and a mobile device that is deploying an image processing pipeline described herein (block 802). Refer to FIGS. 7A, 7B, and 7C for further discussion.

In block 804, the computer system can receive, over the network connection, data from the image processing pipeline at the mobile device. When bandwidth is available, the data can be provide to the computer system. For example, the computer system can receive model(s) output(s) (block 806), generated recommendations (block 808), KPI analyses (block 810), user feedback about product recognition accuracy (block 812), and/or metadata (block 814). The metadata (block 814) may include user data, location data, and/or timestamp data. The metadata can be generated by the mobile device and/or collected by the mobile device from sensors throughout the physical space and/or the physical location and/or user input provided at the mobile device. Refer to FIGS. 7A, 7B, and 7C for further discussion.

The computer system can then transmit at least the KPI analyses and the metadata to a data lake for use in reporting (block 816). The KPI analyses and/or metadata may be used by the computer system to generate reports and/or compliance information about the particular physical space and/or the physical location.

The computer system can assess quality of one or more models that are deployed with the image processing pipeline in block 818. For example, the computer system may assess the quality based on checking the model(s) output(s) and/or the user feedback against one or more accuracy rules (block 820).

In some implementations, the computer system can use standard scores for accuracy testing, such as the 80/20 rule, where 20% of collected data is set aside for testing model accuracy. Sometimes, the computer system may not have enough training data in comparison to a total number of SKUs that the model may have to recognize/identified (as an illustrative example). As a result, 20% of the testing data may not cover all of the SKUs. Therefore, statistical techniques may be used to extend and product model accuracy for all of the SKUs. The statistical techniques may include similarity projection. As an illustrative example of similarity projection, the computer system may determine that the model is accurately recognizing products having green packaging for sour cream. The computer system may not have training data for other similar types of products having green packaging for lemons. Because the two products are similar (e.g., similar in type), the computer system can determine that accuracy for the products having green packaging for lemons may be the same as or similar to accuracy for recognizing the products having green packaging for sour cream. In some implementations, however, the computer system may determine that accuracy can be lowered if both of the products appear in the same images. The model may have more accuracy when one but not both of the products appear in the same images.

As another example, the computer system may assess the quality based on performing data drift detection techniques on the received data (block 822). Data drift detection techniques can be performed, as referred to in FIG. 1B. The data drift detection techniques can be performed in a continuous loop of checking model accuracy. Model accuracy may drift over time as new products are introduced and/or conditions change where the images are captured. When the model accuracy drifts by at least a predetermined amount, the computer system can determine to retrain the model.

In other words, the model accuracy and/or quality may be assessed based on the captured images and/or user feedback about product recognition accuracy. Sometimes, the data received from the mobile device may include metadata indicating which model was used to generate the model output of block 806. The computer system may then assess the quality of that identified model (rather than assessing quality of all models that were deployed in the image processing pipeline described herein). Sometimes the computer system may identify which model to assess in block 818 based on processing/analyzing the received data. For example, the computer system can receive user feedback indicating correct identification of a product appearing in images captured at the mobile device. The computer system can determine that products are identified in images using a product recognition model. Accordingly, the computer system can identify and retrieve, from a data store, the product recognition model to be used in the retraining process described herein.

In block 824, the computer system may determine whether the assessed quality of the model(s) satisfy one or more model accuracy criteria. The one or more model accuracy criteria can include one or more Boolean, string, and/or numeric values or thresholds. Such values and/or thresholds can be determined by the computer system and/or by a relevant user. As an illustrative example, the one or more model accuracy criteria can include a predetermined threshold level of accuracy (e.g., 80% accuracy in identifying a product correctly, 90% accuracy, 92% accuracy, 95% accuracy, 96% accuracy, 98% accuracy, 99% accuracy, 100% accuracy).

If the one or more model accuracy criteria is satisfied, the process 800 can stop. In other words, the model can be sufficiently accurate to not require additional training at a present time.

If the one or more model accuracy criteria is not satisfied, then the computer system can proceed to block 826, in which the computer system can determine whether sufficient image samples are available for retraining of one or more product SKUs for which model accuracy was below a predetermined threshold level. The computer system can poll the data store for the image samples of the particular product SKU(s) that the user feedback identified as being improperly recognized. The computer system can then determine whether resulting image samples signify a predetermined threshold quantity of images needed for training the model to identify the particular product SKU(s). As another example, the computer system can determine whether the resulting image samples represent the particular product SKU(s) in a predetermined quantity and/or type of viewpoints, angles, and/or dimensions. As yet another example, the computer system can determine whether the resulting image samples clearly represent the particular product SKU(s), regardless of lighting, colors, and/or other conditions that may have been present at a time that the images were captured. In some implementations, the computer system can determine whether sufficient image samples are available for retraining the model on any combination of product SKUs (including but not limited to the particular product SKU(s) identified by the user feedback).

If there are sufficient image samples available, the computer system can proceed to block 830, described below.

If there is an insufficient quantity of image samples available in block 826, the computer system can invoke a synthetic data module to generate image samples of the product SKU(s) for retraining (block 828). The synthetic data module may include a pipeline to create desired machine learning training data sets. These synthetic data sets can be generated based on as little as one ideal image of a particular product SKU and/or example artwork for the particular product SKU. The synthetic data sets may advantageously be used to train models described herein in low data availability environments.

The computer system can then perform block 830, in which the computer system can retrain the model based on (i) the image samples of the product SKU(s) for which the model accuracy was below the predetermined threshold level and (ii) the user feedback. Refer to FIGS. 4A, 4B, 5A, and 5B for further discussion about training techniques that may be used for this retraining of the model.

Once the model is retrained, the computer system can return to block 818, in which the model quality can be assessed. The computer system can iterate through the remaining operations of the process 800 until the one or more model accuracy criteria is satisfied in block 824.

In some implementations, once the model is retrained, the computer system can return the retrained model for deployment on the edge at network-connected mobile devices (block 832). The computer system can also store the retrained model in a data store. In some implementations, the full size version of the model can be retrained. Once the retraining is complete, the computer system may compress the retrained model and deploy on the edge to the network-connected mobile devices. Sometimes, the compressed version of the model may be retrained in the process 800 then returned to the network-connected mobile devices. If the mobile devices are not currently connected via a network to the computer system, then once a network connection is established the retrained model can be deployed to those mobile devices. As another example, the retrained model can be deployed to a mobile device during a next refresh cycle.

FIG. 9 is a system diagram of one or more system components that may be used to perform the disclosed techniques. The backend computer system 102, the mobile device(s) 104, the data store 202, and/or APIs 900A-N can communicate (e.g., wired, wirelessly) via the network(s) 106.

The backend computer system 102 can include a processor(s) 902, a communication interface 904, a model training engine 906, a data normalization engine 908, an image processing engine 910, a synthetic data generation engine 912, a KPI analysis engine 914, a recommendations determination engine 916, and/or an output generator 918. The backend computer system 102 can include one or more additional, other, or fewer components, engines, and/or software modules. For example, the backend computer system 102 can include one or more components described in reference to FIG. 1B, including but not limited to the application services 164 having the planogram compliance/KPI engine 184, the model repository and engine 186, the image recognition engine 180, and/or the KPI dashboards 190. As another example, the backend computer system 102 can include one or more components described in reference to FIG. 1B, including but not limited to the platform 166 having the image training engine 192, the KPI dashboards engine 194, the image labeling engine 196, and/or the platform/ML operations engine 198. Any of the components described in reference to FIG. 1B can be part of the components of the backend computer system 102 described in reference to FIG. 9.

Referring to the components of the backend computer system 102 in FIG. 9, the processor(s) 902 can be configured to receive, maintain, and execute instructions to perform one or more operations described herein. The communication interface 904 can be configured to provide communication and network connectivity amongst and between the components of the backend computer system 102 and other system components shown and described in FIG. 9.

The model training engine 906 can be configured to pre-train, train, retrain, and/or iteratively improve any of the models described herein. For example, the models may include but are not limited to a product recognition model, a product measurements model, and/or a KPI analysis model. The engine 906 can generate compressed models 942A-N, which can be stored in the data store 202 and/or pushed to the mobile device(s) 104 during refresh cycles and/or when network connections can be established. The engine 906 can train the models 942A-N using at least training data 954, training parameters 956A-N, physical space information 946, planograms 944A-N, products information 948A-N, and/or rulesets 958A-N (e.g., rules for determining and assessing model accuracy, one or more criteria for assessing model accuracy), which can be retrieved from the data store 202 and/or provided as input at the mobile device(s) 104, then transmitted to the backend computer system 102 (or the data store 202). Refer to at least FIGS. 4A, 4B, 5A, 5B, 6A, 6B, 8A, and 8B for further discussion about training operations that can be performed by the model training engine 906.

The data normalization engine 908 can be configured to normalize and/or correct any data that may be received at the backend computer system 102 and used for operations such as training models and/or executing the image processing pipeline described herein during runtime use.

The image processing engine 910 can be configured to execute one or more operations described herein with regards to the image processing pipeline. The engine 910 can access the compressed models 942A-N and/or image data 952 from the data store 202 to perform the one or more operations. The models 942A-N can be applied to the image data 952, as described herein. Sometimes, for example, some operations can be performed on the edge at the mobile device(s) 104 while other operations can be performed at the backend computer system 102 by the image processing engine 910. Sometimes, the engine 910 can perform additional processing operations once the image processing pipeline has been executed at the mobile device(s) 104 and the mobile device(s) 104 has pushed pipeline results/output to the backend computer system 102 (or to the data store 202 for storage). Refer to at least FIGS. 1A, 1B, 7A, 7B, and 7C for further discussion about operations of the image processing pipeline that can be performed by the image processing engine 910 and/or on the edge at the mobile device(s) 104.

The synthetic data generation engine 912 can be configured to generate synthetic training data (e.g., images) for use by the model training engine 906. Refer to at least FIGS. 8A and 8B for further discussion.

The KPI analysis engine 914 can be configured to generate one or more compliance reports, reports, and/or KPI analyses based on results from the image processing pipeline being executed on the edge at the mobile device(s) 104 and/or in the cloud at the image processing engine 910 of the backend computer system 102. For example, the engine 914 can retrieve model output 950A-N, one or more of the compressed models 942A-N, one or more of the planograms 944A-N, the physical space information 946, the products information 948A-N, the image data 952, and/or one or more of the rulesets 958A-N (e.g., rules for determining compliance with one or more KPIs and/or business objectives) from the data store 202. Any of this retrieved information may also be retrieved from the mobile device(s) 104. Using the retrieved information, the engine 914 can determine whether a particular physical space captured by the image data 952 has expected conditions (e.g., product arrangement/layout on racks in a store, stock conditions of products) for one or more KPI analyses. Output from KPI analyses can be stored as KPI analyses 960A-N in the data store 202. Refer at least to FIGS. 7A, 7B, and 7C for further discussion about performing the KPI analyses.

The recommendations determination engine 916 can be configured to generate one or more recommendations 962A-N for remedial actions that can be performed by relevant users in the particular physical space represented by the image data 952. Such recommendations may be generated based on the model output 950A-N, the rulesets 958A-N (e.g., rulesets and/or one or more criteria for determining whether and what remedial actions may be required), and/or output from one or more operations in the image processing pipeline and/or the KPI analyses. The recommendations 962A-N can be stored in the data store 202 and/or provided to the mobile device(s) 104.

The output generator 918 may be configured to generate one or more GUI displays described herein. Refer to FIGS. 10A, 10B, 10C, 10D, 10E, 10F, 10G, 10H, 10I, 10J, 10K, 10L, 11A, and 11B for further discussion about the GUIs. Moreover, the generator 918 may be configured to generate compliance reports and other reports that may be desired by relevant users of the particular physical space that is captured in the image data 952. The generator 918 may store such reports as reports 964A-N in the data store 202. The generator 918 may also provide the reports 964A-N to the mobile device(s) 104 of the relevant users.

The mobile device(s) 104 may include a processor(s) 920, a communication interface 922, input devices 924, output devices 926, a mobile application module 928, and an image processing application 930. The image processing application 930 may include, as illustrative examples, an image capturing module 932, an image processing module 934, a KPI analysis module 936, a recommendations module 938, an output generation module 940, and/or the compressed models 942A-N. In brief, the processor(s) 920 may be configured to receive instructions from the backend computer system 102 and execute those instructions to perform one or more of the operations in the image processing pipeline described herein. The communication interface 922 may be configured to provide network communication between and amongst the components of the mobile device(s) 104 and other system components described in FIG. 9.

The input devices 924 can include any types of devices for receiving user input and/or feedback. The input devices 924 can include but are not limited to a touch screen, a microphone, a keyboard, a mouse, cameras, other sensor devices (e.g., accelerometer, gyroscope, RFID reader, location reader, LiDAR sensor), and/or haptic feedback devices. The output devices 926 can include any types of devices for presenting information to a user of the mobile device 104. The output devices 926 can include but are not limited to display screens, speakers, and/or haptic feedback devices.

The mobile application module 928 can be configured to deploy a mobile application at the mobile device 104. The mobile application can be an existing mobile application. The mobile application can be a new mobile application that is generated and provided by the backend computer system 102, as described herein.

The image processing application 930 can be provided by the backend computer system 102 for deployment at the mobile device 104 for on-edge processing. The image processing application 930 can be deployed as a standalone mobile application at the mobile device 104. The image processing application 930 can be embedded or deep linked to an existing mobile application provided by the mobile application module 928 to enhance capabilities of the existing mobile application. The image processing application 930 can make calls to one or more of the APIs 900A-N in order to perform operations of the image processing pipeline on the edge and in real-time or near real-time. Refer to FIGS. 1A, 1B, 7A, 7B, and 7C for further discussion about the operations of the image processing pipeline that can be performed on the edge at the mobile device 104.

Referring to sub-components of the image processing application 930, the image capturing module 932 can provide functionality for the mobile device 104 (such as one or more cameras of the mobile device 104) to capture the image data 952 during runtime use.

The image processing module 934 can be configured to process the image data 952 using one or more of the compressed models 942A-N. Processing the image data 952 can include recognizing products and their pricing information and/or measurements in the image data 952. The module 934 can generate the model output 950A-N. The module 934 may also make one or more API call to the APIs 900A-N in order to perform any of the image processing operations.

The KPI analysis module 936 can be configured to perform one or more of the KPI analyses 960A-N based on the model output 950A-N. The module 936 can make one or more calls to the APIs 900A-N to access the rulesets 958A-N, the planograms 944A-N, the physical space information 946, and/or the products information 948A-N for performing the KPI analyses.

The recommendations module 938 can be configured to generate one or more of the recommendations 962A-N for actions that can be taken in the physical space that is captured in the image data 952. Such recommendations can be generated using one or more of the compressed models 942A-N. The recommendations module 938 may also make one or more calls to the APIs 900A-N to access the rulesets 958A-N, the planograms 944A-N, the physical space information 946, the products information 948A-N, the model output 950A-N, and/or the KPI analyses 960A-N for determining the recommendations 962A-N.

The output generation module 940 can be configured to generate and/or present one or more of the GUIs described herein at the output devices 926 of the mobile device 104. The module 940 can generate the GUIs based on the model output 950A-N from at least the image processing module 934, the KPI analyses 960A-N from at least the KPI analysis module 936, and/or the recommendations 962A-N from at least the recommendations module 938. The module 940 can also make one or more calls to the APIs 900A-N to access at least the reports 964A-N that were generated by the backend computer system 102. The module 940 can then present the reports 964A-N in the GUIs.

FIGS. 10A, 10B, 10C, 10D, 10E, 10F, 10G, 10H, 10I, 10J, 10K, and 10L illustrate example graphical user interfaces (GUIs) for performing the image processing pipeline for real-time and edge assessment of in-store conditions. Any of the GUIs described herein may be presented in a mobile application (existing or new) at a computing device, a computer, a user device, and/or a mobile device. For example, the GUIs may be presented at the mobile device 104 of a frontline worker or other relevant user associated with a store, retail environment, or other physical location described herein. For illustrative purposes, the GUIs are described from the perspective of being presented at the mobile device of a frontline worker in a store.

Figure 10B:
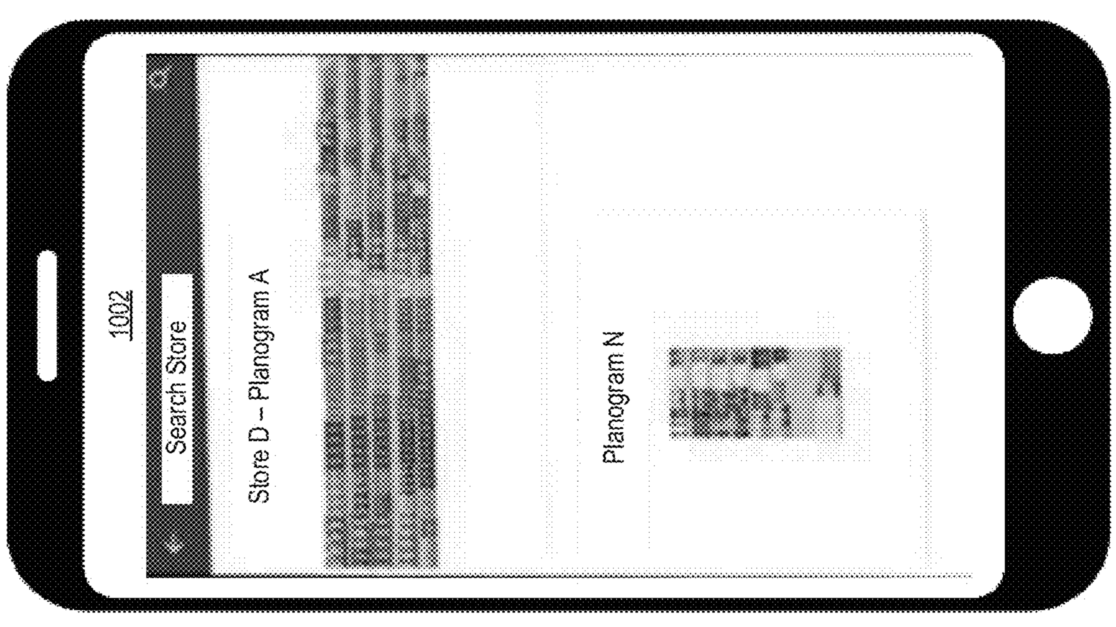
FIGS. 10A, 10B, 10C, 10D, 10E, 10F, 10G, 10H, 10I, 10J, 10K, and 10L illustrate example graphical user interfaces (GUIs) for performing the image processing pipeline for real-time and edge assessment of in-store conditions.
Figure 10A:
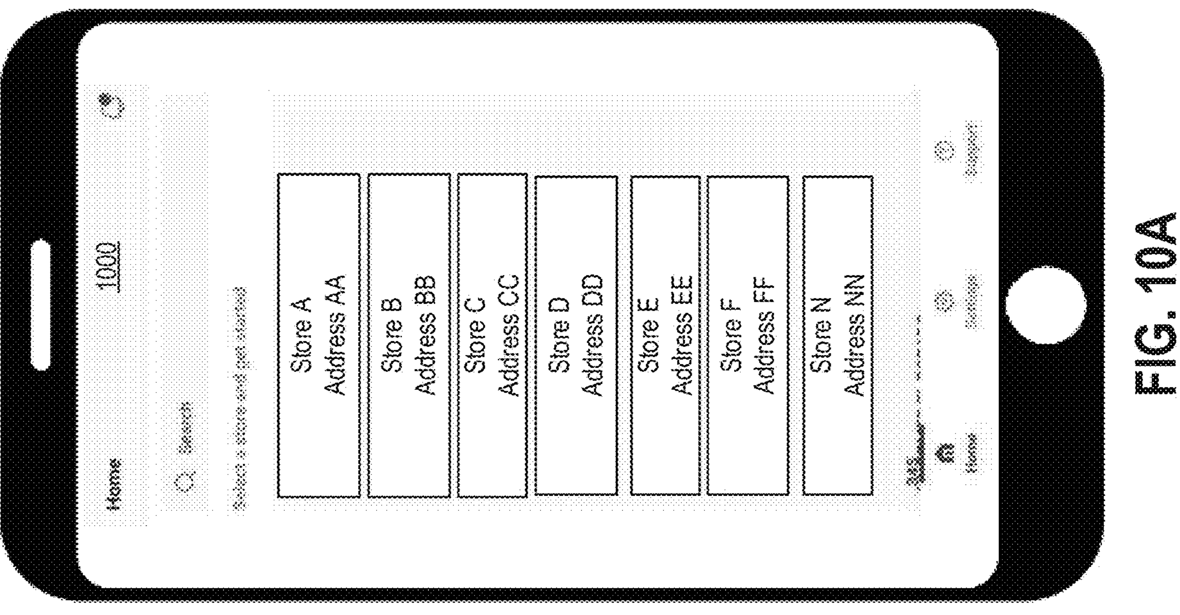

FIG. 10A illustrates a GUI 1000 that may be configured to present a list of stores (e.g., physical locations) for which in-store conditions may be assessed. The frontline worker may search for a particular store of interest by typing in or otherwise inputting store information into a search bar/search field. The frontline worker may input the store's area code, geographic location, store code, name, address, etc. the GUI 1000 may populate with a list of relevant stores from which the frontline worker may choose. Once the frontline worker selects one of the stores presented in the GUI 1000, a GUI 1002 may be presented at the mobile device.

The GUI 1002, as shown in FIG. 10B, may be configured to present a planogram for the particular user-selected store. Sometimes, the GUI 1002 may present multiple planograms for the selected store. Sometimes, the GUI 1002 may present one or more planograms for multiple stores (not just a user-selected store). The frontline worker may select the planogram of interest from the GUI 1002 before proceeding to capture images of products in the particular store using their mobile device. In some implementations, the GUI 1002 may not be presented at the mobile device and/or the frontline worker may not select a planogram for the store. In other words, once the frontline worker selects the store of interest, the mobile application at the mobile device may automatically retrieve and/or identify the appropriate planogram for that selected store. The frontline worker may then proceed to capture images of fixtures and/or products in the physical store, which corresponds to the selected store in the mobile application.

Figure 10D:
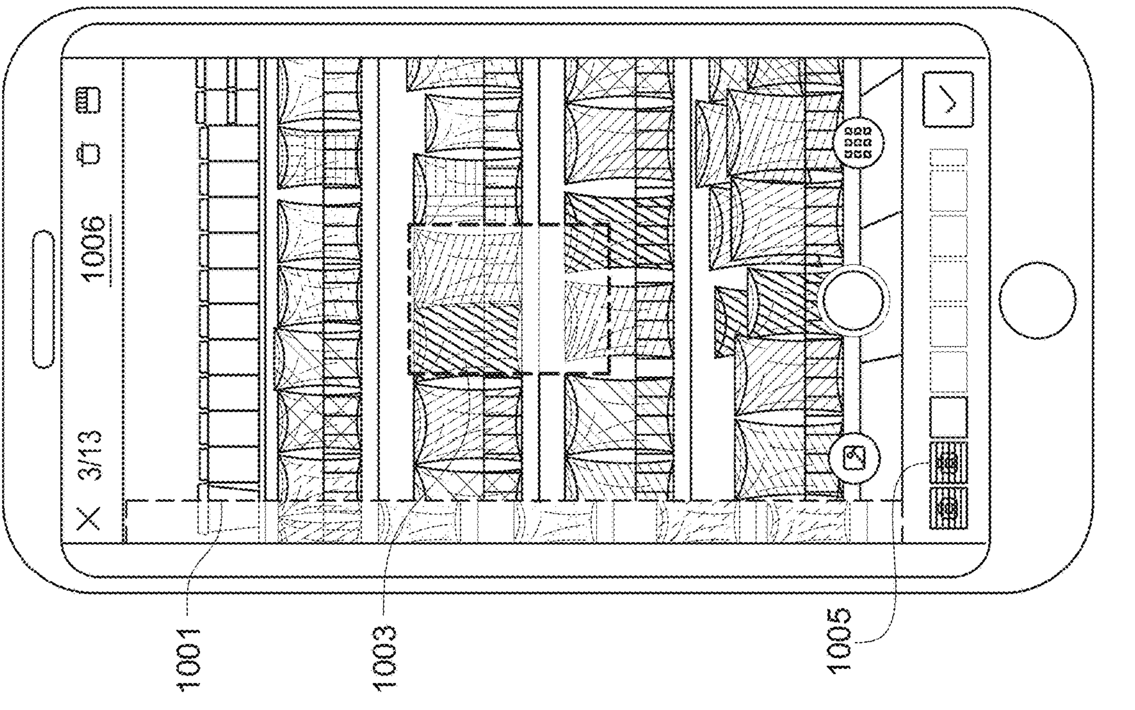
Figure 10C:
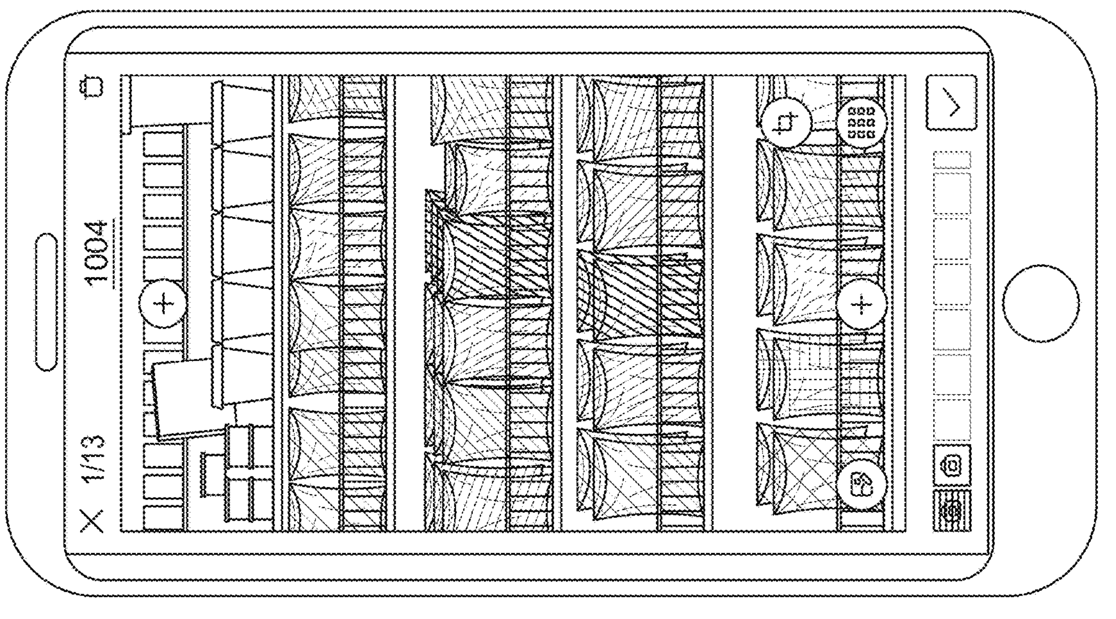

Once the frontline worker has selected the particular store and the planogram associated with the store, a GUI 1004, as shown in FIG. 10C, may be presented at the mobile device. The GUI 1004 may be configured to allow for the frontline worker to capture images of the fixtures (e.g., racks, shelves, support structures, other physical spaces) and/or the products in the physical store using one or more cameras of the mobile device. The GUI 1004 may be configured to allow the frontline worker to capture multiple images successively (e.g., in a row). The frontline worker may capture as few or as many images as they desire. Sometimes, the GUI 1004 can limit how many images the frontline worker may capture. For example, the GUI 1004 may prevent the frontline worker from capturing more then 8, 9, 10, 11, 12, 13, 14, 15, etc. images. As the images are captured, snapshots of those images may populate an image strip 1005 at a bottom portion of the GUI, as shown in GUI 1006 of FIG. 10D. The image strip 1005 can provide visual guidance to the frontline worker to help them visualize how many images they have captured, what they imaged, and/or how many images they may still capture.

The GUI 1006 in FIG. 10D is similar to the GUI 1004 in that the GUI 1006 may be configured to allow the frontline worker to capture images of the fixtures and/or the products in the physical store. Moreover, the GUI 1006 may include a bounding box 1001, which may be positioned, by processors of the mobile device, around a portion of the view shown in the GUI 1006 for which the frontline worker has already captured images (such as in the GUI 1004 of FIG. 10C). In other words, the GUIs 1006 and 1004 may present a live preview of the physical space that the frontline worker is imaging with the camera(s) of the mobile device. Annotations may be generated and presented (by the processors of the mobile device) to overlay the live preview of the physical space. The annotations may include at least the bounding box 1001. As a result, the bounding box 1001 may provide visual guidance to the frontline worker indicating what they have already imaged and/or what they may still image.

As another example, the GUI 1006 may include a bounding box 1003, which may be arranged/designated by the frontline worker to assist the frontline worker in capturing an image of a particular portion of the physical space shown in the live preview presentation at the mobile device. In other words, the frontline worker may only desire to capture an image of the fixtures and/or products that may appear within the bounding box 1003 in the GUI 1006. In some implementations, the frontline worker may draw/apply the box 1003 around one or more products and/or fixtures to image. In some implementations, the GUI 1006 may automatically generate and present the bounding box 1003 as an annotation over the live preview of what is being captured by the camera of the mobile device. As a result, the bounding box 1003 can provide visual guidance and direction to assist the frontline worker in capturing the product(s) and/or the fixture(s) of interest.

In some implementations, the GUI 1006 may include the bounding boxes 1001 and/or 1003 to provide image capturing guidance to the frontline worker. Such guidance may include, but is not limited to, visual indications that the mobile device is being or is tilted and/or that the images being captured are blurry. As a result, the frontline worker can adjust and recapture the images. Since the machine learning models described herein process the captured images in order to recognize products therein, the models accuracy may depend on image quality. As a result, the image capturing guidance described herein may improve model recognition accuracy without requiring extensive training of the model and/or other systems and techniques described herein.

Referring to both FIGS. 10C and 10D, once an image is captured by the mobile device using the GUI 1004 and/or the GUI 1006, the processors of the mobile device may automatically perform one or more image quality checks. For example, the mobile device may apply one or more rules and/or machine learning models described herein to determine whether the captured image(s) is sharp, blurry, or does not have sufficient quality for other machine learning models to then process and recognize products. If the mobile device determines that the image(s) is too blurry, the mobile device can present in either the GUI 1004 and/or the GUI 1006 a pop-out window that overlays a portion thereof and that indicates the image(s) is blurry. The pop-out window may also include a selectable option to capture another image. If the frontline worker selects the option to capture another image, the mobile device may be updated to present the GUI 1004 and/or the GUI 1006. If the mobile device determines that the image(s) passes the quality check(s), the mobile device may simply continue to present the GUIs described herein to the frontline worker—in other words, the frontline worker may continue capturing images and/or performing one or more analyses/compliance checks.

Still referring to FIGS. 10C and 10D, once the frontline worker captures images, the frontline worker may also provide input to the GUIs 1004 and 1006 to crop and/or resize each image. The images can be processed according to the image processing pipeline described herein in parallel and/or at a same or similar time. Sometimes, multiple images (e.g., 8, 13, etc. images) may be processed at a same or similar time within seconds and/or minutes.

Figure 10F:
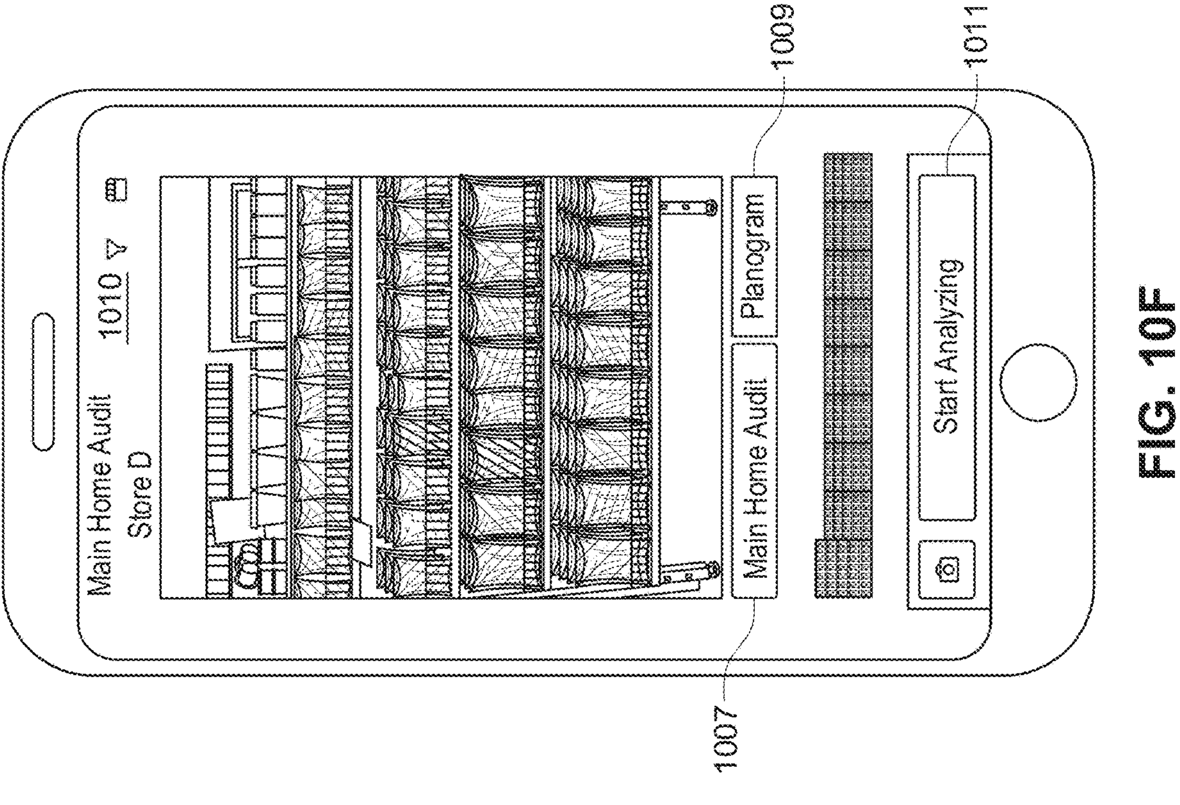
Figure 10E:
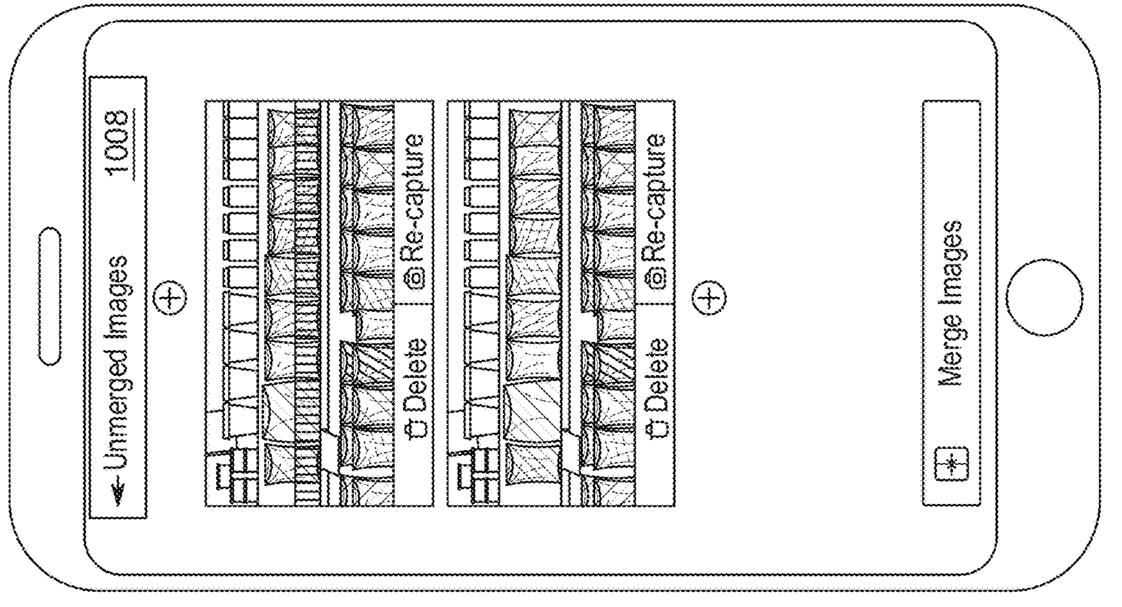

FIG. 10E illustrates a GUI 1008, which may be configured to provide the frontline worker with an option to merge images that were captured using the GUIs 1004 and 1006 of FIGS. 10C and 10D. The frontline worker can provide input at the GUI 1008 to capture additional images, delete one or more images that were already captured, re-capture one or more images, and/or merge one or more images. Images can be merged using the GUI 1008 to provide a holistic view or otherwise enhance images captured of a particular physical space in the store (e.g. an entire shelf or rack, from floor to ceiling). In some implementations, the processors of the mobile device may be configured to merge the one or more user-selected images in order to enhance or otherwise improve quality of at least one of those images. For example, an image of a particular product on the shelf can be merged into an image of the entire shelf to enhance the quality/readability of the particular product on the shelf.

FIG. 10F illustrates a GUI 1010, which may be configured to provide the frontline worker with a summary of all images that were captured of the particular physical space and one or more selectable options to begin analysis of those images. Using the GUI 1010, the frontline worker can review each of the captured images and/or re-capture any one or more of those images. Before beginning any analyses, the frontline worker can toggle between a Main Home Audit option 1007 and a Planogram option 1009. Selecting the option 1007 allows for a store-level view to be presented at the device. Selecting the option 1009 allows for a planogram view to be presented at the device, the planogram view indicating a comparison of what appears the captured images with what is expected in the planogram. Once the frontline worker selects either option 1007 or 1009, the frontline worker may select a button 1011 to start analyzing. The processor of the mobile device may execute the image processing pipeline described herein based on whether the frontline worker selected the Main Home Audit option 1007 or the Planogram option 1009 for the particular imaged physical space.

Figure 10H:
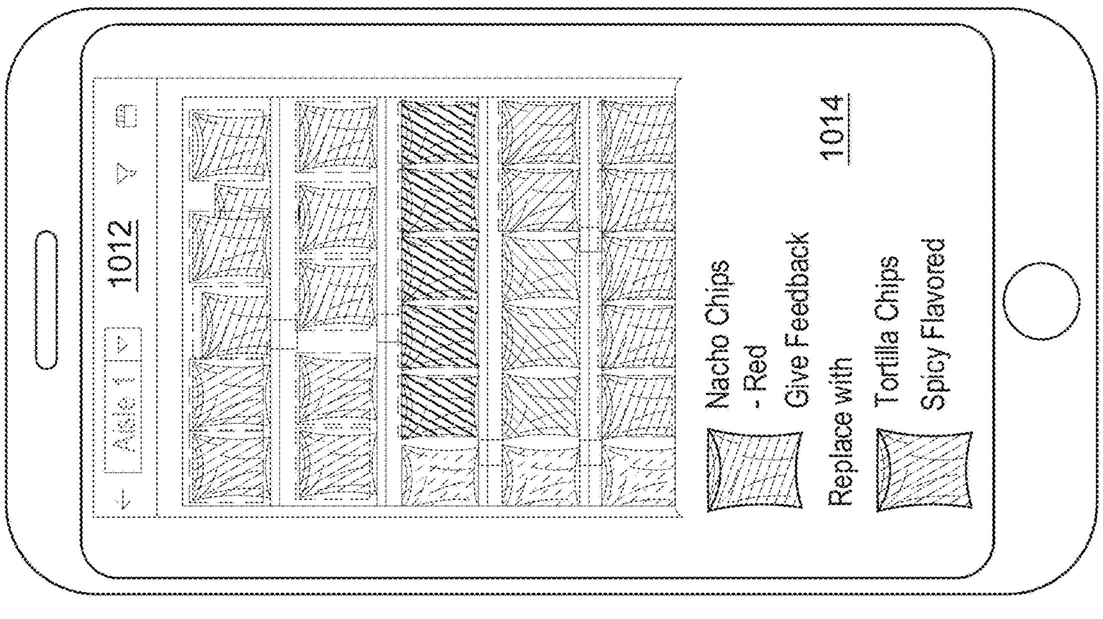
Figure 10G:
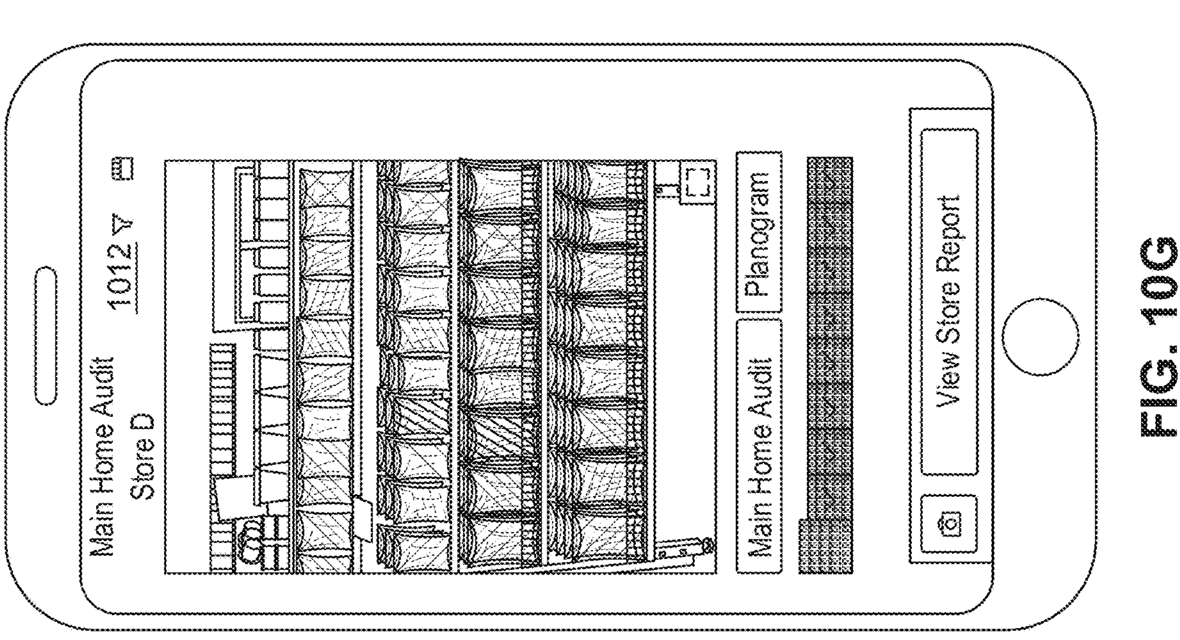

FIG. 10G illustrates an example GUI 1012, which may be presented at the mobile device in response to executing the image processing pipeline described herein. As described in FIG. 10F, the frontline worker selected the option 1007 to perform a main home audit. The GUI 1012 of FIG. 10G may be presented in response to performing the main home audit. The GUI 1012 may present a color-coded realogram of the particular physical space that was imaged. For example, the processor of the mobile device may generate color-coded (or other indicia, such as patterns, highlighting, glows, text) bounding boxes around one or more products and/or fixtures that may appear in the image(s). Green-colored bounding boxes may be presented around products in the images that the processor of the mobile device recognized (e.g., recognized their SKU) and identified as being within a correct location in the physical space or the store as a whole. Read-colored bounding boxes may be presented around products in the images that the processor of the mobile device recognized but identified as being in an incorrect location in the physical space and/or in the store as a whole. Grey-colored bounding boxes may be presented around products in the images that the processor of the mobile device did not recognize (e.g., did not recognize their SKU). In some implementations, the frontline worker may select any of the products having bounding boxes in the GUI 1012. Selecting a product having a bounding boxes may cause a pop-out window 1014 to be presented as partially overlaying the GUI 1012, as shown in FIG. 10H. In some implementations, the frontline worker may provide input such as user preferences, which can indicate whether the frontline worker wishes to view the information in the pop-out window 1014 or in another view. The other view, for example, may include presenting information about the products in a scroll-down feature of the GUI 1012. The viewing of information may be user-configurable, and various other views are also possible.

FIG. 10H illustrates the GUI 1012 with the pop-out window 1014, which may be configured to present product information that was identified, recognized, and/or determined by the processor of the mobile device and using the image processing pipeline described herein. The pop-out window 1014 may overlay a portion of the GUI 1012. In some implementations, the pop-out window 1014 may be presented as its own GUI instead of overlaying the GUI 1012. The pop-out window 1014 may indicate what product was identified/recognized by the processor of the mobile device. In some implementations, the pop-out window 1014 may include additional information, such as recommendations about products to swap with or replace the recognized product. Such recommendations may be determined by the processor of the mobile device using the image processing pipeline described herein. Sometimes, the recommendations can be determined if the processor recognizes a particular product but determines that the particular product is in a wrong location in the physical space or in the store as a whole. The recommendations may then indicate where to place the particular product and/or what product(s) to put in the current location of the particular product. Sometimes, the recommendations may be based on a store, region, time, and/or other relevant information such that, for example, popular products may be featured and/or more prominently displayed than other products, promotional products may be featured and more prominently displayed than other products, and/or products with lagging sales may be featured and more prominently displayed than other products.

Figure 10J:
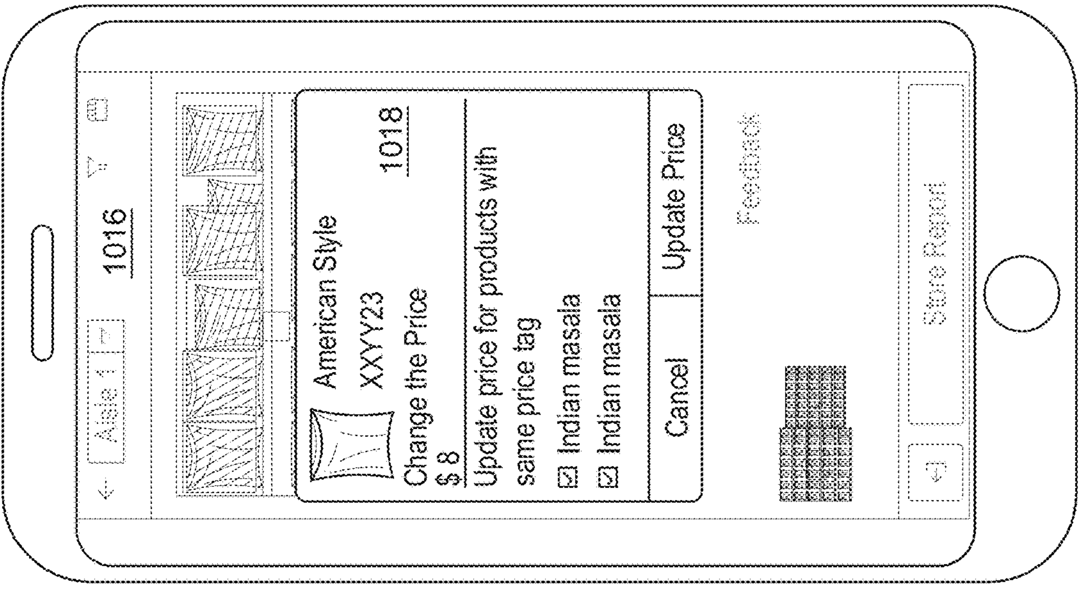
Figure 10J:
Figure 10I:
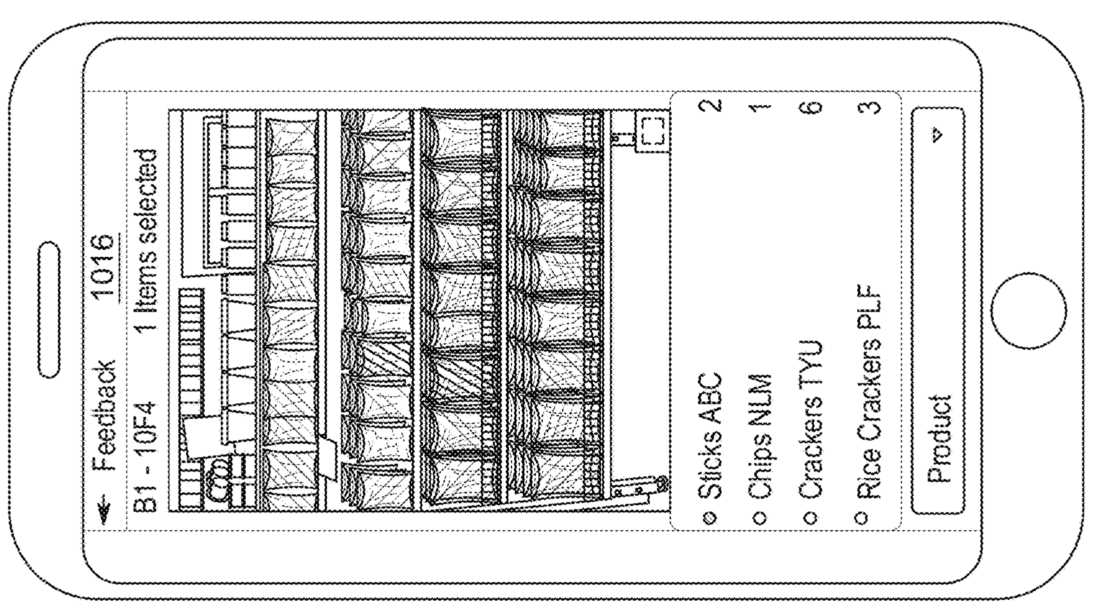

FIGS. 101 and 10J illustrate GUI 1016, respectively, through which the frontline worker may provide feedback in response to the analyses performed on the edge at the mobile device. For example, in the GUI 1016 of FIG. 101, the frontline worker may select any of the products that were recognized by the processor of the mobile device, which may be identifiable by the bounding boxes described herein. Upon selection of a product in the GUI 1016, a pop-out window 1018 may be presented as partially overlaying the GUI 1016, shown in FIG. 10J. In some implementations, the information presented in the pop-out window 1018 may indicate which products were identified and/or a count of each product type that was recognized in the images.

The pop-out window 1018 may present information that was identified and/or recognized by the processor of the mobile device for the user-selected product. The pop-out window 1018 may present selectable options and/or input fields for the frontline worker to adjust information associated with the selected product. For example, the pop-out window 1018 may present a current price of the selected product. The frontline worker may then provide input to adjust the price and/or apply the adjusted price to one or more different stores and/or geographic regions/locations.

Figure 10L:
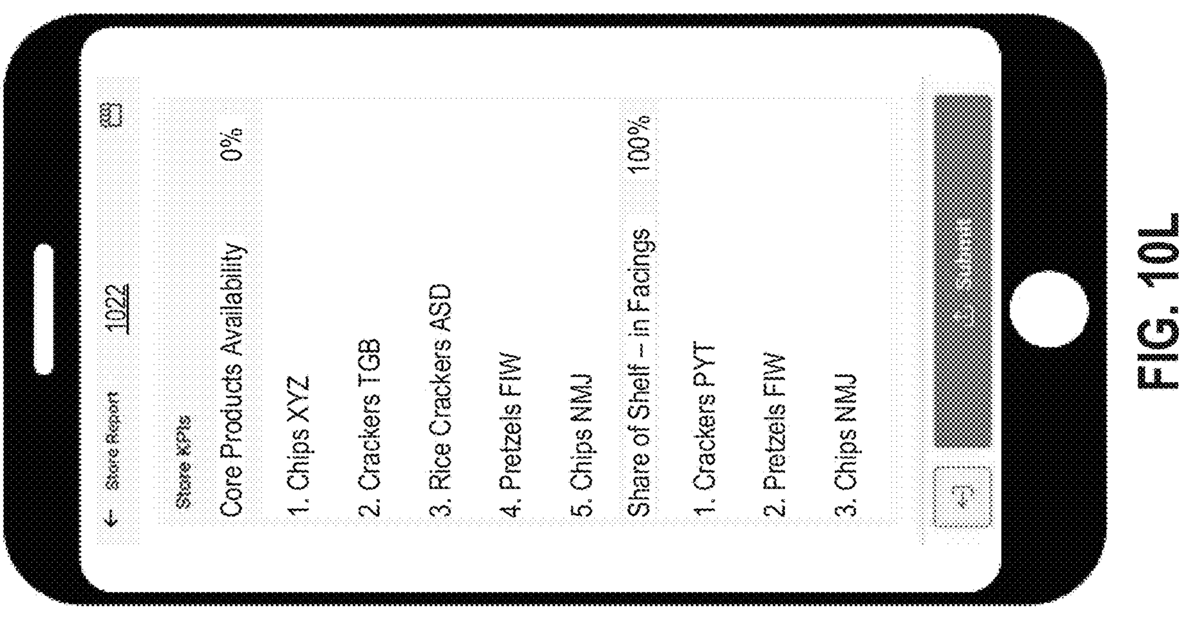
Figure 10K:
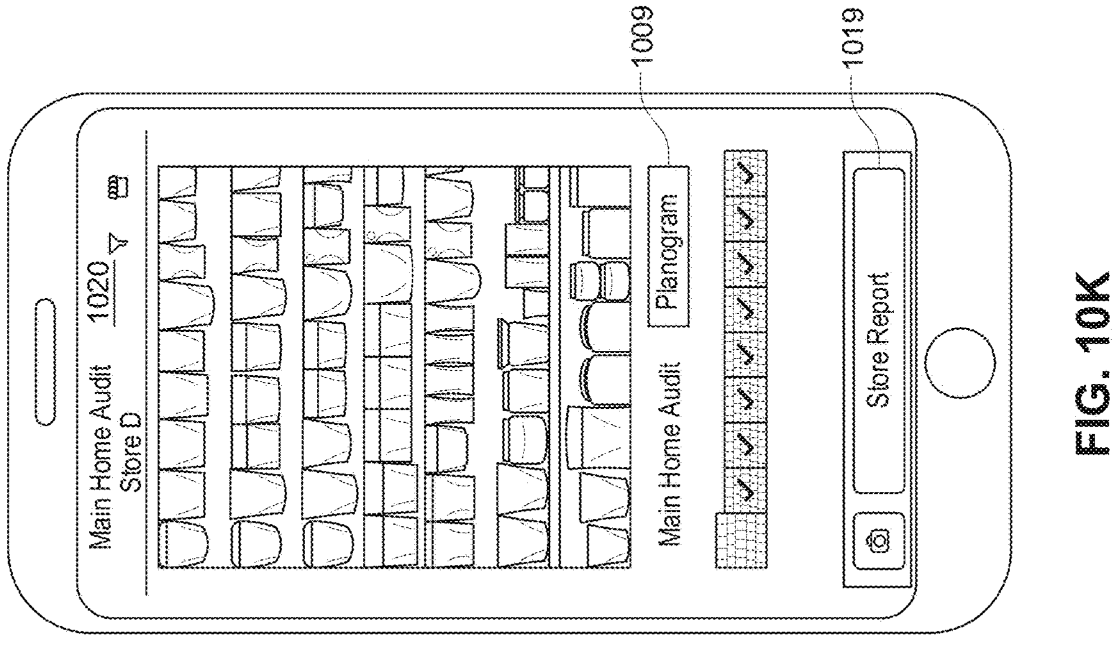

FIG. 10K illustrates a GUI 1020 for performing an analysis on the captured images according to the Planogram option 1009. For example, once the frontline worker captures the images of the physical space as described above, the frontline worker may toggle to the Planogram option 1009 and select an option 1019 to cause the processor of the mobile device to execute the image processing pipeline according to the planogram for the particular store. Results from executing the image processing pipeline may be presented in a GUI 1022, as shown in FIG. 10L.

The GUI 1022 in FIG. 10L may be configured to present results from performing one or more analyses on the captured images of the physical space. For example, the GUI 1022 may present one or more results for KPI checks and/or other compliance checks that may be performed by the processor of the mobile device as part of the image processing pipeline. Here, the GUI 1022 presents a core products availability KPI and a share of shelf in facings KPI. Other KPIs described herein may also be presented in the GUI 1022. The core products availability KPI indicates core products on a shelf and how many or what percent of those core products are available on the shelf. In the illustrative example of FIG. 10L, 0% of core products are available or otherwise appear on the shelf. The FIG. 10L therefore presents a list of core products that should be placed on the shelf. The share of shelf in facings KPI indicates a percentage or products that should be on the shelf in their correct locations/arrangement. In this example 100% of the correct products are in their correct shelf locations/arrangements. The FIG. 10L may also list which of the products are in their correct shelf locations/arrangements. In some implementations, if the correct products are not in their correct shelf locations/arrangements, the FIG. 10L can present a list of products that should be placed accordingly.

Figure 11B:
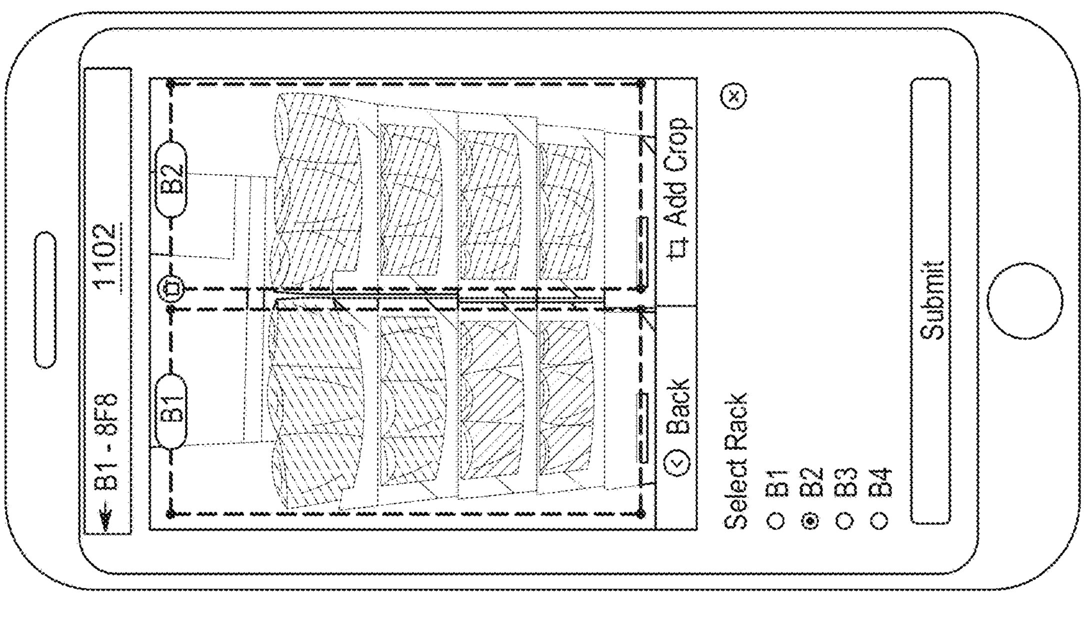
FIGS. 11A and 11B illustrate example GUIs for performing the image processing pipeline described herein.
Figure 11B:
Figure 11A:
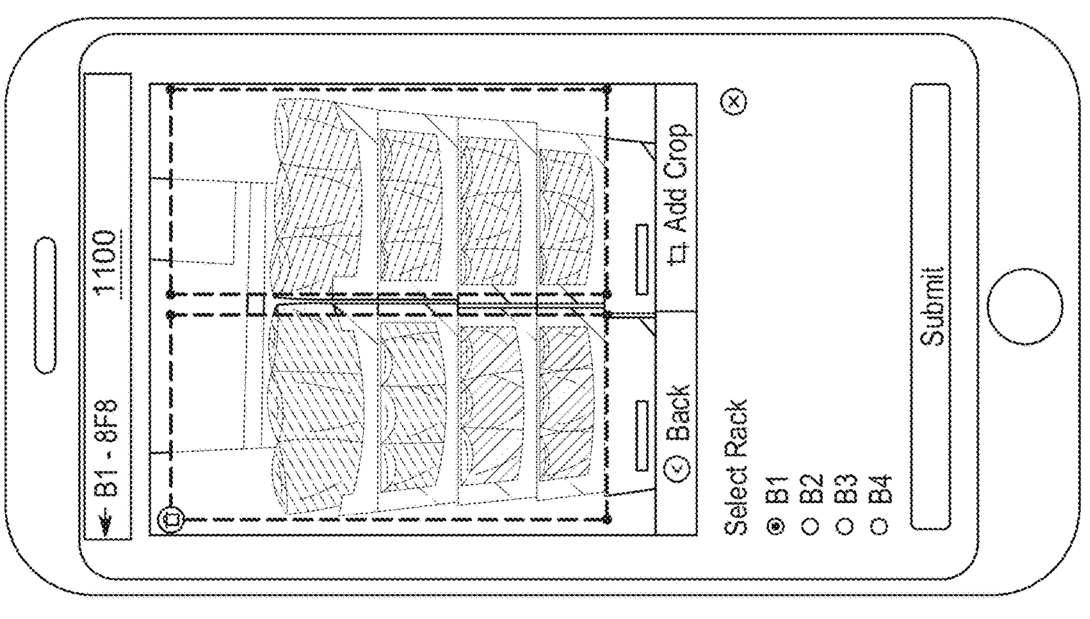

FIGS. 11A and 11B illustrate example GUIs 1100 and 1102 for performing the image processing pipeline described herein. The frontline worker, as described above, may capture multiple images of a physical space in a store using their mobile device. From one image, the frontline worker can interact with features, fields, selectable options, and/or the image directly in the GUIs 1100 and 1102 to crop and/or identify multiple or particular racks, shelves, products, or other physical spaces. The image may then be processed according to the image processing pipeline based on the user interactions in the GUIs 1100 and 1102.

In the GUI 1100 of FIG. 11A, the frontline worker may designate a first rack from a single image. In the GUI 1102 of FIG. 11B, the frontline worker may designate a second rack from the same image that appeared in the GUI 1100 of FIG. 11A. The processor of the mobile device may then analyze the first rack together with the second rack according to the image processing pipeline. In some implementations, the processor may analyze the first rack separately from the second rack according to the image processing pipeline. In some implementations, the GUIs 1100 and 1102 may be used by the frontline worker to manually draw and designate which rack they want to focus on/process using the disclosed technology. For example, the frontline worker may capture the image using their mobile device. The frontline worker can then provide input in either of the GUIs 1100 or 1102 to crop the image to just a particular rack of interest, such as the first rack or the second rack.

Sometimes, the frontline worker can use the GUI 1102 in FIG. 11B to select which rack they are actually looking at/analyzing. In other words, sometimes, the disclosed technology may incorrectly identify the rack. The frontline worker may then provide user input in the GUI 1102 (such as by selecting one or more radio buttons shown in the GUI 1102) to correctly select which rack they are actually looking at/analyzing. After all, compliance checks described herein depend greatly on which particular rack is being analyzed (e.g., racks may be designed for different products and/or different product arrangements/layouts). Allowing the frontline worker to adjust and select which rack they are actually analyzing can ensure that appropriate compliance checks are used to analyze the particular rack.

Figure 12:
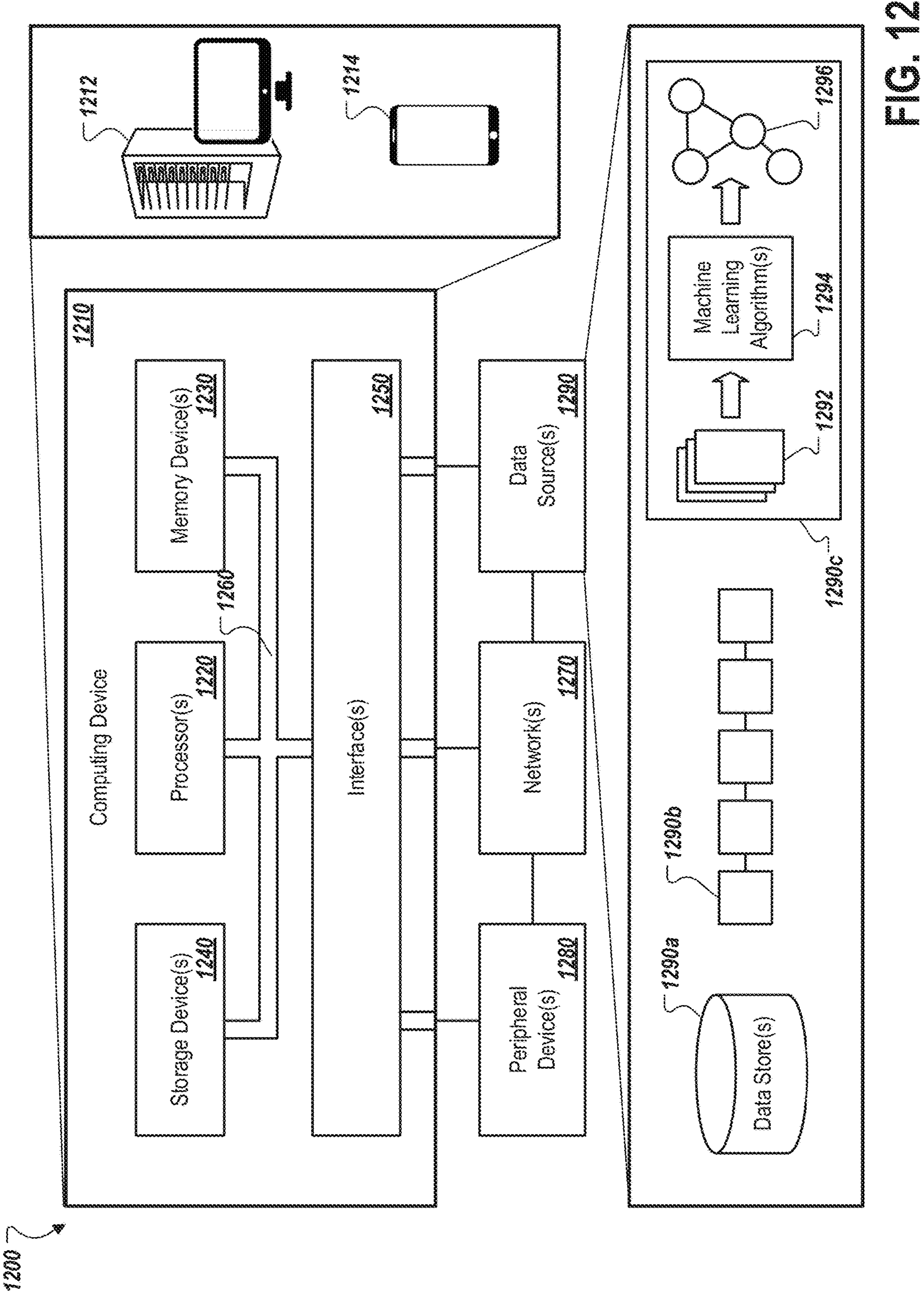
FIG. 12 is a schematic diagram that shows an example of a computing device and a mobile computing device.

FIG. 12 is a schematic diagram that shows an example of a computing system 1200 that can be used to implement the techniques described herein. The computing system 1200 includes one or more computing devices (e.g., computing device 1210), which can be in wired and/or wireless communication with various peripheral device(s) 1280, data source(s) 1290, and/or other computing devices (e.g., over network(s) 1270). The computing device 1210 can represent various forms of stationary computers 1212 (e.g., workstations, kiosks, servers, mainframes, edge computing devices, quantum computers, etc.) and mobile computers 1214 (e.g., laptops, tablets, mobile phones, personal digital assistants, wearable devices, etc.). In some implementations, the computing device 1210 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 1210, and an entire system can be made up of multiple devices communicating with each other. For example, the computing device 1210 can be part of a computing system that includes a network of computing devices, such as a cloud-based computing system, a computing system in an internal network, or a computing system in another sort of shared network. Processors of the computing device (1210) and other computing devices of a computing system can be optimized for different types of operations, secure computing tasks, etc. The components shown herein, and their functions, are meant to be examples, and are not meant to limit implementations of the technology described and/or claimed in this document.

The computing device 1210 includes processor(s) 1220, memory device(s) 1230, storage device(s) 1240, and interface(s) 1250. Each of the processor(s) 1220, the memory device(s) 1230, the storage device(s) 1240, and the interface(s) 1250 are interconnected using a system bus 1260. The processor(s) 1220 are capable of processing instructions for execution within the computing device 1210, and can include one or more single-threaded and/or multi-threaded processors. The processor(s) 1220 are capable of processing instructions stored in the memory device(s) 1230 and/or on the storage device(s) 1240. The memory device(s) 1230 can store data within the computing device 1210, and can include one or more computer-readable media, volatile memory units, and/or non-volatile memory units. The storage device(s) 1240 can provide mass storage for the computing device 1210, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 1250 can include various communications interfaces (e.g., USB, Near-Field Communication (NFC), Bluetooth, WiFi, Ethernet, wireless Ethernet, etc.) that can be coupled to the network(s) 1270, peripheral device(s) 1280, and/or data source(s) 1290 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 1250 can include a control interface that receives commands from an input device (e.g., operated by a user) and converts the commands for submission to the processors 1220. The interface(s) 1250 can include a display interface that includes circuitry for driving a display to present visual information to a user. The interface(s) 1250 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications. In some implementations, the disclosed technology may include image, audio, and/or data compression and decompression capabilities to allow for more efficient transmission of data, such as in low-bandwidth environments.

The network(s) 1270 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 1210 can communicate with the peripheral device(s) 1280, the data source(s) 1290, and/or other computing devices over the network(s) 1270. In some implementations, the computing device 1210 can directly communicate with the peripheral device(s) 1280, the data source(s), and/or other computing devices.

The peripheral device(s) 1280 can provide input/output operations for the computing device 1210. Input devices (e.g., keyboards, pointing devices, touchscreens, microphones, cameras, scanners, sensors, etc.) can provide input to the computing device 1210 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 1210 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 1290 can provide data for use by the computing device 1210, and/or can maintain data that has been generated by the computing device 1210 and/or other devices (e.g., data collected from sensor devices, data aggregated from various different data repositories, etc.). In some implementations, one or more data sources can be hosted by the computing device 1210 (e.g., using the storage device(s) 1240). In some implementations, one or more data sources can be hosted by a different computing device. Data can be provided by the data source(s) 1290 in response to a request for data from the computing device 1210 and/or can be provided without such a request. For example, a pull technology can be used in which the provision of data is driven by device requests, and/or a push technology can be used in which the provision of data occurs as the data becomes available (e.g., real-time data streaming and/or notifications)

. Various sorts of data sources can be used to implement the techniques described herein, alone or in combination.

In some implementations, a data source can include one or more data store(s) 1290*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 1290*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 1290*c*. The machine learning system(s) 1290*c*, for example, can be used to analyze data from various sources (e.g., data provided by the computing device 1210, data from the data store(s) 1290*a*, data from the blockchain(s) 1290*b*, and/or data from other data sources), to identify patterns in the data, and to draw inferences from the data patterns. In general, training data 1292 can be provided to one or more machine learning algorithms 1294, and the machine learning algorithm(s) can generate a machine learning model 1296. Execution of the machine learning algorithm(s) can be performed by the computing device 1210, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

Figure 13:
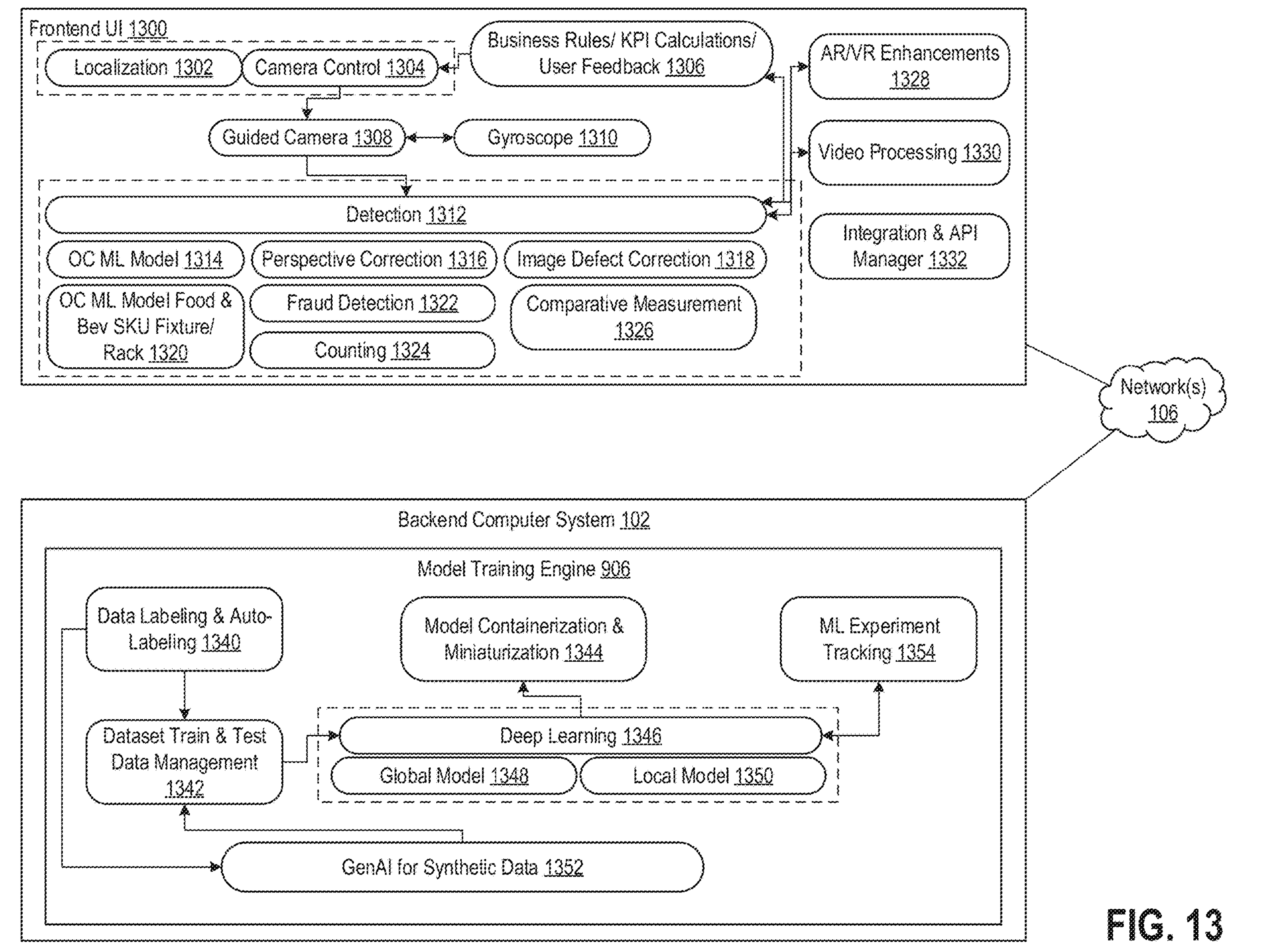
FIG. 13 is an architectural system diagram of one or more components for performing the disclosed image processing pipeline.

FIG. 13 is an architectural system diagram of one or more components for performing the disclosed image processing pipeline. FIG. 13 illustrates an example frontend UI 1300 and the backend computer system 102. The frontend UI 1300 can be provided at one or more user devices, such as the mobile device 104 described throughout this disclosure. The frontend UI 1300 can provide the functionality and image processing pipeline described herein on the edge, at the mobile device 104.

When the frontend UI 1300 is loaded on the edge, such as at the mobile device 104, a relevant user can set configuration and/or parameters for the UI 1300 using localization techniques (block 1306). The localization techniques can refer to the configuration and/or the parameters that drive the UI behavior, based on local settings/preferences that are set by the user. Those settings and/or preferences may include but are not limited to language, date/time format, currency, placement of separators like commas in numbers, etc. The user may also control a camera on the edge (block 1304) as described throughout this disclosure.

Sometimes, the camera controls in block 1304 can be defined by one or more business rules, KPI calculations, and/or user feedback (block 1306). Sometimes, the user can use a guided camera (block 1308), which can guide the user to capture pictures of particular shelves, racks, products, etc. For example, the guided camera may include features such as grid lines to help the user align the camera with the shelves to capture a straight image of the shelves having products. A gyroscope on the edge may also be configured to capture motion/movement data, which may be used to process and align images that are captured using the camera (block 1310).

Images captured by the camera can be preprocessed with detection techniques (block 1312), which can be configured to apply one or machine learning models to generate bounding boxes around objects (e.g., products) in the images. In some implementations, such detection operations can include AR/VR enhancements (block 1328). As an illustrative example, AR/VR can be used to provide additional guidance to the user in capturing images of racks, shelves, and/or products of interest. AR/VR enhancements may also be used to provide the user with a more user-friendly experience interacting with the frontend UI 1300, as described herein. In some implementations, the detection operations in block 1312 may include video processing techniques (block 1330). The video processing techniques in block 1330 may be used in scenarios where the images captured using the camera controls (block 1304), the localization techniques (block 1302), the guided camera (block 1308), and/or the gyroscope (block 1310) are videos rather than still images.

One or more preprocessing operations may be performed, such as before the images are fed into models described herein. Such preprocessing may include perspective correction (block 1316) and/or image defect correction (block 1318). Any of the preprocessing in blocks 1316 and 1318 may include but is not limited to color correction, sharpness/blur correction, orientation adjustment, etc.

Once preprocessing operations are completed, the preprocessed images can be fed into one or more machine learning models and/or algorithms. For example, the preprocessed images can be provided to an object classification machine learning model (e.g., OC ML Model) (block 1314), which can be trained to identify and/or classify each object/product having a bounding box around it. The model in block 1314 can be a CNN, as an illustrative example. The model of block 1314, or other models described herein, can receive the preprocessed images as input to recognize different objects, structures, etc., including but not limited to fixtures, food SKUs, beverage SKUs, racks, etc. (block 1320). Output from any of the models described herein may include information identifying the objects/products in the images, their corresponding pricing information, stock/availability information, etc.

Post-processing operations may also be performed on output from any of the models described herein. The post-processing operations may include fraud detection (block 1322), counting (block 1324), and/or comparative measurements (block 1326). The fraud detection techniques (block 1322) can include determining whether an image to be processed is in fact a static image from a previous time period or another location, whether the image was taken at a time that the user is using the mobile application described herein and at a location where the mobile application is being used, etc. Counting operations (block 1324) can include counting how many of each product appears in each of the processed images and/or the model output. Comparative measurements operations (block 1326) can include determining a size of a rack or shelf and how much space on the rack/shelf is taken up by each product and/or group of products.

The frontend UI 1300 may also communicate with the backend computer system 102 via the network(s) 106 during runtime use. For example, the frontend UI 1300 may communicate with the backend computer system 102 to perform additional analyses, such as performing KPI compliance, analysis, and/or reporting. Refer to FIG. 9 for further discussion about this runtime communication. The frontend UI 1300 may include an integration and API manager (block 1332), which may be configured to provide seamless and automatic integration between and amongst components of the frontend UI 1300 and other system components described in reference to at least FIGS. 13 and 9.

Components of the backend computer system 102 are described in reference to FIG. 9. FIG. 13 illustrates one or more operations that may be performed by the backend computer system 102. More particularly, FIG. 13 illustrates example operations that may be performed by the model training engine 906 of the backend computer system 102.

The model training engine 906 may receive data (e.g., images) for purposes of training machine learning models. The received data can be labeled and/or auto-labeled (block 1340). Labeling the data may include identifying products, logos, colors, artwork, prices, labels, etc. in the data and labeling those identifications as such. The labeled data can be stored in a dataset training and testing data management structure (block 1342). Sometimes, one or more of the labeled data can be used with generative AI techniques (genAI) to generate synthetic training data (block 1352), as described herein. The generated synthetic data can also be stored in the data management structure of block 1342.

Once the training and testing dataset is created, the training data can be used for deep learning training (block 1346) of the models described herein. The training data may also be used for training a global model (block 1348) and a local model (block 1350). The global model (block 1348) can be a superset model that is trained with all data that may be available up to a current time. The local model (block 1350) can be a child model of the global model that can be specifically trained and/or tuned for a set of particular products that may be applicable for a given use case. That use case may include but is not limited to geography, market, and/or type of physical location (e.g., store, restaurant). Once the model(s) has been trained in blocks 1346-1350, the model can be containerized and/or miniaturized (block 1344). In other words, the model(s) may be compressed so that it can be deployed on the edge (e.g., in the frontend UI at a device such as the mobile device 104) for efficient and accurate runtime/real-time execution.

The model training engine 906 may also perform machine learning experiment tracking in block 1354. In other words, while training the model, if a developer wishes to perform experiments with various combinations of parameters, techniques as well as training data figuration can be used to determine what may achieve a desired outcome (e.g., accuracy versus robustness). Such experiments, results, and/or fit for purpose can be documented and tracked in block 1354. The engine 906 may keep track of model performance and/or accuracy in a continuous feedback loop. The engine 906 may determine whether model accuracy is drifting from a predetermined threshold level and/or whether user input is being provided that indicates that the model is not performing as expected. The engine 906 may sometimes retrain the model when the model accuracy drifts from the predetermined threshold level, for example, in block 1354.

Figure 14:
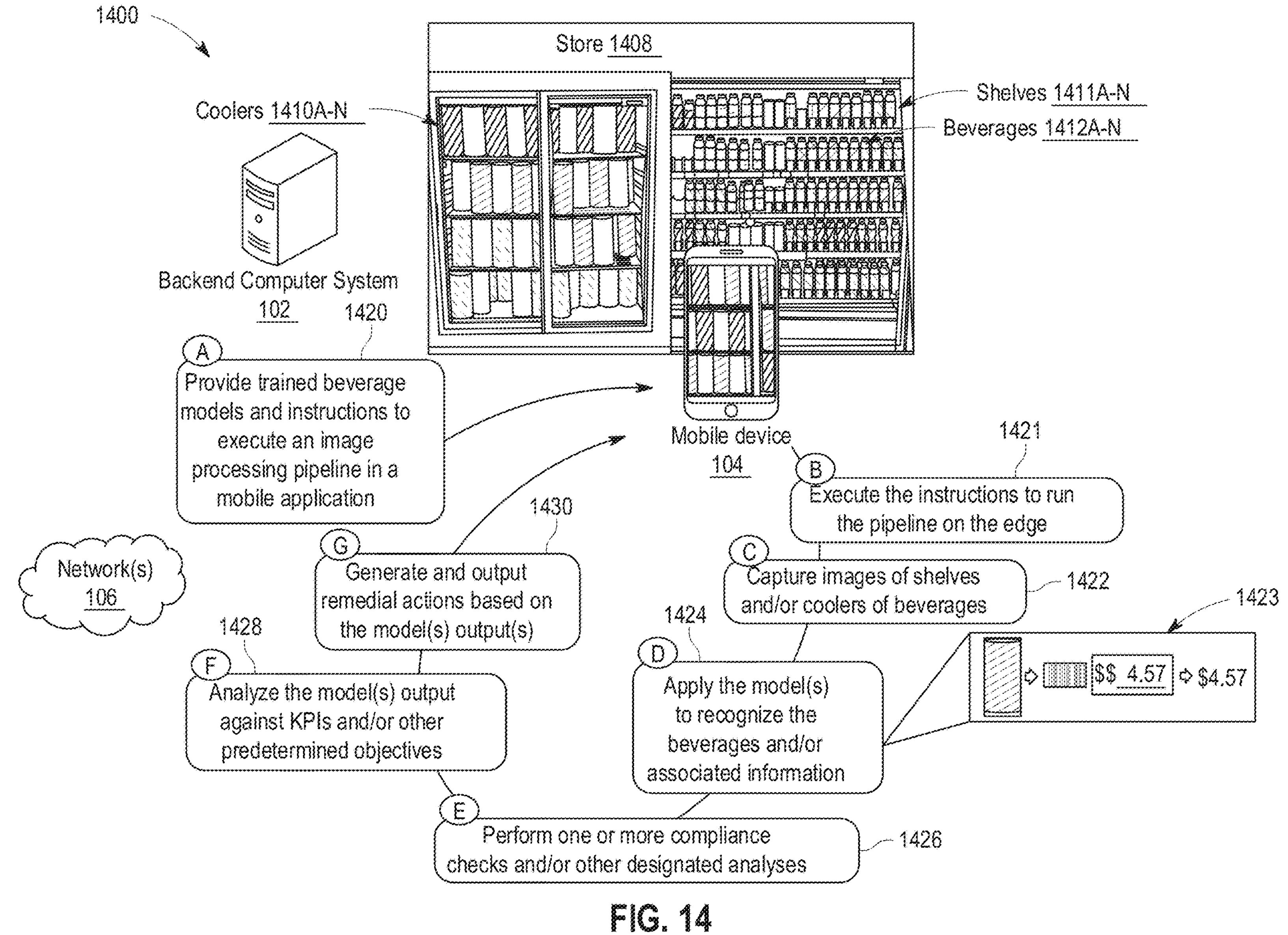
FIG. 14 is a conceptual diagram of a system for executing an image processing pipeline at a mobile device for real-time and edge assessment of shelves or coolers of beverages.

FIG. 14 is a conceptual diagram of a system 1400 for executing an image processing pipeline at the mobile device 104 for real-time and edge assessment of shelves 1411A-N and/or coolers 1410A-N of beverages 1412A-N. The system 1400 is similar to the system 100 described in reference to at least FIG. 1A. For example, the system 1400 may include the backend computer system 102 and the mobile device 104 communicating via the network(s) 106. The system 1400 may include a store 1408, which can be similar to the store 108 and/or any other physical location described herein. The store 1408 may include the coolers 1410A-N and/or the shelves 1411A-N, which may be configured to hold the beverages 1412A-N. In some implementations, the store 1408 may also include the shelves 110A-N described herein. The coolers 1410A-N can be configured to hold products to be refrigerated or cooled, including but not limited to liquids (e.g., the beverages 1412A-N), dairy products, frozen foods, ice, or other products that may require being maintained at a temperature different than room temperature. The shelves 1411A-N can similarly be configured to retain different types of products, including the beverages 1412A-N and/or other types of products described herein.

Still referring to the system 1400, the backend computer system 102 can provide one or more trained beverage models and instructions to execute an image processing pipeline in a mobile application to the mobile device 104 (block A, 1420). Refer to block A, 120, in FIG. 1A for further discussion about model and mobile application deployment.

The backend computer system 102 may specifically train the models deployed in block A (1420) to recognize the beverages 1412A-N in image data captured by the mobile device 104. Since beverage containers may appear differently than food packaging/products described throughout this disclosure, the backend computer system 102 can train the beverage model(s) with different inputs that are unique to the beverages 1412A-N. For example, the beverage model(s) can be trained using images of a variety of different beverage containers, brands, logos, bottles, marketing materials, etc. These images can be labeled with features that are unique and/or specific to the different beverages 1412A-N that be provided on the shelves 1411A-N and/or in the coolers 1410A-N at the store 1408 or other stores. As a result, the beverage model(s) can be trained to identify the different beverages 1412A-N, recognize their prices, and/or compare the identified/recognized beverages 1412A-N to expected information (e.g., planogram, layout, availability, out of stock) and/or related KPIs/business objectives. The beverage model(s) may also be fine-tuned differently than the other models described herein. For example, different user inputs can be received and processed using thresholds and/or criteria that are specific to beverages to determine whether model accuracy is as expected or whether the model(s) should be trained to improve the accuracy. In some implementations, the backend computer system 102 may train a model to recognize both the products and the beverages described herein. As a result, one model can be trained to detect both types of items in the store 1408.

In block B (1421), the mobile device 104 can execute the instructions to run the pipeline on the edge. Refer to block B, 121, in FIG. 1A for further discussion.

The mobile device 104 may be used by a relevant user to capture images of the shelves 1411A-N and/or the coolers 1410A-N having the beverages 1412A-N (block C, 1423). Refer to block C, 122, in FIG. 1A for further discussion.

The model device 104 may automatically apply the beverage model(s) to recognize each of the beverages and/or associated information in block D (1424). Refer to block D (124) in FIG. 1A for further discussion about generally using a trained model to detect/recognize an item (e.g., product, beverage) in the image data and identify/determine information about that recognized item.

After applying the beverage model(s), the mobile device 104 may perform one or more compliance checks and/or other designated analyses in block E (1426). The one or more compliance checks may include checking a layout of the beverages 1412A-N on the shelves 1411A-N against a planogram or other store layout. The one or more other designated analyses may include, but is not limited to, checking whether a sufficient quantity of one or more of the beverages 1412A-N is on the shelves 1411A-N, whether any of the beverages 1412A-N are out of stock, etc. The compliance checks and/or other designated analyses can be performed using output from the applied beverage model(s). In some implementations, the compliance checks and/or the designated analyses can be performed by applying one or more of the beverage models to the image data and/or output from the model(s) that was executed in block D (1424). Refer to block E, 126, in FIG. 1A for further discussion.

The mobile device 104 may also analyze the model(s) output against KPIs and/or other predetermined objectives (block F, 1428). The objectives may be specific to the store 1408, a provider of the beverages 1412A-N, or any other relevant used described herein. The model(s) output can be derived from performing block D (1424) and/or block E (1426). Refer to block F, 128, in FIG. 1A for further discussion.

The mobile device 104 may generate and output one or more remedial actions based on the model(s) output(s) in block G (1430). Such actions may include, but are not limited to, rearranging one or more of the beverages 1412A-N on the shelves 1411A-N and/or in the coolers 1410A-N, restocking one or more of the beverages 1412A-N, replacing one or more of the beverages 1412A-N with other beverages or other products, etc. Refer to at least block G (130) in FIG. 1A for further discussion.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for edge-based assessment of conditions associated with a location, the method comprising:

executing, by an edge computing device, instructions to run an image processing pipeline at the edge computing device;

capturing, by the edge computing device, one or more images of products and fixtures associated with the location; and for each image of the one or more images:

determining, by the edge computing device and based on processing the image, conditions associated with the location;

determining, by the edge computing device, whether the conditions associated with the location satisfy one or more KPI analyses or predetermined objectives for the location;

generating, by the edge computing device, one or more recommendations for improving the conditions associated with the location based on a determination that the conditions associated with the location do not satisfy the one or more KPI analyses or predetermined objectives for the location; and returning, in one or more graphical user interface (GUI) displays at the edge computing device, at least the one or more recommendations for improving the conditions associated with the location;

applying, by the edge computing device, a product recognition model of a plurality of compressed machine learning models to the image;

receiving, at the edge computing device, user input indicating a user identification of at least one product amongst the products; and transmitting, by the edge computing device to a backend computer system, at least the user input and a model output, wherein the backend computer system is configured to perform a retraining process of the product recognition model, the retraining process comprising:

performing a quality assessment of the model output based on the user input, one or more model accuracy criteria and a data drift detection technique;

determining whether the quality assessment satisfies one or more quality criteria:

determining, based on a determination that the quality assessment does not satisfy the one or more quality criteria, whether sufficient image samples are available for retraining the product recognition model on the at least one product for which accuracy of the model output was below a predetermined threshold level;

invoking, based on a determination that insufficient image samples are available, a synthetic data module to generate synthetic image samples of the at least one product; and retraining the product recognition model based on at least the synthetic image samples of the at least one product until the accuracy of the model output meets or exceeds the predetermined threshold level.

2. The method of claim 1, wherein executing, by the edge computing device, the instructions to run the image processing pipeline at the edge computing device comprises running the image processing pipeline in an existing mobile application that is launched at the edge computing device.

3. The method of claim 1, wherein executing, by the edge computing device, the instructions to run the image processing pipeline at the edge computing device comprises running the image processing pipeline in a mobile application that is provided by the backend computer system.

4. The method of claim 1, wherein executing, by the edge computing device, the instructions to run the image processing pipeline at the edge computing device comprises deep linking an existing mobile application at the edge computing device to the image processing pipeline.

5. The method of claim 1, further comprising, for each image of the one or more images:

receiving, by the edge computing device, the model output based on applying the product recognition model, wherein the model output comprises indications of the products that were recognized in the image by the product recognition model.

6. The method of claim 5, further comprising, for each image of the one or more images:

applying, by the edge computing device, at least a portion of the plurality of compressed machine learning models to the model output; and determining, by the edge computing device and based on applying the at least a portion of the plurality of compressed machine learning models to the model output, the conditions associated with the location.

7. The method of claim 6, wherein:

applying, by the edge computing devices, at least a portion of the plurality of compressed machine learning models to the model output comprises applying a product measurements model to the model output to identify measurements of the products relative to measurements of the fixtures associated with the location, and determining, by the edge computing device and based on applying the at least portion of the plurality of compressed machine learning models to the model output, conditions associated the location comprises identifying placement of the products associated with the location based on the identified measurements of the products relative to the identified measurements of the fixtures associated with the location.

8. The method of claim 6, wherein the at least portion of the plurality of compressed machine learning models are applied, by the edge computing device, in parallel.

9. The method of claim 6, wherein the at least portion of the plurality of compressed machine learning models are applied, by the edge computing device, in series.

10. The method of claim 6, wherein at least one of the capturing, the applying, the receiving, the applying, the determining, the determining, the generating, or the returning operations is performed on the edge when the edge computing device is disconnected from a network.

11. The method of claim 5, wherein the product recognition model was trained in a process that comprises:
receiving, by the backend computer system, at least images of the products associated with the location;
generating, by the backend computer system, a bounding box around one or more products in the images using object detection techniques;
annotating, by the backend computer system and based on user input from the edge computing device, the one or more products in the respective bounding box of the images to identify the one or more products;
providing, by the backend computer system, the annotated images as training data to the product recognition model;
training, by the backend computer system, the product recognition model based on the training data to identify the one or more products that were annotated by the backend computer system in other images;
assessing, by the backend computer system, accuracy of the trained product recognition model;
identifying, by the backend computer system and based on determining that the accuracy of the trained product recognition model exceeds a predetermined threshold level of accuracy, edge device deployment information;
compressing, by the backend computer system, the trained product recognition model for edge deployment based on the identified information; and
returning, by the backend computer system, the compressed product recognition model, wherein returning the compressed product recognition model comprises transmitting the compressed product recognition model with instructions to one or more network-connected edge computing devices to execute the compressed product recognition model on the edge.

12. The method of claim 5, wherein the product recognition model was trained in a process that comprises:
receiving, by the backend computer system, at least images of a product in one or more dimensions;
identifying, by the backend computer system, packaging artwork of the product in a first dimension using object detection techniques;
annotating, by the backend computer system, the packaging artwork in the first dimension in the images;
reconstructing, by the backend computer system, the packaging artwork in N dimensions based on applying generative artificial intelligence (AI) techniques to the annotated images of the packaging artwork in the first dimension;
providing, by the backend computer system, the reconstructed packaging artwork in the N dimensions as training data to the product recognition model;
training, by the backend computer system, the product recognition model to identify products in the N dimensions in other images; and
returning, by the backend computer system, the trained product recognition model.

13. The method of claim 1, wherein determining, by the edge computing device, whether the conditions associated with the location satisfy one or more KPI analyses or predetermined objectives for the a physical space comprises determining whether the products are arranged in the fixtures according to a planogram for the location.

14. The method of claim 1, wherein generating, by the edge computing device one or more recommendations for improving the conditions associated with a physical space comprises: generating instructions to add or remove a predetermined quantity of at least one product associated with the location.

15. The method of claim 1, where generating, by the edge computing device one or more recommendations for improving the conditions associated with the location comprises: generating instructions to move a predetermined quantity of at least one product associated with a physical space from a current fixture to another fixture associated with the physical space.

16. The method of claim 1, wherein the fixtures associated with the location comprise racks or shelves.

17. The method of claim 1, wherein the products comprise a food product.

18. The method of claim 1, wherein the fixtures comprise at least one of shelves, racks, freezers, or coolers.

19. A system for edge-based assessment of conditions associated with a location, the system comprising:
a backend computer system configured to (i) train machine learning models, and (ii) provide an image processing pipeline for edge deployment, and perform a retraining process of a product recognition model; and
an edge computing device configured to:
receive, over a network connection with the backend computer system, the machine learning models and instructions to execute the image processing pipeline at the edge computing device;
execute the instructions to run the image processing pipeline at the edge computing device;
capture one or more images of products and fixtures associated with the location; and
for each image of the one or more images:
identify, based on applying at least a portion of the machine learning models to the image, conditions associated with the location in the image;
generate output based on the identified conditions associated with the location; and
return, the output for presentation in one or more graphical user interface (GUI) displays at the edge computing device;
apply the product recognition model of a plurality of compressed machine learning models to the image;
receive user input indicating a user identification of at least one product amongst the products; and
transmit to the backend computer system, at least the user input and a model output, wherein the backend computer system performing the retraining process comprises:
performing a quality assessment of the model output based on the user input, one or more model accuracy criteria and a data drift detection technique;
determining whether the quality assessment satisfies one or more quality criteria;
determining, based on a determination that the quality assessment does not satisfy the one or more quality criteria, whether sufficient image samples are available for retraining the product recognition model on the at least one product for which accuracy of the model output was below a predetermined threshold level;
invoking, based on a determination that insufficient image samples are available, a synthetic data module to generate synthetic image samples of the at least one product; and
retraining the product recognition model based on at least the synthetic image samples of the at least one product until the accuracy of the model output meets or exceeds the predetermined threshold level.

20. The system of claim 19, wherein, for each image of the one or more images, the edge computing device is further configured to:

apply the product recognition model of the machine learning models to the image;

receive the model output based on applying the product recognition model, wherein the model output comprises indications of the products that were recognized in the image by the product recognition model;

apply at least a portion of the machine learning models to the model output; and identify, based on applying at least the portion of the machine learning models to the model output, the conditions associated with the location in the image.

21. The system of claim 20, wherein the backend computer system is configured to train the product recognition model using a process that comprises:

receiving images of the products associated with the location, wherein the products comprise at least one of food products or beverages;

generating a bounding box around one or more products in the images using object detection techniques;

annotating the one or more products in the respective bounding box of the images to identify the one or more products;

providing the annotated images as training data to the product recognition model;

training the product recognition model based on the training data to identify the one or more products that were annotated in other images;

compressing the trained product recognition model for edge deployment; and returning the compressed product recognition model, wherein returning the compressed product recognition model comprises transmitting the compressed product recognition model with instructions to the edge computing device when the edge computing device is connected to a network via the network connect.

22. The system of claim 19, wherein:

applying at least the portion of the machine learning models to the image comprises applying a product measurements model to the image to identify measurements of products represented in the image relative to measurements of the fixtures associated with the location, and wherein identifying, based on applying at least the portion of the machine learning models to the image, the conditions associated the location comprises identifying placement of the products associated with the location based on the identified measurements of the products relative to the identified measurements of the fixtures associated with the location.

23. The system of claim 19, wherein the edge computing device is further configured to: determine whether the conditions associated with the location satisfy one or more KPI analyses or predetermined objectives for the location.

24. The system of claim 23, wherein the edge computing device is further configured to:

based on a determination that the conditions associated with the location do not satisfy the one or more KPI analyses or predetermined objectives for the location, generate one or more recommendations for improving the conditions associated with the location; and return the one or more recommendations for presentation in the GUI displays at the edge computing device.

25. A non-transitory computer-readable storage medium storing instructions that, when executed by one or more processors of a computing system, cause the computing system to perform operations for edge-based assessment of conditions associated with a location comprising:

executing instructions to run an image processing pipeline;

capturing one or more images of products and fixtures associated with the location; and for each image of the one or more images:

determining, based on processing the image, conditions associated with the location;

determining whether the conditions associated with the location satisfy one or more KPI analyses or predetermined objectives for the location;

generating one or more recommendations for improving the conditions associated with the location based on a determination that the conditions associated with the location do not satisfy the one or more KPI analyses or predetermined objectives for the location;

returning, in one or more graphical user interface (GUI) displays, at least the one or more recommendations for improving the conditions associated with the location;

applying a product recognition model of a plurality of compressed machine learning models to the image;

receiving user input indicating a user identification of at least one product amongst the products; and performing a retraining process of the product recognition model, the retraining process comprising:

performing a quality assessment of a model output based on the user input, one or more model accuracy criteria and a data drift detection technique;

determining whether the quality assessment satisfies one or more quality criteria;

determining, based on a determination that the quality assessment does not satisfy the one or more quality criteria, whether sufficient image samples are available for retraining the product recognition model on the at least one product for which accuracy of the model output was below a predetermined threshold level;

invoking, based on a determination that insufficient image samples are available, a synthetic data module to generate synthetic image samples of the at least one product; and retraining the product recognition model based on at least the synthetic image samples of the at least one product until the accuracy of the model output meets or exceeds the predetermined threshold level.

* * * * *